(12) United States Patent
Hamai et al.

(10) Patent No.: US 6,424,478 B2
(45) Date of Patent: Jul. 23, 2002

(54) APPARATUS FOR RECORDING AND REPRODUCING DIGITAL DATA AND METHOD FOR THE SAME

(75) Inventors: Shinji Hamai; Fumikazu Imai, both of Osaka; Chiyoko Matsumi, Suita; Akira Iketani, Higashiosaka, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/801,502

(22) Filed: Mar. 8, 2001

Related U.S. Application Data

(62) Division of application No. 08/890,731, filed on Jul. 11, 1997, which is a continuation of application No. 08/280,598, filed on Jul. 26, 1994, now abandoned.

(30) Foreign Application Priority Data

| Jul. 26, 1993 | (JP) | ............................................. 5-183714 |
| Dec. 22, 1993 | (JP) | ............................................. 5-325088 |
| Dec. 24, 1993 | (JP) | ............................................. 5-329119 |
| Dec. 27, 1993 | (JP) | ............................................. 5-333853 |
| Mar. 8, 1994 | (JP) | ................................................ 6-36960 |

(51) Int. Cl.$^7$ .................................................. G11B 5/09
(52) U.S. Cl. ................................................................. 360/48
(58) Field of Search ........................... 360/48, 49, 32, 360/53, 31, 22, 72.2, 78.14; 369/59.23, 59.24, 59.25, 59.26, 30.12, 30.3

(56) References Cited

U.S. PATENT DOCUMENTS

| 4,227,808 A | 10/1980 | Hui |
| 4,783,784 A | 11/1988 | Ishiguro et al. |
| 4,835,628 A | 5/1989 | Hinz et al. |
| 4,932,014 A | 6/1990 | Tamiya |
| 5,175,631 A | 12/1992 | Juri et al. |
| 5,359,468 A | 10/1994 | Rhodes et al. |
| 5,398,142 A | * 3/1995 | Davy ........................... 360/48 |
| 5,414,451 A | 5/1995 | Sugiyama et al. |

FOREIGN PATENT DOCUMENTS

| JP | 03259458 A1 | * 11/1991 | ................... 360/48 |

* cited by examiner

Primary Examiner—Alan T. Faber
(74) Attorney, Agent, or Firm—Ratner & Prestia

(57) ABSTRACT

An apparatus for recording and reproducing digital data according to the present invention, includes: a group converter; a controller; a recording converter; a recording unit; a reproducing unit; a reproducing converter; and a group reverse converter, wherein the group converter includes: a block management data generator for receiving the management data from the controller and generating block management data with respect to the corresponding blocked data, the block management data having a variable-length and containing information concerning each blocked data; a group management data generator for receiving the management data and generating group management data containing information concerning the entire grouped data; and a grouped data generator for receiving the blocked data, the block management data, and the group management data, and generating grouped data by arranging the blocked data, the block management data, and the group management data in a predetermined order.

16 Claims, 35 Drawing Sheets

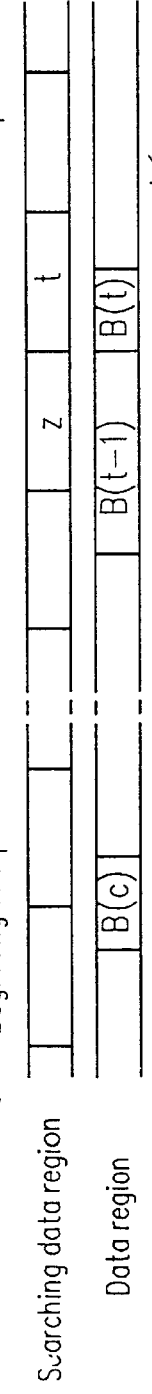
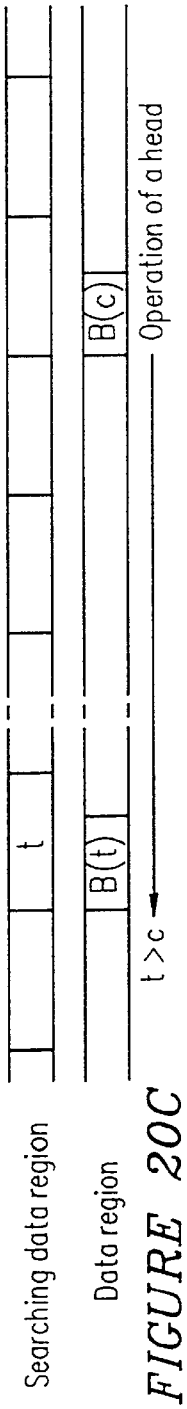
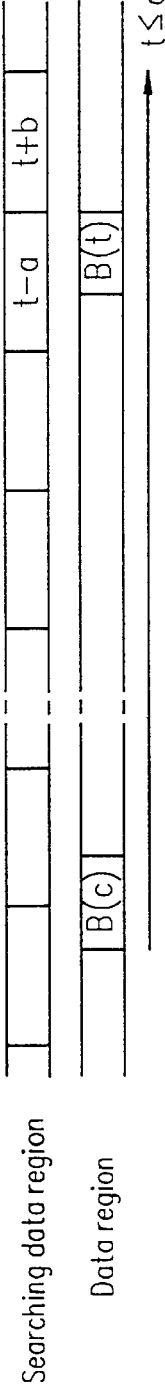
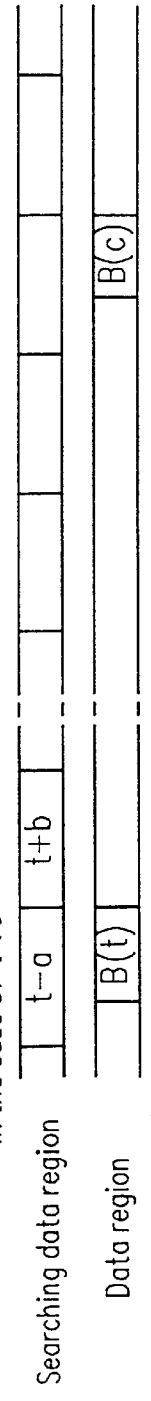
FIGURE 20A  In the case of t>c (Bt is a leading edge of a group)
FIGURE 20B  In the case of t<c (Bt is a leading edge of a group)
FIGURE 20C  In the case of t>c
FIGURE 20D  In the case of t<c

FIGURE 26
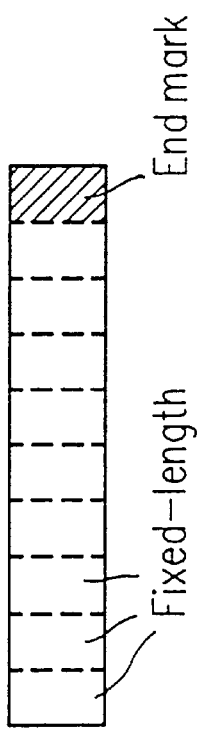
106 Record medium management information
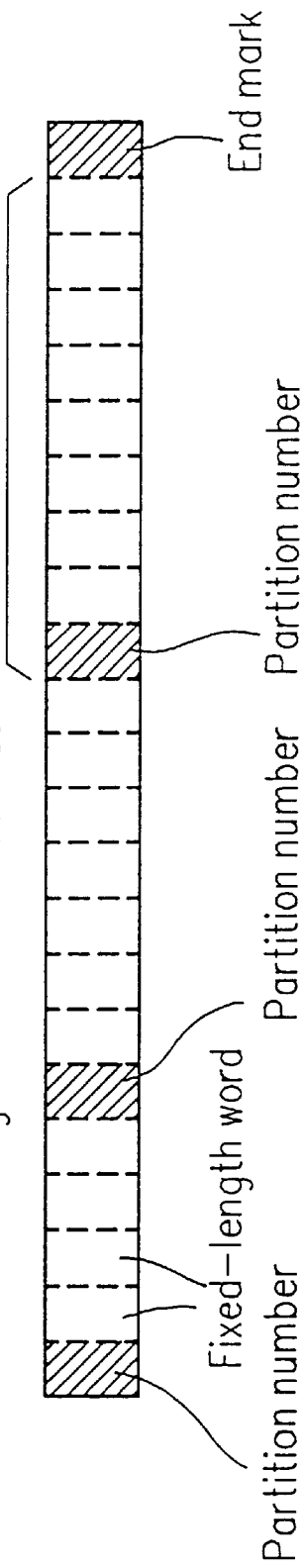
107 Partition management information list   109 Partition management information
* All of the management data are placed in the leading region of the tape A  Amble track group
Di Data track group
E  Data end track group
FIGURE 36A
PRIOR ART
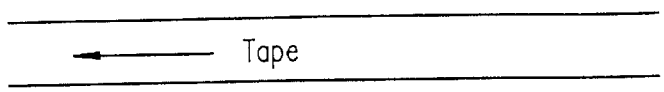
FIGURE 36B
PRIOR ART
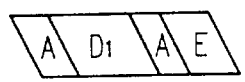
FIGURE 36C
PRIOR ART
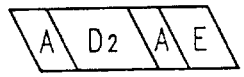
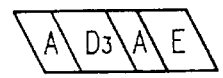
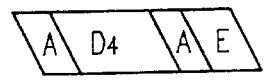
FIGURE 36D
PRIOR ART

DDS format

DDS format

APPARATUS FOR RECORDING AND REPRODUCING DIGITAL DATA AND METHOD FOR THE SAME

This application is a divisional of U.S. patent application Ser. No. 08/890,731, filed Jul. 11, 1997, which is a file-wrapper continuation of Ser. No. 08/280,598, filed Jul. 26, 1994 now abandoned.

BACKGROUND OF THE INVENTION

1. Field of the Invention

The present invention relates to an apparatus for recording and reproducing digital data and a method for the same, and more particularly to an apparatus for recording blocked digital data on a magnetic tape and a method for the same.

2. Description of the Related Art

In recent years, various kinds of apparatuses for recording and reproducing digital data have been widely applied with the advancement of the technology for recording and reproducing digital data. As a record medium, a hard disk, an optical disk, a magnetic tape, and the like are used. Among them, the magnetic tape is more practical and superior in storage capacity, changeability, and price (in a unit cost of capacity), compared with other record media.

Data to be recorded on a magnetic tape is mainly classified into two kinds of data: data transferred and recorded by a host such as a computer and data automatically added (additional data) by an apparatus for recording and reproducing. The additional data includes information concerning a leading edge and a trailing edge of a recording region on a magnetic tape, information concerning the delimitation of blocks formed therein, an address indicating the position therein, information for error detection or error correction, etc. It is convenient for the host to utilize information concerning a name, an attribute, a size, and the like of data during recording, reading, or searching for the data. Such information is referred to as management data in the present specification.

The data transferred by the host is recorded after being divided into blocks having a predetermined size. For example, in the case of a usual computer, the data is divided so as to have 512 bytes per block. Each block is the minimum unit of the magnetic tape in which data can be recorded. Data divided into a predetermined size by the host is referred to as blocked data (herein, blocked data means a "blocked data" unit or "data block"). Thus, the blocked data becomes the minimum unit for recording on the magnetic tape. Furthermore, instructions (marks) for searching data can be recorded on the magnetic tape. The blocked data and marks can be recorded with respective numbers assigned thereto.

Some blocked data can be combined to be recorded as grouped data (herein, grouped data means a "grouped data" unit or "data group"). FIG. 34 shows an example of grouped data recorded by a conventional apparatus for recording and reproducing digital data. This example shows a DDS format using a digital audio tape-recorder (DAT). One group of the grouped data include 126632 bytes. Each blocked data is arranged from the leading edge of the grouped data.

Information concerning the grouped data (management data) G is positioned in a group information table placed in 32 bytes of the trailing region of the grouped data. Information concerning each blocked data (management data) $B_1$, $B_2$, . . . indicating the size and the like of each blocked data are arranged in the direction from a portion right before the group information table to the leading edge of the grouped data. The information $B_1$, $B_2$, . . . concerning each blocked data respectively have a fixed length.

In the DDS format, data is recorded and reproduced as follows:

In a random access recording and reproducing apparatus, by designating the number assigned to each block (i.e., absolute addressing), data corresponding to the block with that number assigned can be read or recorded. Likewise, by absolutely addressing the number assigned to each mark, data can be reproduced from the position of the mark with that number assigned.

In a sequential recording and reproducing apparatus which does not perform random access, data is recorded in the order in which the blocks are arranged or in a predetermined order. Likewise, data is read in the order in which the blocks are recorded. In the sequential recording and reproducing apparatus, the position of the recorded blocks is relatively addressed (for example, a block following four blocks after a certain block).

As described above, data is recorded or read by relatively or absolutely addressing a block.

Hereinafter, a searching method in a conventional DDS format will be described.

FIG. 35 schematically shows grouped data in the conventional DDS format. As shown in this figure, the number of a block whose recording is first started in a group and the number of blocks whose recording is started in the group are recorded in a subcode region on a group basis. The block No. is represented by g, and the number of the blocks is represented by m. Hereinafter, simply referred to as numbers g and m. The subcode region is a region of the track where data can be reproduced even during searching.

When the numbers g and m are obtained for a group during searching, it is found that the recording of the blocks with the numbers g to g+m−1 is started in the group. By using this, the group in which the recording of a desired group is started is found, and a desired block is reproduced. Likewise, the number h ($h_1$ in the figure) of a mark whose recording is first started in a group and the number k of marks whose recording is started in the group are recorded in the subcode region of the group. In the case where the numbers h and k are obtained for a certain group during searching, it is found that the recording of the marks with the numbers h to h+k−1 is started in the group. By using this, the group in which the recording of a desired mark is started is found, and a desired block in a position designated by the mark can be reproduced. Alternatively, data searching can be conducted by recording, in the subcode region, the number of a block whose recording is first started in a group and the number of a block whose recording is last started in the group.

FIGS. 36A to 36D show the patterns of track groups recorded in the conventional DDS format. A magnetic tape runs in the direction indicated by an arrow in FIG. 36A. Grouped data to be recorded is subjected to a predetermined signal processing to form a data track group D1. As shown in FIG. 36B, the data track group D1 is recorded on the magnetic tape together with amble track groups A positioned before and behind the data track group D1 (i.e., a preamble track group and a postamble track group) and a data end track group E.

Overwriting of data is conducted as follows:

First, the data end track group E is searched to detect the last-recorded position. Then, recording of data is started from the trailing edge of the postamble track group A positioned before the data end track group E. As a result, the data end track group E which has been recorded is deleted and only a latest-recorded data end track group E is left on the magnetic tape. FIG. 36D shows the pattern of track groups in which data track groups D2 to D4 shown in FIG. 36C are recorded in addition to the data track group D1.

In order to prevent a data track group from being positioned right before the track at which the additional recording is started, the previously recorded postamble track group A is left on the magnetic tape. The reason for this is that the track, right before the track at which the additional recording is started, has its width cut away by the additional recording, increasing the frequency of error occurrence.

Furthermore, as shown in FIG. 37A, in the conventional DDS format, information concerning the entire magnetic tape (tape management data) is recorded in a system area positioned in a leading region of the magnetic tape. In the DDS format, one or two data regions called a partition can be assigned on the magnetic tape for convenience of data management.

The leading region of each partition is assigned as a system area corresponding to the partition, and information concerning the use record of the partition (i.e., system log) is recorded in a subcode region of the system area (see FIG. 37B). Data is recorded with a fixed-length in the subcode region. In the case where one partition is assigned on the magnetic tape, the contents of the system log of the partition becomes equal to that of the entire magnetic tape. In the case where a first partition and a second partition are assigned on the magnetic tape in the order of the tape running direction, information concerning the use record of the entire magnetic tape and information concerning the size of the first partition are recorded in the system log of the first partition; and information concerning the second partition is recorded in the system log of the second partition.

Each partition is identified as follows:

In the case where one partition is assigned on the magnetic tape, the partition number is set at 0. In the case where two partitions are assigned on the magnetic tape, the first partition number of the leading side partition of the magnetic tape is set at 1 and the second partition number of the trailing side partition of the magnetic tape is set at 0. When a cassette is loaded, the first partition number is checked to obtain the number of partitions.

However, in the above-mentioned DDS format, information concerning blocked data (management data) is recorded in a fixed-length form, so that the management data for blocked data which requires less information (for example, without attribute information has the same length as that of the other blocked data). This results in decreased recording efficiency.

Moreover, in the conventional DDS format, two kinds of informations (g and m, and/or k and h) are required to be recorded per group for searching data. For accessing a desired block, it is required to search, reproduce, and perform an operation on two kinds of information, and to compare the result with the desired block (or mark) number. Thus, a large subcode region for recording two kinds of information for searching as well as an additional circuit and time for the operation are required.

In addition, for overwriting data in the conventional DDS format, the additional recording is started with the previously recorded postamble track left on the magnetic tape; therefore, the postamble track group and a preamble track group are present between the previously recorded data track group and the latest-recorded data track group. As the number of ample track groups increases, the data capacity of one magnetic tape decreases.

Furthermore, as described above, in the case where two partitions are assigned as a recording region on the magnetic tape, the system log of the second partition is required to be reproduced for obtaining information concerning the second partition. In this case, time is required for reproducing two different system logs, making it impossible to search data between different partitions at a high velocity.

SUMMARY OF THE INVENTION

The apparatus for recording and reproducing digital data of the present invention, comprises:

group conversion means for receiving input blocked data, arranging the blocked data in a predetermined order to generate grouped data, and outputting the grouped data;

control means for receiving a command input together with the input blocked data and generating a control signal and management data based on the command;

recording conversion means for receiving the grouped data and converting the grouped data into a recording signal based on the control signal;

recording means for receiving the recording signal and recording data represented by the recording signal on a record medium;

reproducing means for reproducing from the record medium a signal representing the data recorded in the record medium;

reproducing conversion means for receiving the reproduced signal and converting the reproduced signal into grouped data; and group reverse conversion means for receiving the grouped data output from the reproducing conversion means and reconfiguring blocked data from the grouped data, wherein the group conversion means includes:

block management data generation means for receiving the management data from the control means and generating block management data with respect to the corresponding blocked data, the block management data having a variable-length and containing information concerning each blocked data;

group management data generation means for receiving the management data and generating group management data containing information concerning the entire grouped data; and grouped data generation means for receiving the blocked data, the block management data, and the group management data, and generating grouped data by arranging the blocked data, the block management data, and the group management data in a predetermined order.

In one embodiment of the present invention, the group reverse conversion means comprises:

group management data extraction means for extracting group management data from the grouped data;

block management data extraction means for extracting block management data from the grouped data and the extracted group management data;

block output control means for receiving the extracted block management data and group management data, determining the blocked data to be output based on the block management data and the group management data according to the control signal given by the control means, and generating a block output control signal designating the blocked data to be output; and blocked data separating means for receiving the grouped data and the block output control signal and separating blocked data designated by the block output control signal from the grouped data, and outputting the separated blocked data.

Alternatively, the apparatus for recording and reproducing digital data of the present invention, comprises:

group conversion means for receiving input blocked data, arranging the blocked data in a predetermined order, and generating and outputting grouped data;

control means for receiving a command input together with the input blocked data and generating a control signal and management data based on the command;

recording conversion means for receiving the grouped data and converting the grouped data into a recording signal based on the control signal;

recording means for receiving the recording signal and recording data represented by the recording signal on a record medium;

reproducing means for reproducing from the record medium a signal representing the data recorded on the record medium;

reproducing conversion means for receiving the reproduced signal and converting the reproduced signal into grouped data; and group reverse conversion means for receiving the grouped data output from the reproducing conversion means and reconfiguring blocked data from the grouped data, wherein the group conversion means includes:

data transformation means for receiving the blocked data, data-transforming the blocked data, and generating recording blocked data;

block management data generation means for receiving the recording blocked data and the management data and generating block management data with respect to the corresponding recording blocked data, the block management data having a variable-length and containing information concerning the recording blocked data and the blocked data;

group management data generation means for receiving the recording blocked data and the management data and generating group management data containing information concerning the entire grouped data; and grouped data generation means for receiving the recording blocked data, the block management data, and the group management data, and generating grouped data by arranging the recording blocked data, the block management data, and the group management data in a predetermined order.

In one embodiment of the present invention, the group reverse conversion means comprises:

group management data extraction means for extracting group management data from the grouped data;

block management data extraction means for extracting block management data from the grouped data and the extracted group management data;

block output control means for determining blocked data to be output and recording blocked data containing the blocked data to be output based on the extracted block management data and group management data in accordance with the control signal given by the control means, and generating a block output control signal designating the blocked data to be output, a block separating signal designating the recording blocked data related to the blocked data to be output, and an inverse transformation instructing signal instructing inverse transformation from the recording blocked data to the blocked data;

blocked data separation means for receiving the grouped data and the block separating signal, separating the recording blocked data designated by the block separating signal from the grouped data, and outputting the separated recording blocked data; and data inverse transformation means for inverse-transforming the recording blocked data output from the blocked data separation means into the blocked data based on the inverse transformation instructing signal, and outputting the blocked data designated by the block output control signal.

In another embodiment of the present invention, the group conversion means formats so that each blocked data and the corresponding block management data are arranged adjacent to each other in each grouped data to be output.

In another embodiment of the present invention, the group conversion means arranges the group management data, the block management data, and the blocked data contained in each grouped data so that:

a leading edge of the group management data is placed in a predetermined position in the grouped data;

the blocked data are successively arranged from a leading edge of the grouped data, except for a portion where the group management data has been placed; and the block management data are successively arranged after all of the arranged blocked data, except for a portion where the group management data has been placed, in accordance with an order in which the corresponding blocked data are arranged.

In another embodiment of the present invention, the group conversion means arranges the group management data, the block management data, and the blocked data contained in each grouped data so that:

a leading edge of the group management data is placed in a predetermined position in the grouped data;

the block management data are successively arranged from a leading edge of the grouped data, except for a portion where the group management data has been placed; and the blocked data are successively arranged from a trailing edge of the grouped data, except for a portion where the group management data has been placed, in accordance with an order in which the corresponding block management data are arranged.

In another embodiment of the present invention, the group conversion means arranges the group management data, the block management data, and the blocked data contained in each grouped data so that:

a leading edge of the group management data is placed in a predetermined position in the grouped data;

the blocked data are successively arranged from a leading edge of the grouped data, except for a portion where the group management data has been placed; and the block management data are successively arranged from a trailing edge of the grouped data, except for a portion where the group management data has been placed, in accordance with an order in which the corresponding blocked data are arranged.

In another embodiment of the present invention, the recording conversion means comprises:

first error-correction encoding means for performing error-correction encoding with respect to the grouped data;

searching data generation means for generating searching data based on management data given by the control circuit;

second error-correction encoding means for performing error-correction encoding with respect to the searching data; and modulation means for modulating the error-corrected encoded grouped data and the error-corrected encoded searching data to generate the recording signal.

In another embodiment of the present invention, the reproducing conversion means comprises:

demodulation means for demodulating the reproducing signal to output the encoded grouped data and the encoded searching data;

first decoding means for receiving the encoded grouped data and performing error-correction decoding with respect to the encoded grouped data;

second decoding means for receiving the encoded searching data and performing error-correction decoding with respect to the received searching data; and searching data generation means for extracting searching data of a group from the error-corrected decoded searching data.

In another embodiment of the present invention, the block management data generation means generates block management data corresponding to blocked data contained in one grouped data under a condition that specific different numbers are assigned to the respective block management data.

In another embodiment of the present invention, the block management data generation means generates block management data corresponding to blocked data contained in one grouped data under a condition that successive numbers are assigned to the respective block management data in an order in which the blocked data are input.

In another embodiment of the present invention, in a case where the grouped data contains the blocked data whose recording is started in the group, the searching data generation means generates, as the searching data, a number assigned to blocked data whose recording is first started among the blocked data, in a case where the grouped data contains no blocked data whose recording is started in the group, the searching data generation means generates, as searching data, information indicating the absence of blocked data whose recording is started in the group.

In another embodiment of the present invention, the searching data generation means generates, as searching data, a number assigned to the blocked data which is first recorded in the grouped data, and information indicating whether or not the blocked data which is first recorded in the grouped data is recorded continuing from a preceding grouped data.

In another embodiment of the present invention, marks used for searching are input to the block management data generation means together with the blocked data, and the block management data generation means generates block management data for each mark, the block management data for each mark having a number indicating an order in which the marks are input.

In another embodiment of the present invention, in a case where the grouped data contains the marks whose recording is started in the group, the searching data generation means generates, as searching data, a number assigned to a mark whose recording is first started among the marks, in a case where the grouped data contains no marks whose recording is started in the group, the searching data generation means generates, as searching data, information indicating the absence of marks whose recording is started in the group.

In another embodiment of the present invention, the searching data generation means generates, as searching data, a number assigned to the mark which is first recorded in the grouped data, and information indicating whether or not the mark which is first recorded in the grouped data is recorded continuing from a preceding grouped data.

Alternatively, the apparatus for recording and reproducing digital data of the present invention, comprises:

group conversion means for receiving input blocked data, arranging the blocked data in a predetermined order to generate grouped data, and outputting the grouped data;

control means for receiving a command input together with the input blocked data and generating a control signal and management data based on the command;

recording conversion means for receiving the grouped data and converting the grouped data into a recording signal, including:

data track generation means for arranging the grouped data into data tracks;

preamble track generation means for generating preamble tracks arranged preceding the data tracks;

postamble track generation means for generating postamble tracks arranged following the data tracks; and modulation means for receiving data arranged in track groups of the preamble tracks, the data tracks, and the postamble tracks, modulating the data arranged in track groups into a recording signal, and outputting the recording signal, recording means for receiving the recording signal and recording data represented by the recording signal on a record medium;

reproducing means for reproducing from the record medium a signal representing the data recorded on the record medium; and postamble track detection means for detecting postamble tracks previously recorded on the record medium based on the reproduced signal and generating a detecting signal, wherein the control means controls the recording conversion means based on the detecting signal, and making the recording conversion means start recording of the track groups in a position k tracks after a leading edge of the detected postamble tracks.

In one embodiment of the present invention, in a case where at least one successive grouped data is successively recorded, the postamble track generation means generates postamble tracks only after data tracks in a last group of the successive grouped data, and the preamble track generation means generates preamble tracks only before data tracks in a first group of the successive grouped data, in a case where the successive grouped data is recorded after being divided into subgroups, the postamble track generation means generates postamble tracks after data tracks of each subgroup, and the preamble track generation means generates preamble tracks before data tracks of each subgroup.

In another embodiment of the present invention, in a case where at least one successive grouped data is successively recorded, the postamble track generation means generates end data tracks as postamble tracks only after data tracks in a last group of the successive grouped data, and the preamble track generation means generates preamble tracks only before data tracks in a first group of the successive grouped data, in a case where the successive grouped data is recorded after being divided into subgroups, the postamble track generation means generates end data tracks as postamble tracks after data tracks in a last subgroup among the subgroups, and generates postamble tracks different from the end data tracks after data tracks of the subgroups other than the last subgroup, and the preamble track generation means generates preamble tracks before data tracks of each subgroup.

Alternatively, the apparatus for recording and reproducing digital data of the present invention, comprises:

group conversion means for receiving input blocked data, arranging the blocked data in a predetermined order to generate grouped data, and outputting the grouped data;

control means for receiving a command input together with the input blocked data and generating first management data and a control signal based on the command;

recording conversion means for receiving the grouped data output from the group conversion means and converting the grouped data into a recording signal based on the control signal;

recording means for receiving the recording signal and recording data represented by the recording signal on a record medium;

reproducing means for reproducing from the record medium a signal representing the data recorded on the record medium;

reproducing conversion means for converting the reproduced signal into grouped data; and group reverse conversion means for receiving the grouped data output from the reproducing conversion means and reconfiguring blocked data from the grouped data, wherein the control means generates a region control signal for setting at least one data region and management information region on the record medium, generates data region management information concerning the data region, with respect to each of the data region, generates record medium management information for managing the entire record medium, and generates a recording control signal for recording data in the data region and recording the record medium management information and the data region management information in the management information region.

In one embodiment of the present invention, the group conversion means comprises:

block management data generation means for receiving the management data from the control means and generating block management data with respect to the corresponding blocked data, the block management data having a variable-length and containing information concerning each blocked data;

group management data generation means for receiving the management data and generating group management data containing information concerning the entire grouped data; and grouped data generation means for selectively receiving the blocked data, the block management data, and the group management data, and the record medium management information and the data region management information given by the control means, arranging the blocked data, the block management data, and the group management data in a predetermined order to generate first grouped data, arranging the record medium management information and the data region management information in a predetermined order to generate second grouped data, and outputting the first and second grouped data based on the region control signal.

In another embodiment of the present invention, the recording conversion means comprises:

error-correction encoding means for performing error-correction encoding with respect to the first and second grouped data, respectively; and modulation means for modulating the error-corrected encoded first and second grouped data to generate the recording signal, and outputs the recording signal based on the recording control signal.

In another embodiment of the present invention, the reproducing conversion means comprises:

demodulation means for demodulating the reproduced signal and outputting the encoded first and second grouped data; and error-correction decoding means for receiving the encoded first and second grouped data and performing error-correction decoding with respect to the encoded first and second grouped data, respectively.

In another embodiment of the present invention, the group reverse conversion means comprises:

group management data extraction means for extracting group management data from the first grouped data;

block management data extraction means for extracting block management data from the first grouped data and the extracted group management data;

management information extraction means for extracting the record medium management information and the data region management information from the second grouped data;

block output control means for receiving the extracted block management data and group management data, determining the blocked data to be output based on the block management data and the group management data according to the control signal given by the control means, and generating a block control signal designating blocked data to be output; and blocked data separation means for receiving the grouped data and the block output control signal, separating blocked data designated by the block output control signal from the grouped data, and outputting the separated blocked data.

In another embodiment of the present invention, the record medium is accommodated in a housing having an auxiliary record medium, and the control means controls the recording means to record the first grouped data on the record medium and records the second grouped data on the auxiliary record medium.

In another embodiment of the present invention, the record medium is accommodated in a housing having an auxiliary record medium, and the control means controls the recording means to record the data region management information among the first grouped data and the second grouped data on the record medium and records the record medium management information among the second grouped data on the auxiliary record medium.

In another embodiment of the present invention, the record medium is accommodated in a housing having an auxiliary record medium, and the control means controls the recording means to record part of the data region management information among the first grouped data and the second grouped data on the record medium and records the remaining part of the data region management information and the record medium management information among the second grouped data on the auxiliary record medium.

According to another aspect of the present invention, the method for recording and reproducing digital data, comprises the steps of:

(a) arranging input blocked data in a predetermined order to generate grouped data;

(b) generating a control signal and management data based on a command input together with the input blocked data;

(c) converting the grouped data into a recording signal based on the control signal;

(d) recording data represented by the recording signal on a record medium;

(e) reproducing from the record medium a signal representing the data recorded in the record medium;

(f) converting the reproduced signal into grouped data; and (g) reconfiguring blocked data from the grouped data, wherein step (a) includes the steps of:

(a1) generating block management data for the corresponding blocked data based on the management data, the block management data having a variable-length and containing information concerning each blocked data;

(a2) generating group management data containing information concerning the entire grouped data based on the management data; and (a3) generating grouped data by arranging the blocked data, the block management data, and the group management data in a predetermined order.

In one embodiment of the present invention, step (g) comprises the steps of:

(g1) extracting group management data from the grouped data;

(g2) extracting block management data from the grouped data and the extracted group management data;

(g3) determining the blocked data to be output based on the block management data and the group management data according to the control signal, and generating a block output control signal designating the blocked data to be output; and (g4) separating blocked data designated by the block output control signal from the grouped data, and generating the separated blocked data to be output.

Alternatively, the method for recording and reproducing digital data of the present invention, comprises the steps of:

(a) arranging input blocked data in a predetermined order to generate grouped data;

(b) generating a control signal and management data based on a command input together with the input blocked data;

(c) converting the grouped data into a recording signal based on the control signal;

(d) recording data represented by the recording signal on a record medium;

(e) reproducing from the record medium a signal representing the data recorded on the record medium;

(f) converting the reproduced signal into grouped data; and (g) reconfiguring blocked data from the grouped data, wherein the step (a) includes the steps of:

(a1) transforming the blocked data and generating recording blocked data;

(a2) generating block management data for recording blocked data, the block management data having a variable-length and containing information concerning the recording blocked data and the blocked data;

(a3) generating group management data containing information concerning the entire grouped data based on the recording blocked data and the management data; and (a4) generating grouped data by arranging the recording blocked data, the block management data, and the group management data in a predetermined order.

In one embodiment of the present invention, step (g) comprises the steps of:

(g1) extracting group management data from the grouped data;

(g2) extracting block management data from the grouped data and the extracted group management data;

(g3) determining blocked data to be output and recording blocked data containing the blocked data to be output based on the extracted block management data and group management data in accordance with the control signal, and generating block output control signal designating the blocked data to be output, a block separating signal designating the recording blocked data related to the blocked data to be output, and an inverse transformation instructing signal instructing inverse transformation from the recording blocked data to the blocked data;

(g4) separating the recording blocked data designated by the block separating signal from the grouped data, and generating the separated recording blocked data; and (g5) inverse-transforming the recording blocked data into the blocked data based on the inverse transformation instructing signal, and generating the blocked data designated by the block output control signal.

In another embodiment of the present invention, in step (a), each blocked data and the corresponding block management data are arranged adjacent to each other in each grouped data.

In another embodiment of the present invention, in step (a), the group management data, the block management data, and the blocked data contained in each grouped data are arranged so that:

a leading edge of the group management data is placed in a predetermined position in the grouped data;

the blocked data are successively arranged from a leading edge of the grouped data, except for a portion where the group management data has been placed; and the block management data are successively arranged after all of the arranged blocked data, except for a portion where the group management data has been placed, in accordance with an order in which the corresponding blocked data are arranged.

In another embodiment of the present invention, in step (a), the group management data, the block management data, and the blocked data contained in each grouped data are arranged so that:

a leading edge of the group management data is placed in a predetermined position in the grouped data;

the block management data are successively arranged from a leading edge of the grouped data, except for a portion where the group management data has been placed; and the blocked data are successively arranged from a trailing edge of the grouped data, except for a portion where the group management data has been placed, in accordance with an order in which the corresponding block management data are arranged.

In another embodiment of the present invention, in step (a), the group management data, the block management data, and the blocked data contained in each grouped data are arranged so that:

a leading edge of the group management data is placed in a predetermined position in the grouped data;

the blocked data are successively arranged from a leading edge of the grouped data, except for a portion where the group management data has been placed; and the block management data are successively arranged from a trailing edge of the grouped data, except for a portion where the group management data has been placed, in accordance with an order in which the corresponding blocked data are arranged.

In another embodiment of the present invention, step (c) comprises the steps of:

first error-correction encoding means for performing error-correction encoding with respect to the grouped data;

searching data generation means for generating searching data based on management data given by the control circuit;

second error-correction encoding means for performing error-correction encoding with respect to the searching data; and modulation means for modulating the error-corrected encoded grouped data and the error-corrected encoded searching data to generate the recording signal.

In another embodiment of the present invention, step (f) comprises the steps of:

(f1) demodulating the reproducing signal to generate the encoded grouped data and the encoded searching data;

(f2) performing error-correction decoding with respect to the encoded grouped data;

(f3) performing error-correction decoding with respect to the encoded searching data; and (f4) extracting searching data of a group from the error-corrected decoded searching data.

In another embodiment of the present invention, in step (a1), specific different numbers are assigned to the respective block management data.

In another embodiment of the present invention, in step (a1), successive numbers are assigned to the respective block management data in an order in which the blocked data are input.

In another embodiment of the present invention, in step (f1), in a case where the grouped data contains the blocked data whose recording is started in the group, the searching data is generated to be a number assigned to blocked data whose recording is first started among the blocked data, in a case where the grouped data contains no blocked data whose recording is started in the group, the searching data is generated to be information indicating the absence of blocked data whose recording is started in the group.

In another embodiment of the present invention, in step (f4), the searching data is generated to include a number assigned to the blocked data which is first recorded in the grouped data, and information indicating whether or not the blocked data which is first recorded in the grouped data is recorded continuing from a preceding grouped data.

In another embodiment of the present invention, step (a1) further comprises the step of generating block management data for marks, the marks being input together with the input blocked data, and the block management data for each mark having a number indicating an order in which the marks are input.

In another embodiment of the present invention, in step (f4), in a case where the grouped data contains the marks whose recording is started in the group, the searching data is generated to be a number assigned to a mark whose recording is first started among the marks, in a case where the grouped data contains no marks whose recording is started in the group, the searching data is generated to be information indicating the absence of marks whose recording is started in the group.

In another embodiment of the present invention, in step (f4), the searching data is generated to include a number assigned to the mark which is first recorded in the grouped data, and information indicating whether or not the mark which is first recorded in the grouped data is recorded continuing from a preceding grouped data.

Alternatively, the method for recording and reproducing digital data of the present invention, comprises the steps of:

(a) arranging input blocked data in a predetermined order to generate grouped data;

(b) generating a control signal and management data based on a command input together with the input blocked data;

(c) converting the grouped data into a recording signal, step (c) including:

(c1) arranging the grouped data into data tracks;

(c2) generating preamble tracks arranged preceding the data tracks;

(c3) generating postamble tracks arranged following the data tracks; and (c4) modulating the data arranged in track groups of the preamble tracks, the data tracks, and the postamble tracks into a recording signal, (d) recording data represented by the recording signal on a record medium;

(e) reproducing from the record medium a signal representing the data recorded on the record medium;

(f) detecting postamble tracks previously recorded on the record medium based on the reproduced signal and generating a detecting signal; and (g) controlling the steps (c1) to (c4) based on the detecting signal, and making recording of the track groups start in a position k tracks after a leading edge of the detected postamble tracks.

In one embodiment of the present invention, in a case where at least one successive grouped data is successively recorded, in step (c3), the postamble tracks are generated only after data tracks in a last group of the successive grouped data, and in step (c2), the preamble tracks are generated only before data tracks in a first group of the successive grouped data, in a case where the successive grouped data is recorded after being divided into subgroups, in step (c3), the postamble tracks are generated after data tracks of each subgroup, and in step (c2), the preamble tracks are generated before the data tracks of each subgroup.

In another embodiment of the present invention, in a case where at least one successive grouped data is successively recorded, in step (c3), the end data tracks are generated as the postamble tracks only after data tracks in a last group of the successive grouped data, and in step (c2), the preamble tracks are generated only before the data tracks in a first group of the successive grouped data, in a case where the successive grouped data is recorded after being divided into subgroups, in step (c3), end data tracks are generated as the postamble tracks after data tracks in a last subgroup among the subgroups, and postamble tracks which are different from the end data tracks are generated after the data tracks of the subgroups other than the last subgroup, and in step (c2), the preamble tracks are generated before the data tracks of each subgroup.

Alternatively, the method for recording and reproducing digital data, comprises the steps of:

(a) arranging input blocked data in a predetermined order to generate grouped data, and outputting the grouped data;

(b) generating first management data and a control signal based on a command input together with the input blocked data;

(c) converting the grouped data into a recording signal based on the control signal;

(d) recording data represented by the recording signal on a record medium;

(e) reproducing from the record medium a signal representing the data recorded on the record medium;

(f) converting the reproduced signal into grouped data; and (g) reconfiguring blocked data from the grouped data, wherein step (b) includes the steps of;

(b1) generating a region control signal for setting at least one data region and management information region on the record medium, (b2) generating data region management information concerning the data region, with respect to each of the data region, (b3) generating record medium management information for managing the entire record medium, and (b4) generating a recording control signal for recording data in the data region and recording the record medium management information and the data region management information in the management information region.

In one embodiment of the present invention, step (a) comprises the steps of:

(a1) generating block management data with respect to the corresponding blocked data, the block management data having a variable-length and containing information concerning each blocked data;

(a2) generating group management data containing information concerning the entire grouped data; and (a3) arranging the blocked data, the block management data, and the group management data in a predetermined order to generate first grouped data, (a4) arranging the record medium management information and the data region management information in a predetermined order to generate second grouped data, and (a5) selectively outputting one of the first and second grouped data based on the region control signal.

In another embodiment of the present invention, step (c) comprises the steps of:

(c1) performing error-correction encoding with respect to the first and second grouped data; and (c2) modulating the error-corrected encoded first and second grouped data to generate the recording signal based on the recording control signal.

In another embodiment of the present invention, step (f) comprises the steps of:

(f1) demodulating the reproduced signal to generate the encoded first and second grouped data; and (f2) performing error-correction decoding with respect to the encoded first and second grouped data.

In another embodiment of the present invention, step (g) comprises the steps of:

(g1) extracting group management data from the first grouped data;

(g2) extracting block management data from the first grouped data and the extracted group management data;

(g3) extracting the record medium management information and the data region management information from the second grouped data;

(g4) determining the blocked data to be output based on the block management data and the group management data according to the control signal, and generating a block control signal designating blocked data to be output; and (g5) separating blocked data designated by the block output control signal from the grouped data, and generating the separated blocked data.

In another embodiment of the present invention, the record medium is accommodated in a housing having an auxiliary record medium, step (e) comprises the step of (e1) recording data on the auxiliary record medium, and step (b) comprises step of controlling step (e1) to record the first grouped data on the record medium and to record the second grouped data on the auxiliary record medium.

In another embodiment of the present invention, the record medium is accommodated in a housing having an auxiliary record medium, step (e) comprises the step of (e1) recording data on the auxiliary record medium, and step (b) comprises the step of controlling step (e1) to record the data region management information among the first grouped data and the second grouped data on the record medium and to record the record medium management information among the second grouped data on the auxiliary record medium.

In another embodiment of the present invention, the record medium is accommodated in a housing having an auxiliary record medium, step (e) comprises the step of (e1) recording data on the auxiliary record medium, and step (b) comprises the step of controlling the step (e1) to record part of the data region management information among the first grouped data and the second grouped data on the record medium and to record the remaining part of the data region management information and the record medium management information among the second grouped data on the auxiliary record medium.

Thus, the invention described herein makes possible the advantage of providing an apparatus for recording and reproducing a digital signal, capable of recording data with efficiency and searching for data at a high velocity, and a method for the same.

This and other advantages of the present invention will become apparent to those skilled in the art upon reading and understanding the following detailed description with reference to the accompanying figures.

BRIEF DESCRIPTION OF THE DRAWINGS

FIGS. 20A to 20D illustrate methods for searching a desired block.

FIG. 26 shows the word structure of the record medium management information and partition management information.

FIGS. 36A to 36D show the patterns of track groups recorded in the conventional DDS format.

DESCRIPTION OF THE PREFERRED EMBODIMENTS

The entire disclosure of U.S. patent application parent application Ser. No. 08/280,598, filed Jul. 26, 1994 is expressly incorporated by reference herein.

Hereinafter, the present invention will be described by way of illustrative embodiments with reference to the accompanying drawings.

Embodiment 1

Figure 1:
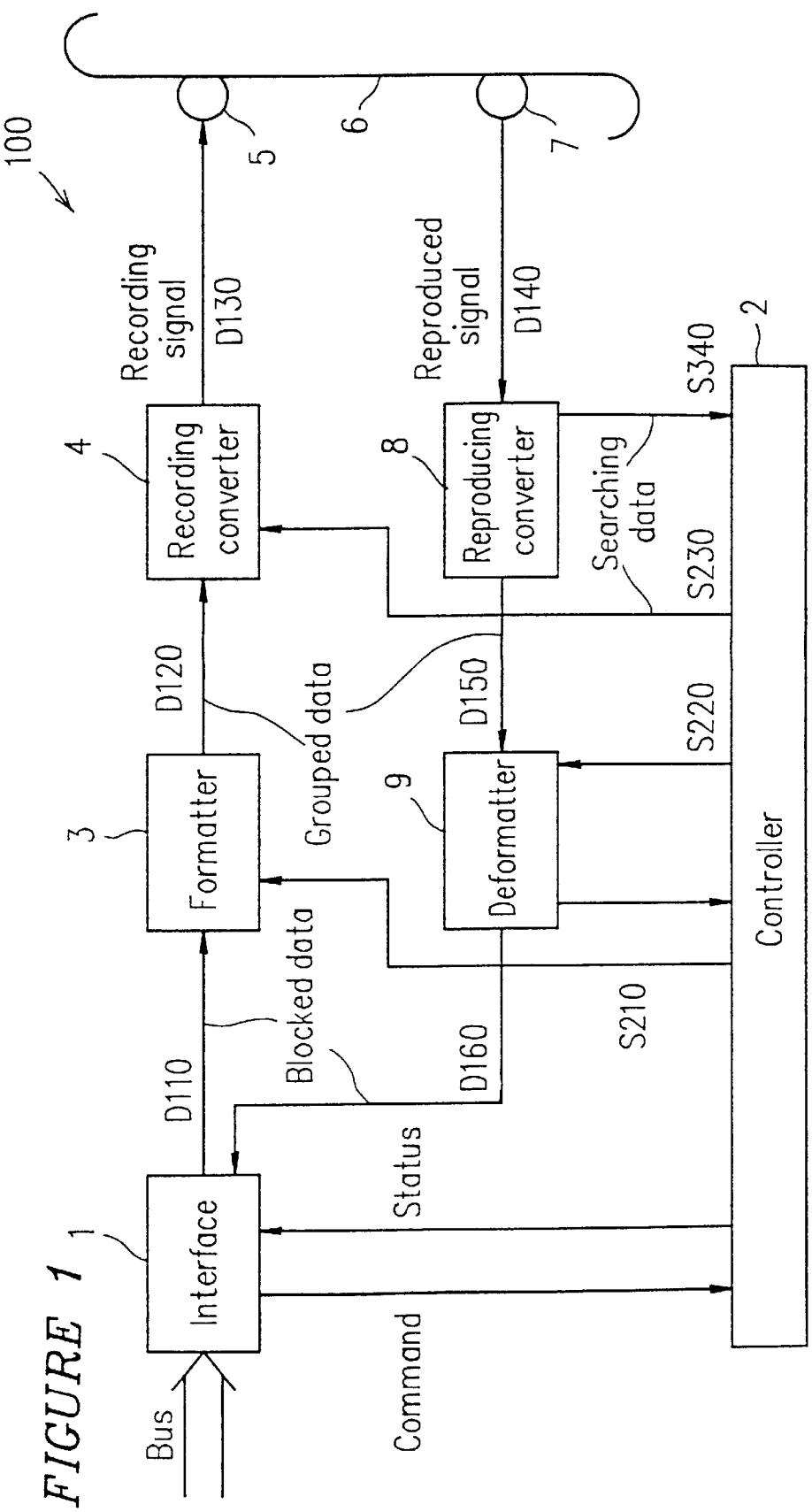
FIG. 1 is a block diagram showing an apparatus for recording and reproducing digital data in Embodiment 1 according to the present invention.

FIG. 1 is a block diagram showing an apparatus 100 for recording and reproducing digital data in Embodiment 1.

The apparatus 100 for recording and reproducing digital data includes an interface 1, a controller 2, a formatter (group conversion circuit) 3, a recording converter 4, a recording head 5, a reproducing head 7, a reproducing converter 8, and a deformatter (group reverse conversion circuit) 9. The interface 1 receives a command and blocked data input from a host such as a computer. The controller 2 generates various kinds of control signals and management data based on the input command to control each portion of the apparatus 100. The formatter 3 arranges the input blocked data in a predetermined order to form grouped data. The recording converter 4 converts the grouped data into a recording signal. The recording head 5 records data representing the recording signal on a magnetic tape 6. The reproducing head 7 reproduces a signal from the magnetic tape 6. The reproducing converter 8 converts the reproduced signal into grouped data. The deformatter 9 (group reverse conversion circuit) reconfigures blocked data from the grouped data output from the reproducing converter 8.

The command and blocked data are input to the interface 1 through a general bus of a small computer system interface (SCSI) or the like. The interface 1 performs negotiation, control, and the like of the bus. When data is input and recorded, the interface 1 outputs the command to the controller 2 and outputs blocked data D110 to the formatter 3. When data is reproduced and output, blocked data D160 input from the deformatter 9 and a status such as the condition of equipment input from the controller 2 are supplied to the interface 1 and output therefrom through the bus. The controller 2 generates a control signal for performing various controls required for recording or reproducing data. As described later, the controller 2 also generates data for searching and data and information for managing data and a record medium.

The data input from the host is recorded on a magnetic tape (record medium) by the apparatus 100 for recording and reproducing digital data as follows:

First, a Write Block command for instructing the recording of data is input to the bus, and blocked data is input as data to be recorded. The interface 1 outputs the Write Block command to the controller 2 and outputs the blocked data to the formatter 3. The controller 2 generates management data S210 for managing data based on the input command and outputs the management data S210 to the formatter 3.

As described below, the formatter 3 arranges the input blocked data D110 and the management data S210 in a predetermined order to generate grouped data D120. The grouped data D120 is then output to the recording converter 4.

Figure 2:
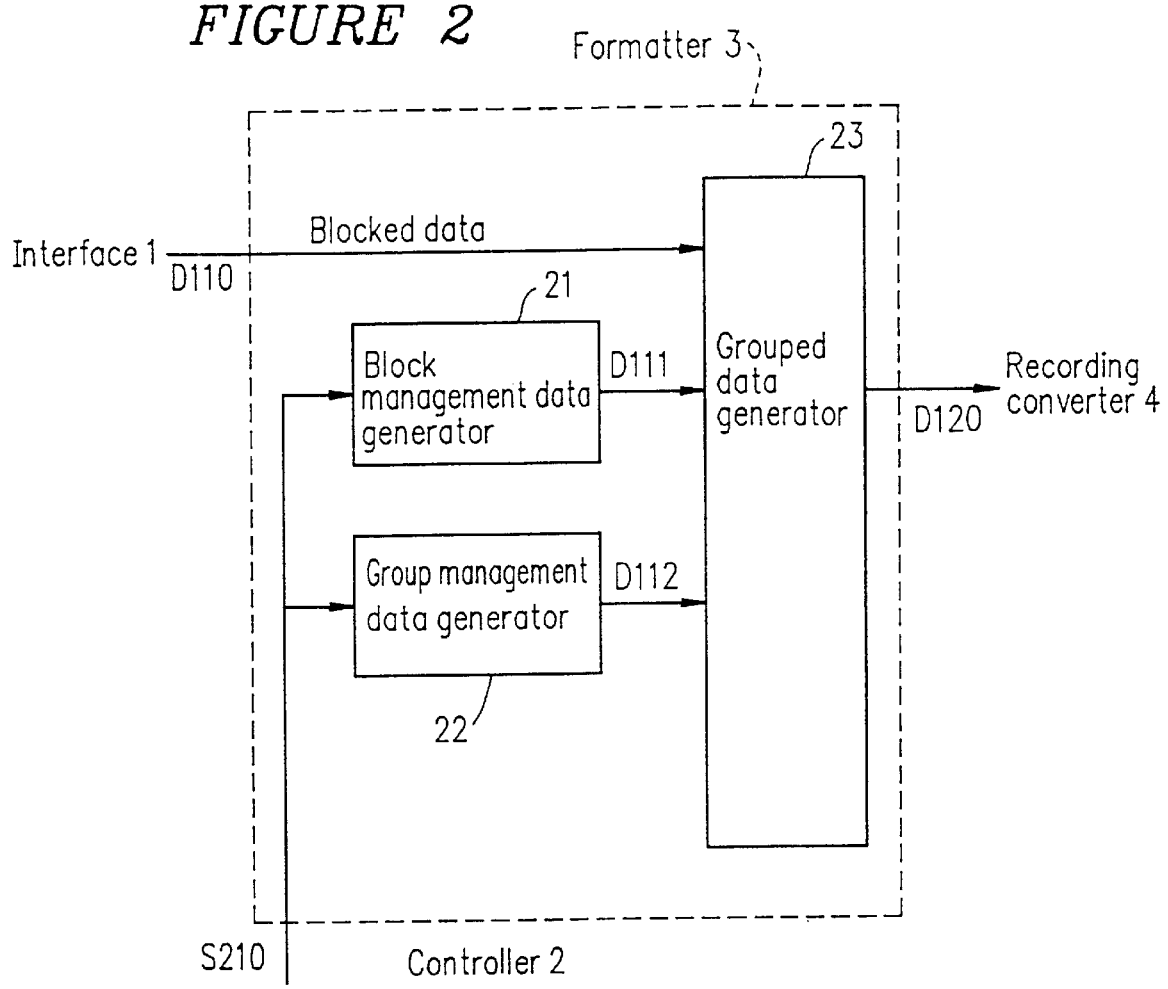
FIG. 2 is a diagram schematically showing the construction of a formatter.

FIG. 2 schematically shows the construction of the formatter 3. The formatter 3 includes a block management data generator 21, a group management data generator 22, and a grouped data generator 23. The grouped data generator 23 has a memory for storing data of at least two groups and an address generator.

The management data S210 containing information indicating the size of a block (and a mark described later) is given from the controller 2 to the block management data generator 21. The block management data generator 21 generates block management data D112 containing information concerning each blocked data, based on the management data S210. The block management data D111 has a variable-length and is generated for the respective blocked data. The group management data generator 22 generates group management data D112 containing information concerning the entire grouped data (e.g., the number of blocks and marks, etc.), based on the management data S210 given by the controller 2. In the present embodiment, the group management data is fixed-length data; however, the group management data can be variable-length data as long as it contains information indicating the length of the group management data itself.

The grouped data generator 23 receives the blocked data D110, the block management data D111, and the group management data D112 and arranges these data in a predetermined order to generate grouped data D120. The block length is variable and the group length is fixed. Thus, any number of blocked data can be assigned in one grouped data. In some cases, one grouped data contains only a part of the blocked data.

The recording converter 4 performs the error-correction encoding and modulation with respect to the grouped data D120 input from the formatter 3 to generate a recording signal D130. The recording signal D130 is output to the recording head 5. The recording head 5 records data represented by the recording signal D130 on the magnetic tape 6.

The data recorded on the magnetic tape 6 is reproduced by the apparatus 100 for recording and reproducing digital data as follows:

First, a Read Block command for instructing the reproduction of data is input to the bus. The interface 1 outputs the Read Block command to the controller 2. In response to a control signal (not shown) given by the controller 2, the reproducing head 7 reproduces a signal D140 representing the recorded data from the magnetic tape 6. The reproduced signal D140 is given to the reproducing converter 8. The reproducing converter 8 demodulates the reproduced signal D140 and performs the error-correction decoding to output grouped data D150 to the deformatter 9.

The deformatter 9 rearranges the blocks using the block management data and the group management data contained in the grouped data D150 to generate blocked data D160.

Figure 3:
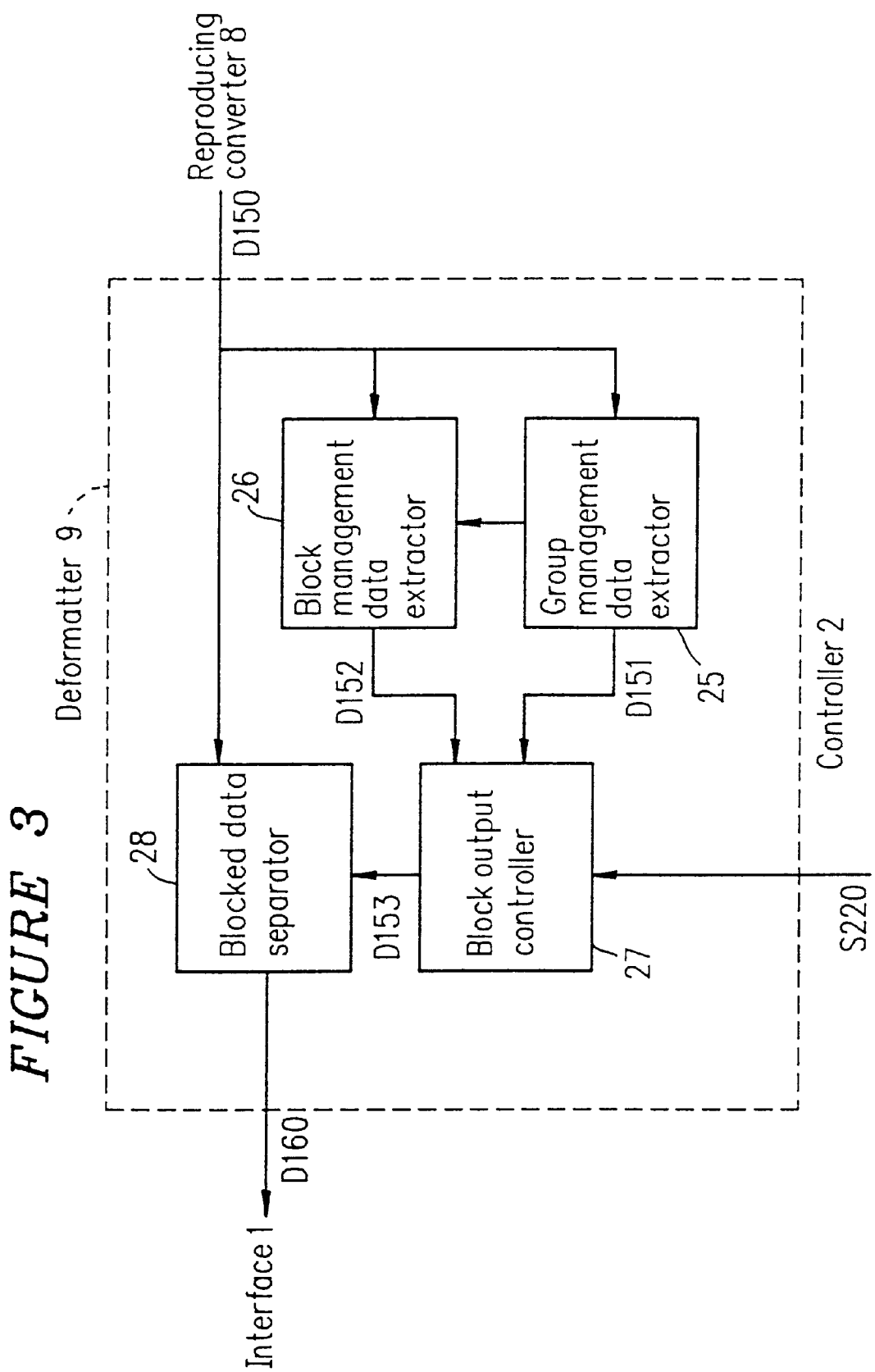
FIG. 3 is a diagram schematically showing the construction of a deformatter in Embodiment 1 according to the present invention.

FIG. 3 schematically shows the construction of the deformatter 9. The deformatter 9 includes a group management data extractor 25, a block management data extractor 26, a block output controller 27, and a blocked data separator 28.

The group management data extractor 25 extracts group management data D151 contained in the grouped data D150 and outputs it to the block management data extractor 26 and the block output controller 27. The block management data extractor 26 extracts block management data D152 from the grouped data D150 and the extracted group management data D151 and outputs it to the block output controller 27. The block output controller 27 calculates the addresses of blocks in the grouped data to judge each blocked data, based on the received block management data D152 and the group management data D151. Then, the block output controller 27 generates a block control signal D153 designating a block to be output and outputs it to the blocked data separator 28, based on a control signal (timing signal) S220 given by the controller 2. The blocked data separator 28 separates the block designated by the block output control signal D153 from the grouped data D150 and outputs blocked data D160 to the interface 1.

In the case where grouped data is not present in the deformatter 9, or in the case where subsequent grouped data is further required, the subsequent grouped data is reproduced by the reproducing head 7 from the magnetic tape 6.

The interface 1 outputs the blocked data D160 through the bus.

As described above, in the case where the Read Block command is input, the apparatus 100 successively reproduces data recorded on the magnetic tape 6. When the reproducing order is changed or jumped, a Space Block command is input through the bus. By designating a position relative to the present block position by the Space Block command, the position of the block to be reproduced can be moved.

Hereinafter, the operation of block searching in the apparatus 100 will be described.

When grouped data is recorded, the controller 2 outputs information for blocks contained in a group to the recording converter 4 as management data for searching S230. The recording converter 4 generates the recording signal D130 for recording searching data on the magnetic tape 6 together with the grouped data D120 given by the formatter 3. The management data for searching S230 contains block numbers, group numbers, etc.

Figure 4:
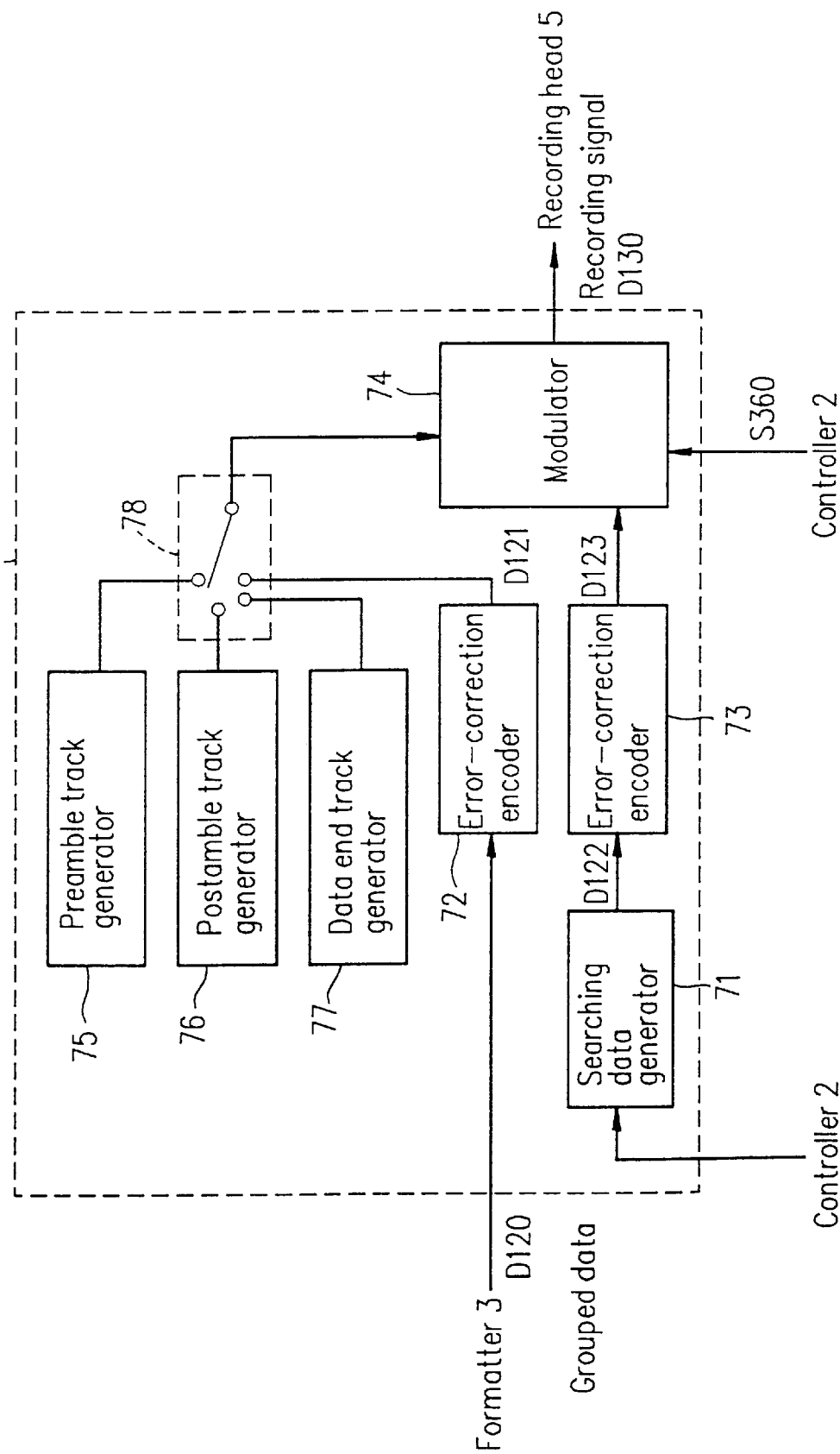
FIG. 4 is a diagram schematically showing the construction of a recording converter in Embodiment 1 according to the present invention.

FIG. 4 schematically shows the construction of the recording converter 4. The recording converter 4 includes a searching data generator 71, first and second error-correction encoders 72 and 73, and a modulator 74. The first error-correction encoder 72 performs the error-correction encoding with respect to the grouped data D120 input from the formatter 3 and outputs grouped data D121. The searching data generator 71 generates searching data D122, based on the management data for searching S230 given by the controller 2. The second error-correction encoder 73 outputs a signal obtained by performing the error-correction encoding with respect to the searching data D122 to the modulator 74. The modulator 74 modulates the received grouped data D121 and the searching data D123, based on a control signal S360 given by the controller 2. Then, the modulator 74 generates the recording signal D130 and outputs it to the recording head 5. Elements of the recording converter 4, which are shown in FIG. 4 but are not herein referred to, will be described later.

Searching for blocks is conducted as follows:

Upon receiving the Space Block command through the bus, the interface 1 outputs the Space Block command to the controller 2. The controller 2 moves the magnetic tape 6 in accordance with the Space Block command and simultaneously controls the reproducing head 7 to reproduce the signal D140 representing recorded data from the magnetic tape 6. The reproduced signal D140 is given to the reproducing converter 8. The reproducing converter 8 demodulates the reproduced signal D140 and performs the error-correction decoding with respect thereto.

Figure 5:
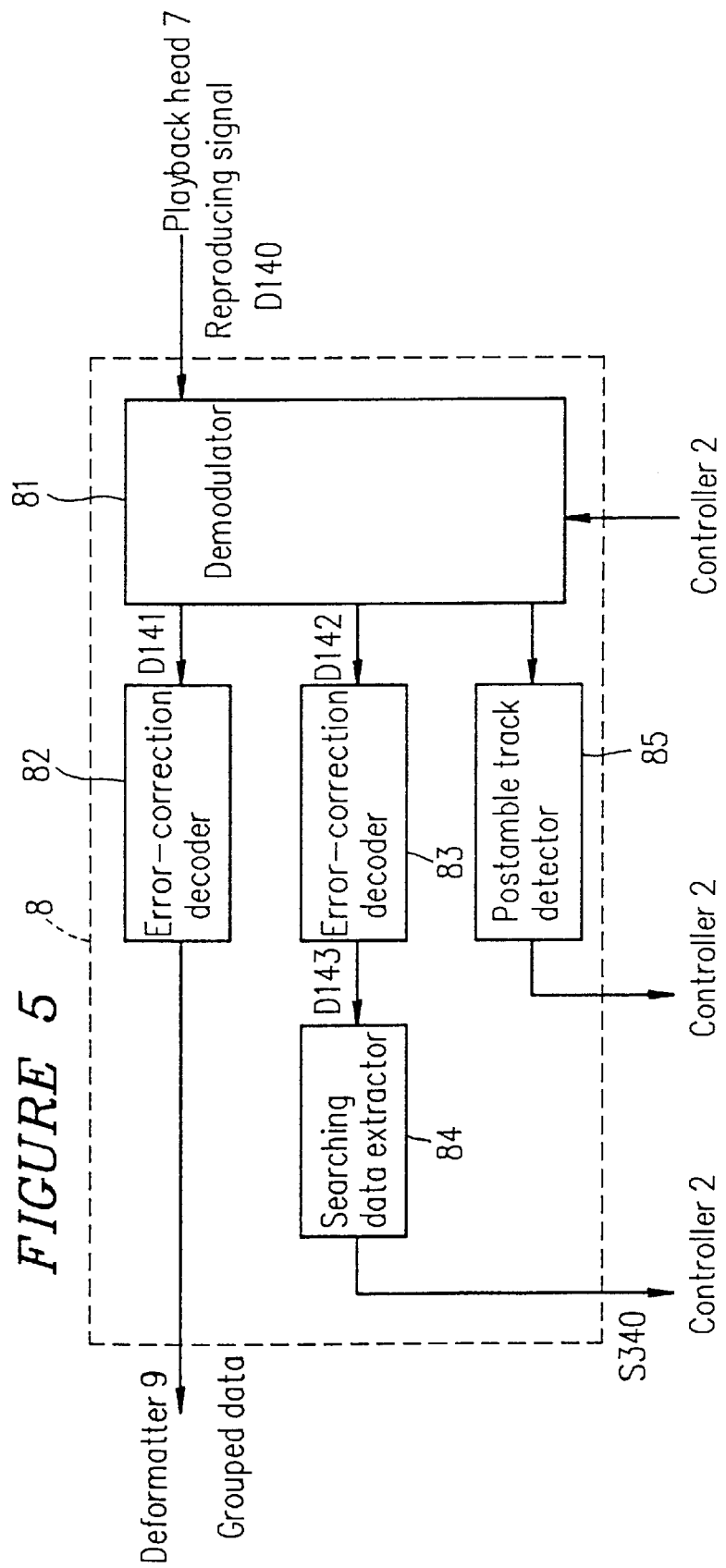
FIG. 5 is a diagram schematically showing the construction of a reproducing converter in Embodiment 1 according to the present invention.

The reproducing converter 8 extracts searching data contained in the grouped data D150 and outputs it to the controller 2 as follows:

FIG. 5 schematically shows the construction of the reproducing converter 8. The reproducing converter 8 includes a demodulator 81, first and second error-correction decoders 82 and 83, and a searching data extractor 84. A postamble track detector 85 will be described in Embodiment 5.

The demodulator 81 demodulates the reproducing signal D140 to generate encoded grouped data D141 and encoded searching data D142 and outputs them to the first and second error-correction decoders 82 and 83, respectively. The first error-correction decoder 82 receives the grouped data D141, performs the error-correction decoding with respect thereto, and outputs it to the deformatter 9. The second error-correction decoder 83 receives the encoded searching data D143, performs the error-correction decoding with respect thereto, and outputs it to the searching data extractor 84. The searching data extractor 84 extracts searching data concerning blocks contained in a group from the error-correction decoded searching data D143 and outputs the searching data S340 to the controller 2.

The controller 2 compares information concerning the blocks of the input searching data S340 with a command and moves the magnetic tape 6 so that the position of a desired block is input.

In the host, for indicating delimitation or an area of data and the like, marks for searching can be recorded together with the blocked data. A predetermined block can be found by searching for these marks. Hereinafter, recording of marks and searching data using the marks will be described.

Among a series of blocked data, a Write Mark command is input in a position in which mark data is to be recorded. Upon receiving the Write Mark command through the bus, the interface 1 outputs the Write Mark command to the controller 2. The controller 2 outputs management data (mark data) indicating marks to the formatter 3 in accordance with the Write Mark command. The formatter 3 arranges the mark data in block management data in the order in which the mark data is input to generate the grouped data D120.

The controller 2 generates information for the mark data contained in the grouped data D120 as searching data and outputs it to the recording converter 4. The recording converter 4 converts the searching data containing information for the mark data into a recording signal together with the grouped data D120. Accordingly, marks are recorded on the magnetic tape 6.

The marks can be searched by inputting a Space Mark command to the bus. Upon receiving the Space Mark command through the bus, the interface 1 outputs the Space Mark command to the controller 2. The controller 2 moves the magnetic tape 6 in accordance with the Space Mark command and simultaneously controls the reproducing head 7 to reproduce the signal D140 representing data from the magnetic tape 6. The reproduced signal D140 is given to the reproducing converter 8. The reproducing converter 8 demodulates the reproduced signal D140 and performs the error-correction decoding with respect thereto.

In the same way as described above, the reproducing converter 8 extracts searching data indicating marks contained in the grouped data D150 and outputs it to the controller 2. The controller 2 compares information for the marks of the input searching data with a command and moves the magnetic tape 6 so that the position of a desired mark is input.

Figure 6:
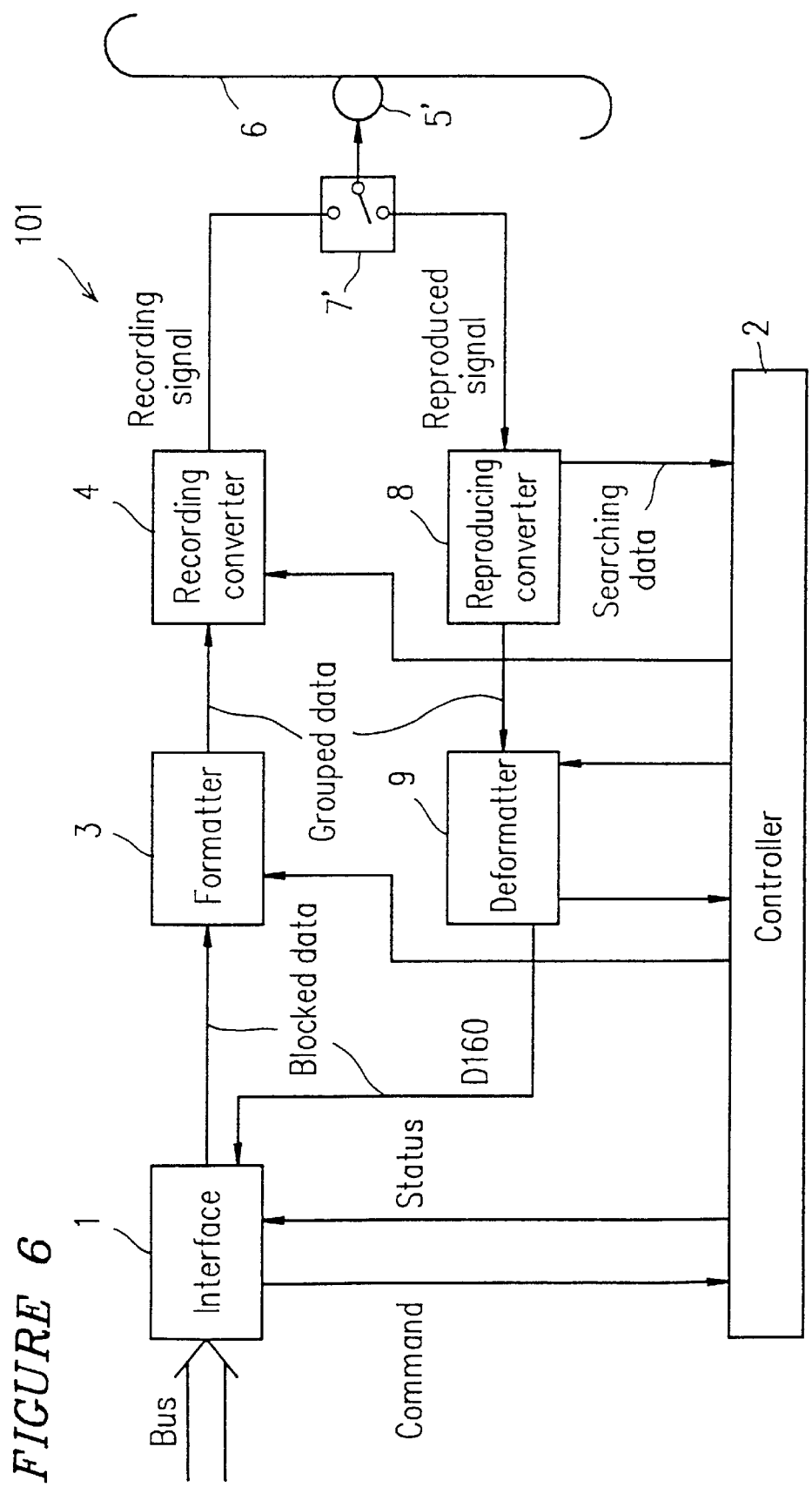
FIG. 6 is a block diagram showing another apparatus for recording and reproducing digital data in Embodiment 1 according to the present invention.

In the above description, the recording head 5 and the reproducing head 7 are separately provided. As in the apparatus 101 for recording and reproducing digital data shown in FIG. 6, a switch 7' may be provided so as to enable one head 5' to record and reproduce data.

Hereinafter, the pattern of data to be recorded on the magnetic tape 6 by the apparatus 100 will be described.

Figure 7:
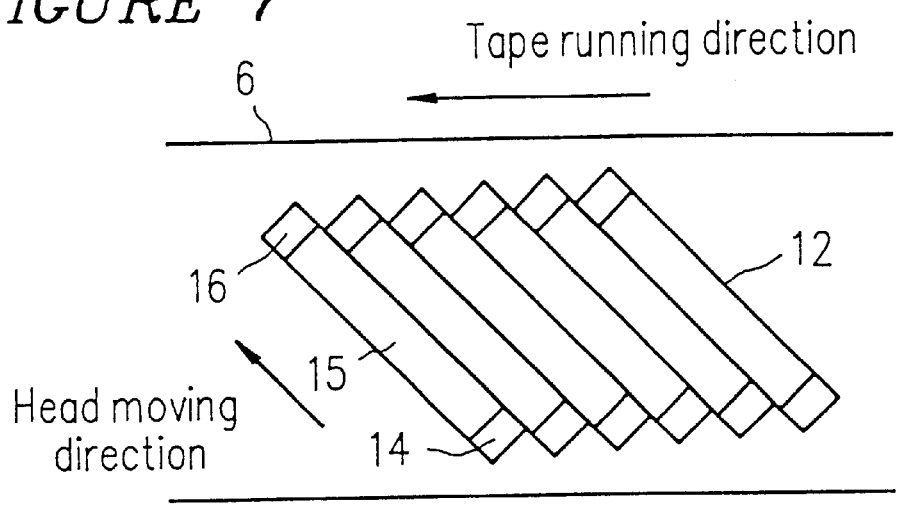
FIG. 7 is a diagram showing data tracks on the magnetic tape, recorded by an apparatus for recording and reproducing digital data.
Figure 8:
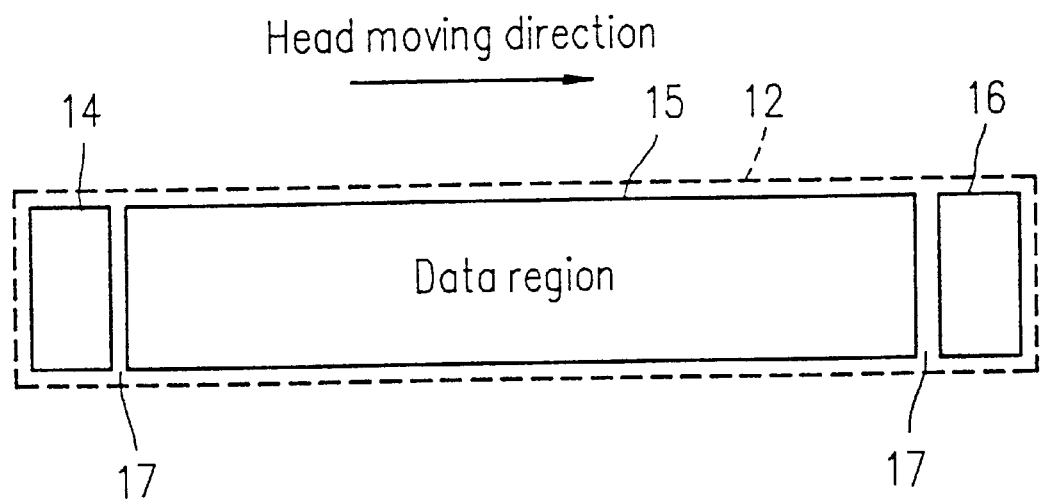
FIG. 8 shows a pattern of each data track.

As shown in FIG. 7, tracks 12 are formed on the magnetic tape 6 by the recording head 5. FIG. 8 shows the pattern of each data track. Each track 12 has a tracking information region 14, a data region 15, and a searching data region 16. A gap 17 is provided between the respective regions. In the tracking region 14, information for the head to exactly trace the center of the track 12, i.e., information for recognizing the position of the head in the track 12 is assigned. In the data region 15, data is assigned. In the searching data region 16, searching data is assigned. Information recorded in the searching data region 16 is reproducible even during searching at a high velocity. The searching data region is also called a subcode region. The gap 17 is a buffering area used for insert recording.

In the apparatus for recording and reproducing digital data in the present embodiment, data is processed per group, and one grouped data is assigned to m tracks 12 (m is a positive integer).

As has been described before, the formatter 3 arranges the input block data, block management data, group management data, and mark data in a predetermined order to generate grouped data. In the present embodiment, the grouped data is fixed-length data, and the blocked data is variable-length data.

Figure 9:
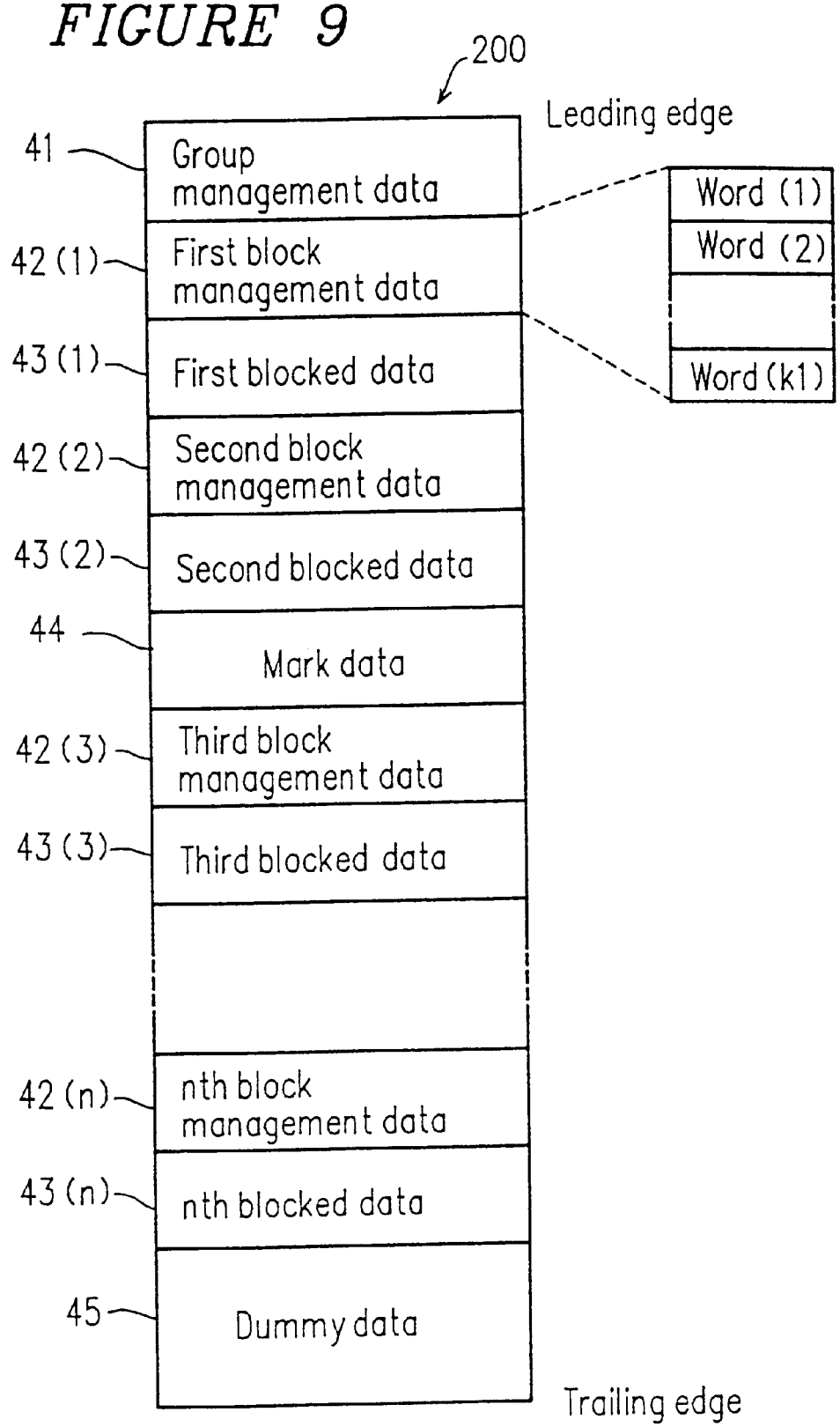
FIG. 9 is a diagram showing an example of a method for formatting one grouped data from n blocked data.

FIG. 9 is a diagram showing an example for formatting one grouped data from n blocked data.

Group management data 41 is assigned with information indicating the position number (address) of the grouped data and information concerning the grouped data such as the number of blocked data contained in the grouped data. Here, the position number of the grouped data is determined relative to the leading edge of the magnetic tape 6 or from a specific position thereof. The leading edge of the group management data 41 is placed in a specific position in the grouped data. The length of the group management data 41 may be variable as long as the group management data 41 includes information for finding the length of the group management data 41.

In the example of a format shown in FIG. 9, the group management data 41 is placed in the leading region of the grouped data 200. In the grouped data 200, the blocked data 43(i) and block management data 42(i) corresponding to blocked data 43(i) are arranged so as to be adjacent to each other. Herein, i represents the i-th blocked data or i-th block management data corresponding thereto ($1 \leq i \leq n$) in the grouped data 200. The block management data 42(i) is assigned with information indicating the block length of the corresponding blocked data 43(i) and the attribute thereof.

For recording marks, mark data 44 is recorded so as to be inserted in the sequence of blocked data to be recorded, in accordance with the positions where the marks are inserted among the input blocked data. In the case of the grouped data 200 shown in FIG. 9, the mark data 44 is recorded between the second blocked data 43(2) and the third blocked data 43(3). No information is assigned to dummy data 45. The dummy data 45 occurs when the recording region assigned to the grouped data 200 is not made the most use of.

In the above embodiment, each block management data 42(i) has information of length x(i) of the blocked data 43(i). However, the information may be the combined length of the blocked data 43(i) and the block management data 42(i). Alternatively, the information may be the start position of the block management data 42(i+1) (in this case, the block management data 42(n) will have information indicating the start position of the dummy data 45). Furthermore, it can be considered that the first or last recorded blocked data in one group is assigned across two adjacent grouped data. Information indicating such a condition can be assigned to the group management data 41, the block management data 42(1) and 42(n).

Figure 10:
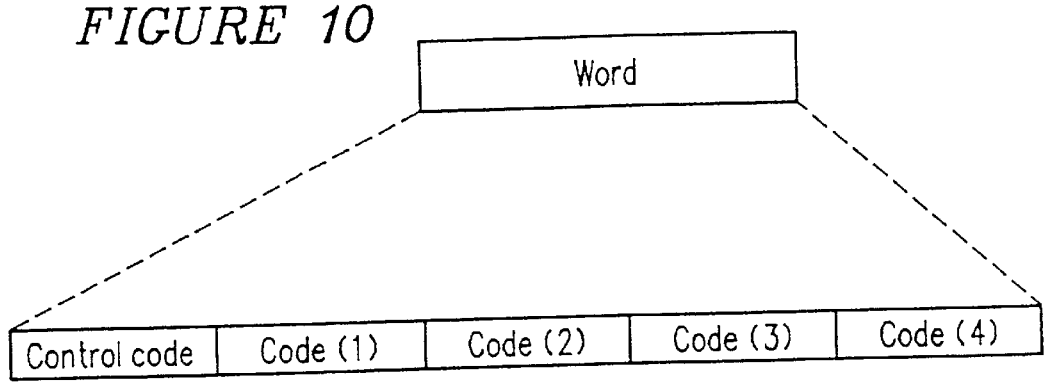
FIG. 10 is a diagram showing an example of a method for forming one word configuring block management data.

The block management data 42(i) are respectively composed of k(i) ($1 \leq i \leq n$) words. FIG. 10 is a diagram showing an example for forming one word for configuring block management data.

As shown in FIG. 10, one word is composed of one symbol of control code and four symbols of codes. One symbol corresponds to one byte. The control code is a pattern prescribing the information represented by the word, and code (1), code (2), code (3), and code (4) are contents of the information represented by the control code. An example of the correspondence between the control code and the contents represented by the codes is shown in Table 1.

TABLE 1

| Control code: | Contents of codes |
| --- | --- |
| 00h | Length of blocked data |
| . | |
| . | |
| . | |
| 10h | Mark flag |
| 80h | Compression method |
| 81h | Blocked data before compression |
| 82h | Length of blocked data before compression |
| . | |
| . | |
| . | |
| 90h | Encoding method |
| 91h | Key to encoding |
| . | |
| . | |
| . | |
| A0h | Type of tape |
| A1h | Length of tape |
| . | |
| . | |
| . | |
| B0h | Partition number |
| B1h | Start position of partition |
| B2h | End position of partition |
| B3h | End position of data |
| . | |
| . | |
| . | |
| f0h | Reserve |
| ffh | Delimiter |

The word having a control code of 00h is information required for the entire blocked data. Therefore, when the word having a control code of 00h is used as the last word ki of each block management data 42(i) ($1 \leq i \leq n$), the block management data 42(i) can be delimited by this word. The number of blocked data can be shown by placing the word having a control code of 00h and having blocked data length of 0 right after the blocked data 43(n).

The words except for the word (1) can be assigned in an arbitrary order in each block management data 42(i). Depending upon the contents of the words, two or more words having the same control code may appear in one block management data. In such a case, if the order of these words is not given as a code, it is required to prescribe the order of only these words.

FIGS. 11 to 14 are diagrams showing various examples of a method for formatting one grouped data from n blocked data. In these figures, the contents of the group management data 41, block management data 42(i), blocked data 43(i), mark data 44, and dummy data 45; and the word structure of the block management data 42(i) are similar to those of the grouped data 200.

Figure 11:
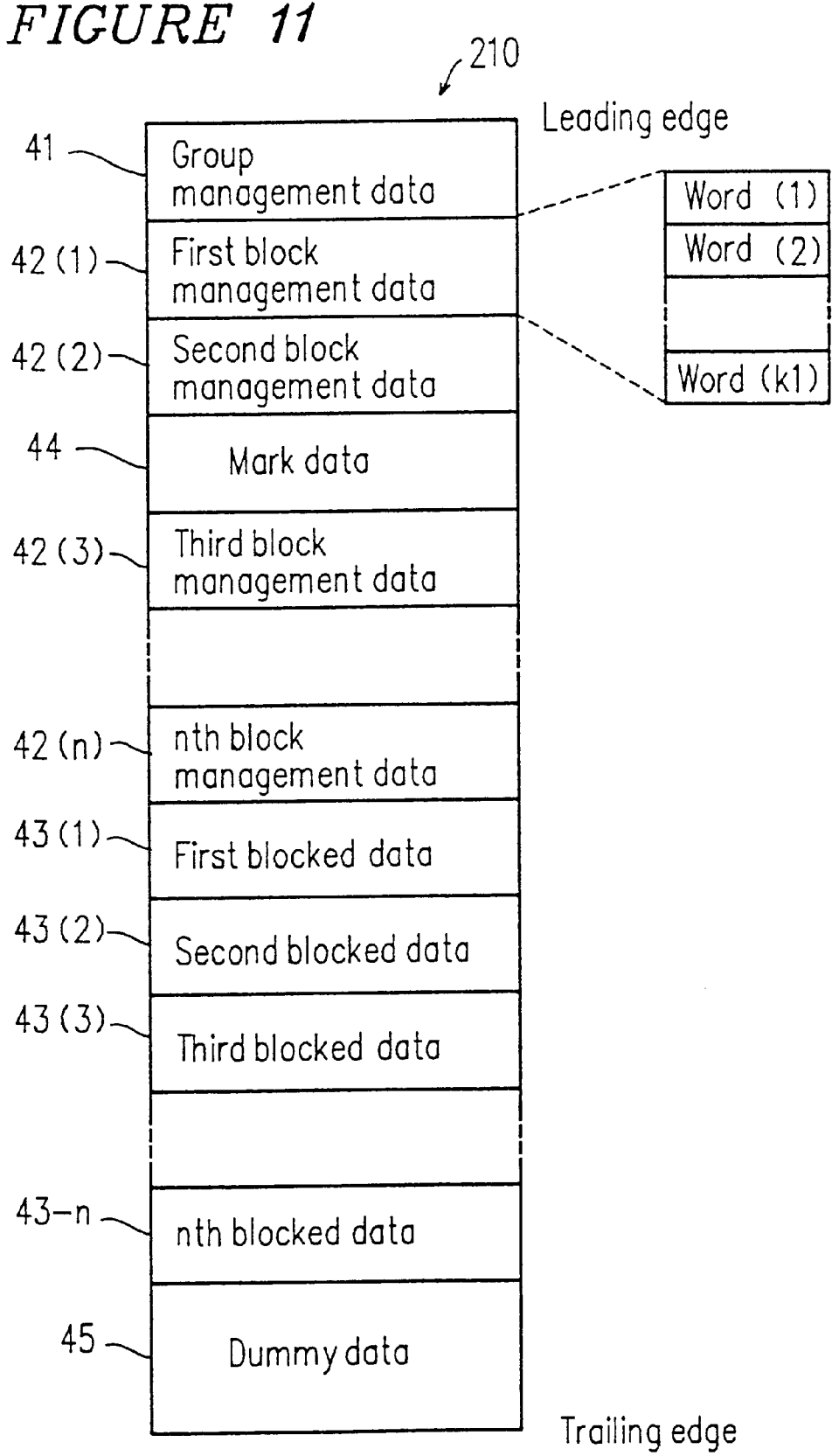
FIG. 11 is a diagram showing another example of a method for formatting one grouped data from n blocked data.

In the grouped data 210 shown in FIG. 11, the block management data 42(i) are successively arranged right after the group management data 41 in the order in which the block management data 42(i) are input. The blocked data 43(i) are successively arranged right after the block management data 42(n) in accordance with the order in which the corresponding block management data 42(i) are arranged.

FIG. 11 shows the group management data 41 placed in the leading region of the grouped data 210; however, the group management data 41 may be placed in another region. In this case, the block management data 42(i) are successively arranged in the order in which they are input, except for a region where the group management data 41 has been placed. The blocked data 43(i) are successively arranged right after the block management data 42(n) in accordance with order in which the corresponding block management data 42(i) are arranged, except for a region, if any, where the group management data 41 has been placed. In the case where mark data 44 is present, the mark data 44 is arranged so as to be inserted among the block management data 42(i), in accordance with the order in which the mark data is input.

The above description can be applied to the other examples of grouped data in the same way.

Figure 12:
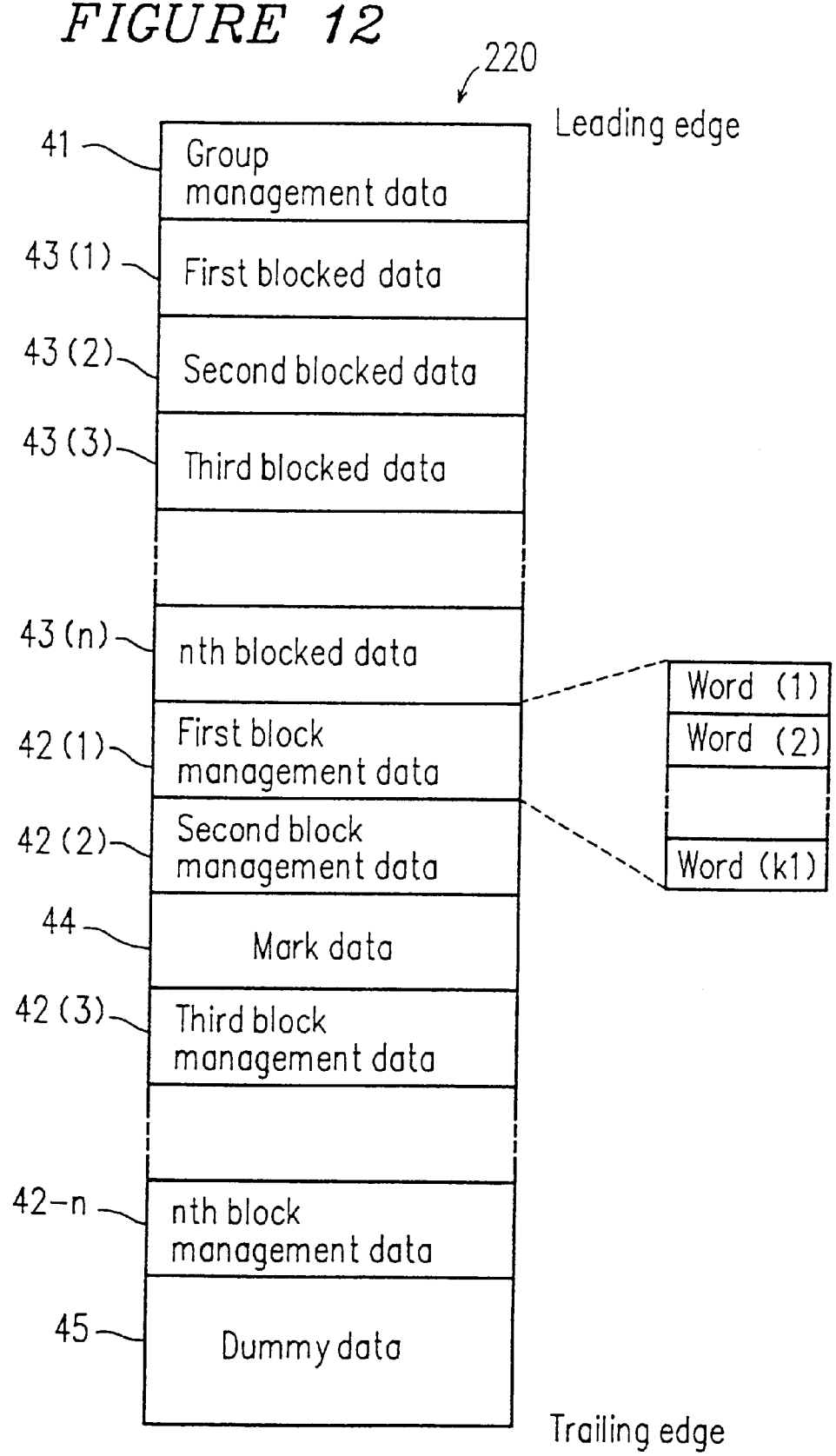
FIG. 12 is a diagram showing another example of a method for formatting one grouped data from n blocked data.

In the grouped data 220 shown in FIG. 12, the blocked data 43(i) are successively arranged right after the group management data 41 placed in the leading region of the grouped data 220 in the order in which the blocked data 43(i) are input. The block management data 42(i) are successively arranged right after the blocked data 43(n) in accordance with the order in which the corresponding blocked data 43(i) are arranged.

According to the formats used in the grouped data 210 and 220, the recording of the grouped data is started after the blocked data, block management data, and the like contained in one grouped data to be recorded are all given to the memory of the grouped data generator 23. The dummy data 45, if any, is placed in the trailing region of the grouped data.

Figure 13:
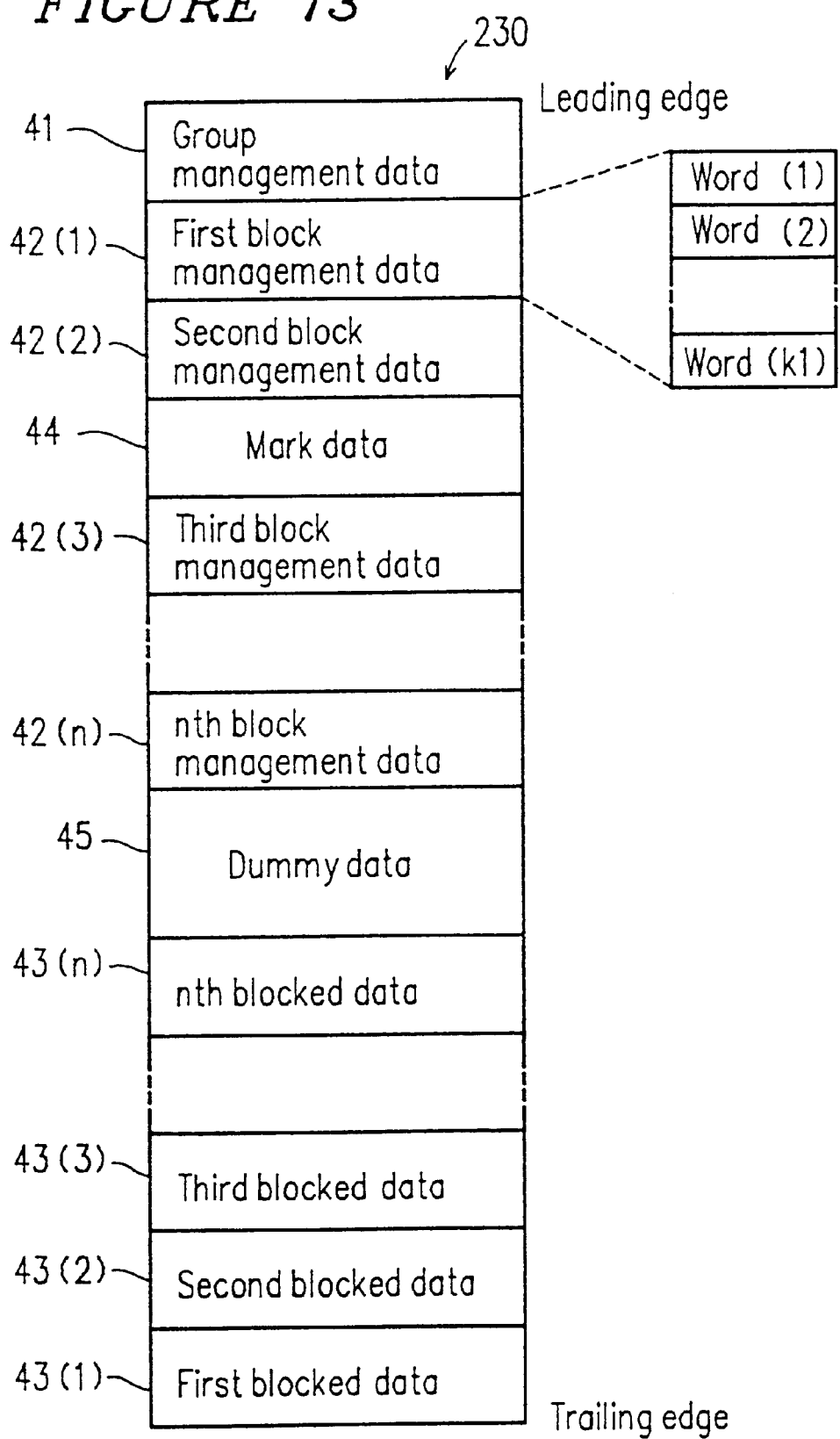
FIG. 13 is a diagram showing another example of a method for formatting one grouped data from n blocked data.

In grouped data 230 shown in FIG. 13, the block management data 42(i) are successively arranged right after the group management data 41 placed in the leading region of the grouped data 230 in the order in which the block management data 42(i) are input. The blocked data 43(i) are successively arranged from the trailing edge of the grouped data 230 in accordance with the order in which the corresponding block management data 42(i) are arranged.

Figure 14:
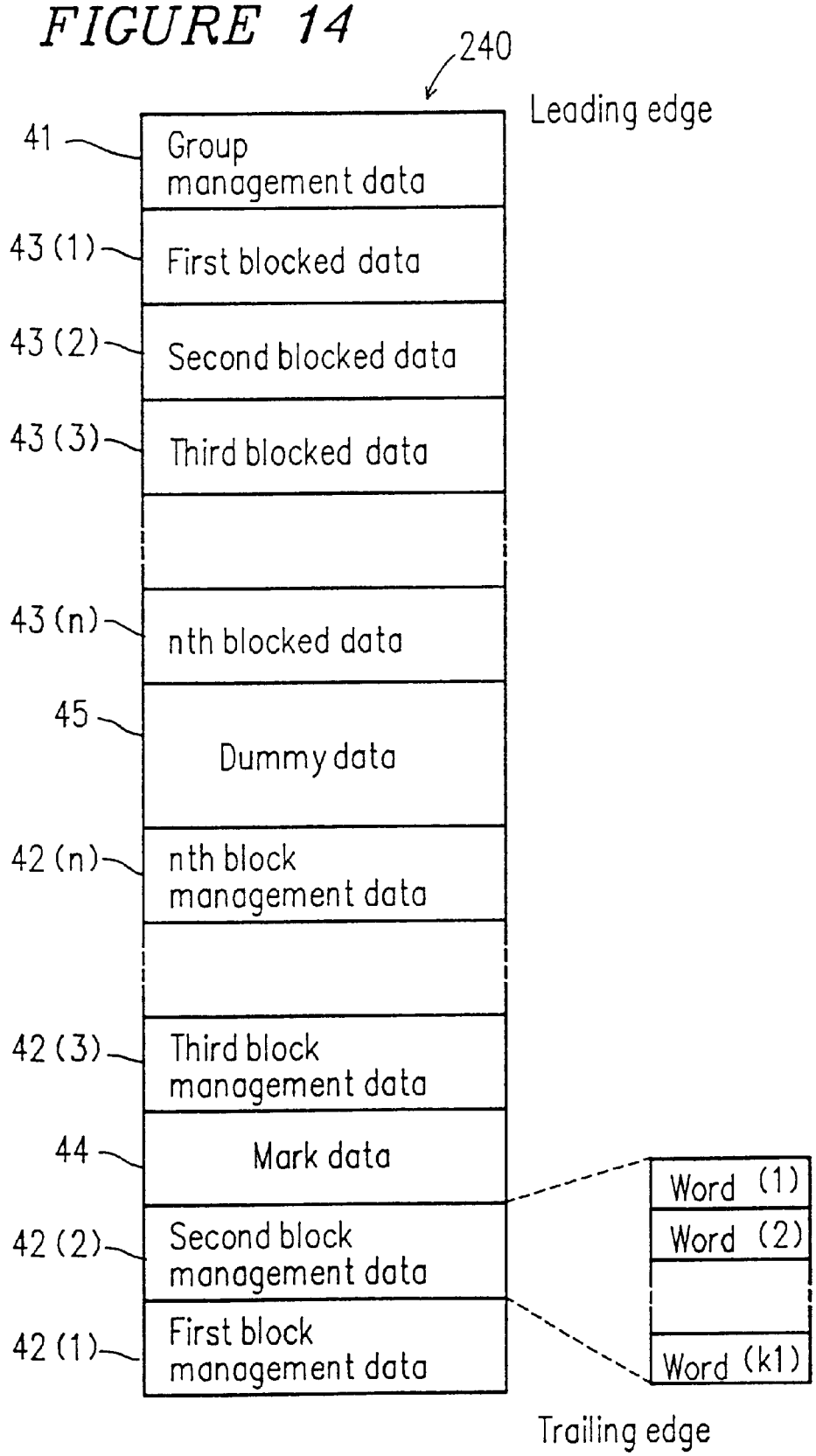
FIG. 14 is a diagram showing another example of a method for formatting one grouped data from n blocked data.

In the grouped data 240 shown in FIG. 14, the blocked data 43(i) are successively arranged right after the group management data 41 placed in the leading region of the blocked data 240 in the order in which the blocked data 43(i) are input. The block management data 42(i) are successively arranged from the trailing edge of the grouped data 240 in accordance with the order in which the corresponding blocked data 43(i) are arranged.

According to the formats used in the grouped data 230 and 240, recording is started from the leading edge and the trailing edge of the grouped data. Thus, the blocked data, block management data, and the like are sequentially recorded in the order in which they are input to record the grouped data. The dummy data 45, if any, is placed at some midpoint of the grouped data.

In these grouped data 210 to 240, by using the word having a control code of 00h as the word (1) or the word (ki) in each block management data 42(i) ($1 \leq i \leq n$) in the same way as in the grouped data 200 shown in FIG. 9, the block management data can be delimited. However, in the case where the word having a control code of 00h is used as the word (1), the word having a control code of 00h needs to be placed after the block management data 42(n) to indicate that the block management data 42(n) is ended.

As described above, the deformatter 9 reconfigures the blocked data D160 from the reproduced grouped data D150. The original blocked data can be reconfigured from the grouped data formatted as described above in the following manner.

The block management data extractor 26 extracts the block management data 42 from the grouped data D150. The k-th blocked data can be reconfigured by obtaining the start position and size of the k-th blocked data 43(k) from the information contained in the block management data 42. For example, in the case where each block management data 42(i) has length x(i) of the corresponding blocked data 43(i) by calculating the sum of length y(i) of the block management data 42(i) and the sum of length x(i) of the blocked data 43(i) using the block management data 42(1) to 42(k−1), where i=1 to k−1, the position of the block management data 42(k) (and the blocked data 43(i), depending upon the arrangement) is obtained. The length x(k) and the start position of the blocked data 43(k) are obtained from the block management data (k).

In the case where the blocked data are arranged as shown in FIG. 9, the start position of the first block management data 42(1) needs to be found, so that the information indicating the start position of the first block management data 42(1) is required to be previously assigned to the group management data 41. Accordingly, the blocked data can be efficiently arranged into grouped data by configuring block management data in a variable-length form.

In the case of the grouped data 210 to 240 shown in FIGS. 11 to 14, the block management data 42(i) ($1 \leq i \leq n$) are arranged together (i.e., the block management data and blocked data are not arranged in an alternate manner); therefore, the extraction of group management data, and the position and length of blocked data can be efficiently calculated.

In the present embodiment, one word is composed of one symbol of control code and 4 symbols of codes, and one symbol is assumed to be one byte. The respective symbol numbers and the size of one symbol are arbitrary. Table 1 merely exemplifies the contents of control codes. Other contents can be assigned to each control code; for example, information containing a plurality kinds of contents may be effectively filled in one control code.

A word having a control code of 00h is used for indicating the delimitation of block management data. A word having a control code of another value can be used, or other methods for delimitation can be used. An example of other methods for delimitation is as follows: The number indicating in which position the blocked data is placed from the leading edge of the grouped data may be assigned to all of the words. Alternatively, a word dedicated for delimitation may be provided.

Any arrangement in the grouped data shown in FIGS. 9, and 11 to 14 can be used. It is not required to provide dummy data, or two or more dummy data can be provided. The group management data may be placed in the trailing region of the grouped data instead of the leading region. As long as the position of the group management data is found, it can be placed in any position. The group management data may be placed in different positions depending upon each grouped data.

Embodiment 2

Blocked data can be recorded on a magnetic tape after being subjected to data conversion processing such as compression and encoding. In this case, information concerning the processing conducted with respect to the input blocked data (e.g., a compression method, a state of compression, a method for encoding, and a key to encoding) needs to be simultaneously recorded. In the present embodiment, the recording and reproducing of data involving data conversion will be described.

Figure 15:
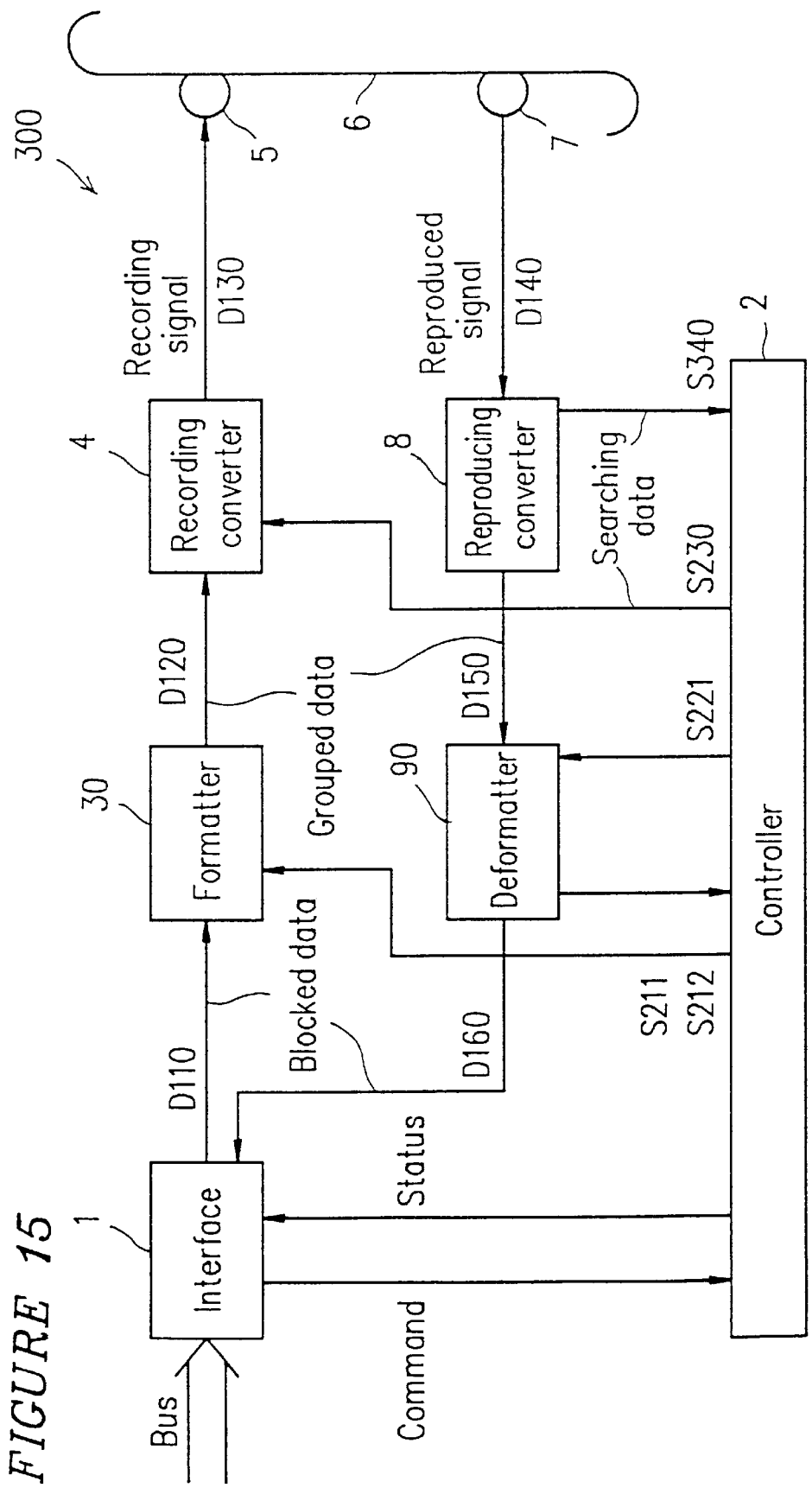
FIG. 15 is a block diagram showing an apparatus for recording and reproducing digital data in Embodiment 2 according to the present invention.

FIG. 15 is a block diagram showing an apparatus for recording and reproducing digital data 300 in Embodiment 2. In the same way as in the apparatus 100, the apparatus 300 includes an interface 1, a controller 2, a formatter (group conversion circuit) 30, a recording converter 4, a recording head 5, a reproducing head 7, a reproducing converter 8, and a deformatter (group reverse conversion circuit) 90. The interface 1 receives a command and blocked data input from a host such as a computer. The controller 2 generates various kinds of control signals and management data based on the input command to control each portion of the apparatus 300. The formatter 30 arranges the input blocked data in a predetermined order to form grouped data. The recording converter 4 converts the grouped data into a recording signal. The recording head 5 records data representing the recording signal on a magnetic tape 6. The reproducing head 7 detects a reproducing signal from the magnetic tape 6. The reproducing converter 8 converts the reproducing signal into grouped data. The deformatter 90 (group reverse conversion circuit) reconfigures blocked data from the grouped data output from the reproducing converter 8.

The apparatus 300 for recording and reproducing digital data is different from the apparatus 100 (having the formatter 3 and the deformatter 9) in structure of the formatter 30 and the deformatter 90. Since the construction and operation of the other portions are the same as those of Embodiment 1, the detailed descriptions thereof are omitted here. Only the formatter 30 and the deformatter 90 will be described below.

Figure 16:
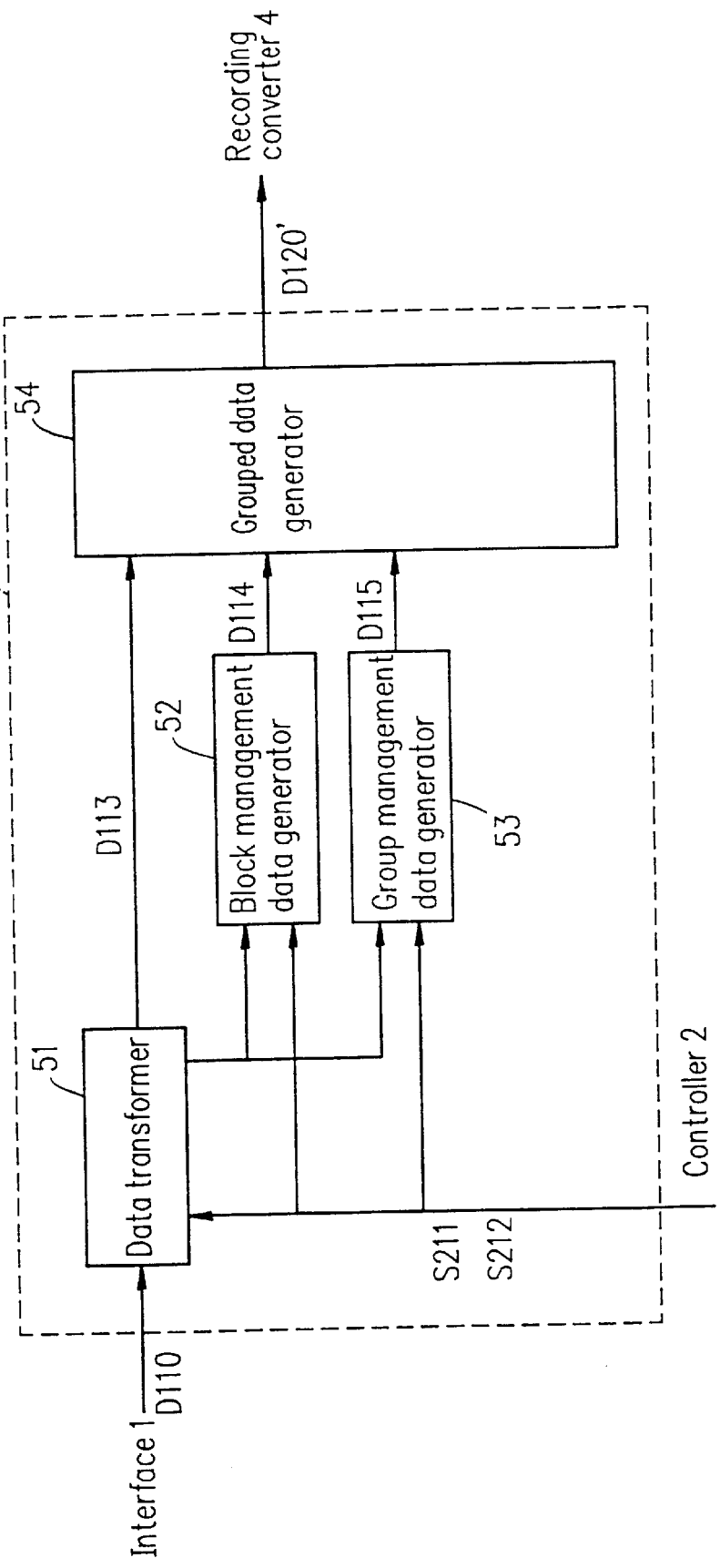
FIG. 16 schematically shows the construction of a formatter in Embodiment 2 according to the present invention.

FIG. 16 schematically shows the construction of the formatter 30 in Embodiment 1. The formatter 30 includes a data transformer 51, a block management data generator 52, a group management data generator 53, and a grouped data generator 54. In the formatter 30, grouped data D120' is formed from blocked data D110.

The data transformer 51 is provided with the blocked data D110 through the interface 1, and is provided with a control signal S211 for instructing compression, an ON/OFF of encryption, and a method thereof from the controller 2. The data transformer 51 transforms the blocked data D110 into recording blocked data D113 based on the control signal S211.

The block management data generator 52 receives the recording blocked data D113 and management data S212 given by the controller 2 and generates variable-length block management data D114 with respect to each block of the recording blocked data D113 based on the management data S212. The block management data D114 contains information for the recording blocked data D113 and the blocked data D110 before conversion, and information for transformation. The information for transformation is, for example, information for a method for compressing and encoding data, a state of compression, a key to encoding, and the like.

The group management data generator 53 receives the recording blocked data D113 and the management data S212 and generates group management data D115 containing information for the entire grouped data (for example, the number of blocks and marks). In the present embodiment, the group management data is also a fixed-length data; however, the group management data can be made variable-length data as long as it contains information indicating the length of the group management data itself.

The grouped data generator 54 receives the recording blocked data D113, the block management data D114, and the group management data D115, and arranges them in a predetermined order to generate the grouped data D120'. The grouped data generator 54 has a memory for storing at least 2 groups of data and an address generator.

The formats regarding the blocked data, block management data, and group management data shown in FIGS. 9 and 11 to 14 can be applied to the arrangement of recording blocked data and block management data in the grouped data D120'.

In the present embodiment, a block length is variable and a group length is fixed. Thus, any number of blocked data can be assigned in one grouped data. In some cases, one grouped data contains only part of the blocked data.

Figure 17:
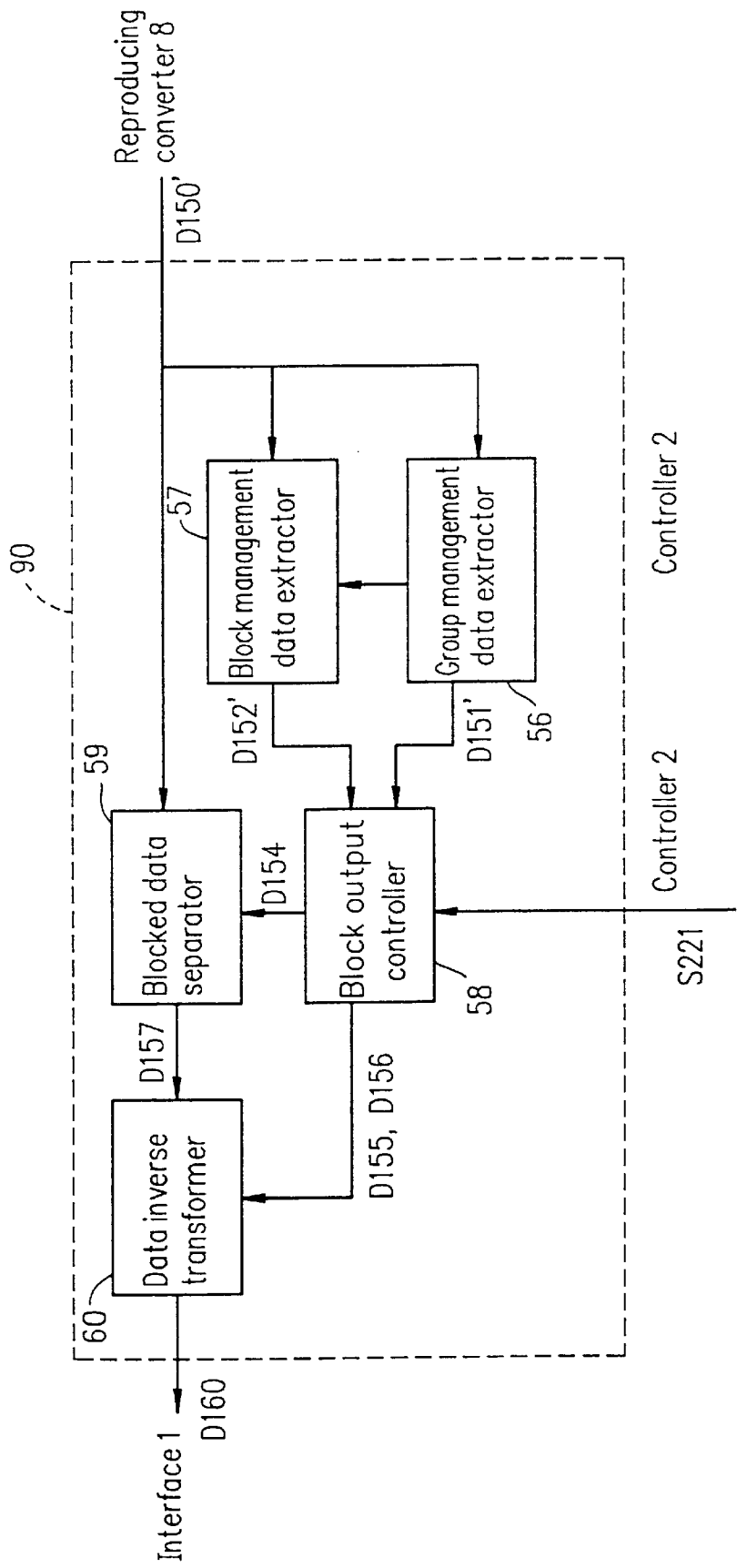
FIG. 17 schematically shows the construction of a deformatter in Embodiment 2 according to the present invention.

FIG. 17 schematically shows the construction of the deformatter 90. The deformatter 90 includes a group management data extractor 56, a block management data extractor 57, a block output controller 58, a blocked data separator 59, and a data inverse transformer 60. In the deformatter 90, the blocked data D160 is reconfigured from grouped data D150' as described below.

The group management data extractor 56 extracts group management data D151' contained in the grouped data D150', and outputs it to the block management data extractor 57 and the block output controller 58.

The block management data extractor 57 extracts block management data D152' from the grouped data D150' and the extracted group management data D151', and outputs it to the block output controller 58.

The block output controller 58 calculates addresses of recording blocks in grouped data based on the received block management data D152' and the group management data D151'. Furthermore, the block output controller 58 determines blocked data to be output and recording blocked data containing the blocked data to be output based on a control signal S221 (a timing signal and a signal for instructing a method for decompression or decoding of encryption, etc.) given by the controller 2. Then, the block output controller 58 outputs a block output control signal D154 designating the blocked data to be output, a block separating signal D155 for designating recording blocked data related to the blocked data to be output, and an inverse transformation instructing signal D156 for instructing the inverse transformation from the recording blocked data into the blocked data.

The blocked data separator 59 receives the grouped data D150' and the block output control signal D154, separates recording blocked data D157 designated by the block output control signal D154 from the grouped data D150', and outputs the separated recording blocked data D157 to the data inverse transformer 60.

The data inverse transformer 60 performs inverse transformation such as decoding of encryption or decompression with respect to the recording blocked data D157 based on the reverse conversion instructing signal D156 to obtain the original blocked data. Then, the data inverse transformer 60 outputs the designated blocked data D160 to the interface 1 based on the block output control signal D155.

In the case where data transformation such as compression or encryption is performed one block of the input blocked data is not always recorded as one block of recording blocked data after transformation. The reason for this is as follows: In the case of compression, the compression efficiency is better when a great amount of data is processed at a time. Thus, for the purpose of enhancing the compression efficiently, a plurality of blocks of the input blocked data are sometimes processed together and converted into a less number of blocks for recording blocked data. Furthermore, in the case of encryption, a unit amount of encryption is sometimes limited to a specific fixed length.

Thus, the block management data generated with respect to the recording blocked data after transformation needs to contain information of the input blocked data before transformation. This can be applied to the group management data. For example, the group management data needs to contain information concerning the number of recording blocked data after transformation contained in the grouped data and the number of the corresponding input blocked data. In the block management data generator 52 and the group management data generator 53, the block management data D114 and the group management data D115 are generated so as to satisfy the above conditions.

By generating each management data as described above, the original input blocked data can be reconfigured from the grouped data D150' (configured based on the recording blocked data after data conversion) by the deformatter 90. Since the block output control signal D154 is given to the blocked data separator 59 based on the input blocked data, the blocked data separator 59 separates all of the recording blocked data related to the blocked data designated by the block output control signal D154, and outputs all of the separated recording blocked data. All of the related recording blocked data are inversely transformed by the data inverse transformer 60 and only the designated original blocked data is separated from them.

Even in the case of recording and reproducing data involving the data transformation, by configuring the recording blocked data, block management data, group management data, and the like as described above, management data with respect to the recording blocked data can be recorded in a variable length form, resulting in the efficient arrangement of the blocked data in the grouped data. For example, in the case of recording and reproducing data partially involving data compression, the block management data of the recording block data related to the compressed blocked data contain much information, so that the block management data needs sufficient length. On the other hand, the block management data of the blocked data which is not compressed may not have such long length. Thus, more flexible and efficient grouped data can be obtained, compared with the case where fixed-length block management data is formed with respect to each blocked data.

Embodiment 3

In the present embodiment, searching of information recorded by the apparatus for recording and reproducing digital data according to the present invention will be described.

As described in Embodiment 1, when grouped data is recorded, data for searching generated by the controller 2 is recorded together with it. When a block and/or a mark are searched, the searching data is extracted from a signal reproduced from the magnetic tape 6, and a desired block or mark is obtained based on the extracted searching data and the searching information input to and the controller 2.

When the input blocked data is recorded on the magnetic tape 6 in a group unit, the blocked data are assigned with ascending numbers in the order in which the blocked data are input. The corresponding block management data are recoded with the corresponding numbers assigned thereto by the block management data generator (21 or 52). In the present embodiment, the numbers are assigned in the order in which blocked data are input; however, any numbering can be used as long as specific numbers identifying each blocked data and the corresponding block management data are used.

Figure 18:
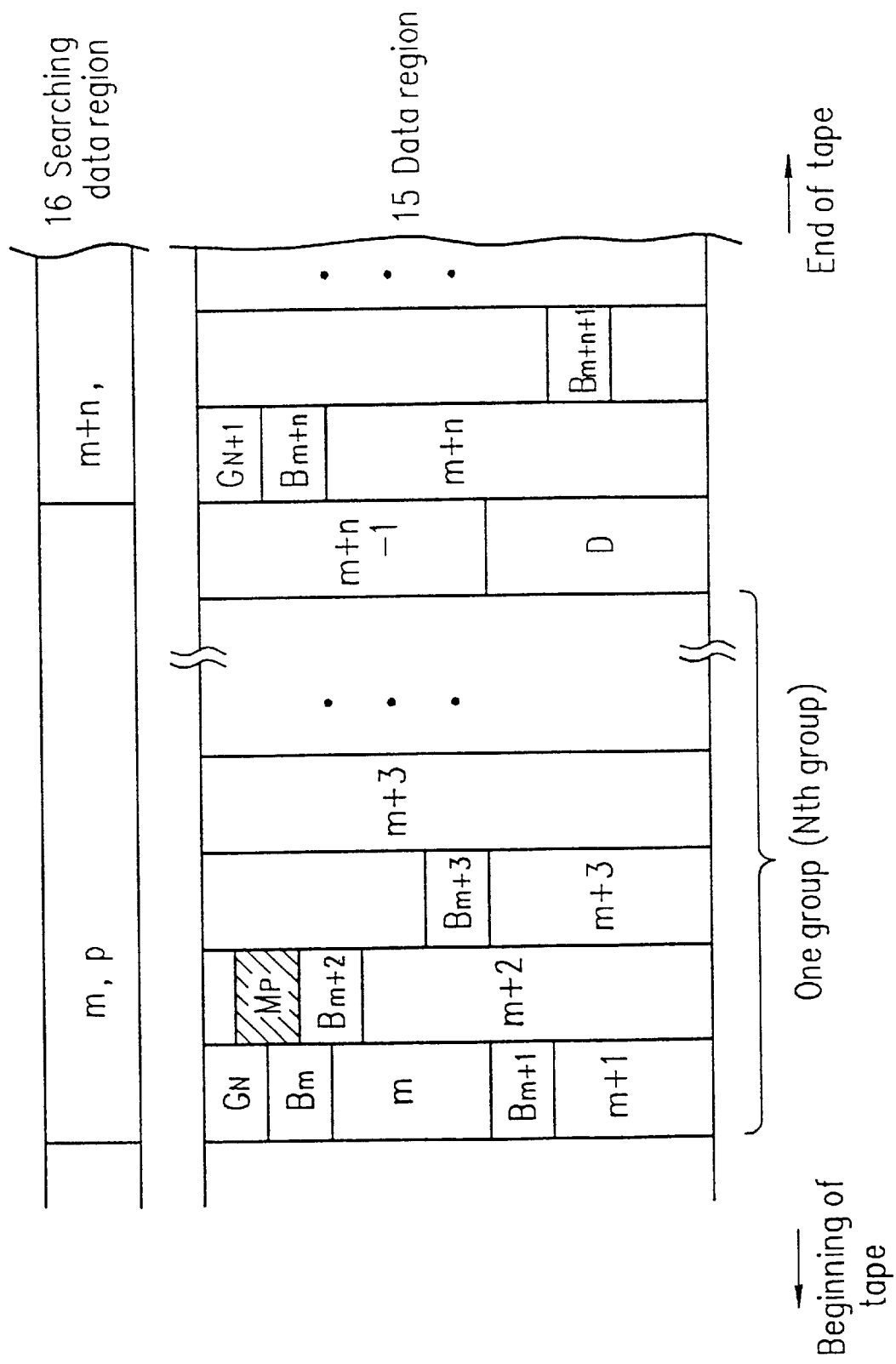
FIG. 18 shows a state in which the grouped data shown in FIG. 9 is recorded on the magnetic tape.

FIG. 18 shows the state in which the grouped data 200 shown in FIG. 9 is recorded on the magnetic tape 6. FIG. 18 schematically shows the data region 15 and the searching data region 16 in the tracks 12 formed on the magnetic tape 6. One group includes q tracks 12 on the magnetic tape 6. The grouped data 200 shown in FIG. 18 is the N-th grouped data including one group management data $G_N$, n blocked data m to (m+n-1), n block management data $B_m$ to $B_{m+n-1}$, mark data $M_p$, and dummy data D. Here, m represents the m-th blocked data, and the corresponding block management data is represented by $B_m$. p of the mark data $M_p$ represents the p-th mark data. The numbers of the blocks and marks are determined based on the leading edge of the magnetic tape 6 or a predetermined position thereof. As shown in FIG. 18, these data are recorded in the data region 15 in the order in which these data are input.

Searching data is recorded as follows:

The number m of blocked data m whose recording is first started in the N-th group is recorded in the searching data region 16. Likewise, the number p of marked data $M_p$ recorded in the N-th group is recorded in the searching data region 16. Although FIG. 18 shows only one -mark data, one grouped data may contain a plurality of mark data. In this case, the mark number of the marked data whose recording is first started in the group is recorded. In the case where the group contains no marks, information indicating the absence of marks is recorded.

The searching of the t-th block Bt in the case where the searching data is recorded as described above will be described.

Assuming that a block indicating the present position of the reproducing head 7 is represented by Bc. When the relationship t>c is satisfied, the magnetic tape 6 is searched from the leading edge to the trailing edge, and the reproducing head 7 is moved to a group k where searching data (block number) k reproduced from the searching data region 16 satisfies the relationship t≦k. In the case where a desired block number t is obtained as searching data, a desired block Bt is in the group k. In the case where the relationship k=t is not obtained and the reproducing head 7 passes through the block t (i.e., t<k), a desired block Bt is present in either of the groups which the reproducing head 7 has passed through. In this case, the searching velocity of the reproducing head 7 is inverted to slowly search the magnetic tape 6 in the opposite direction. A desired block Bt is contained in a group where the relationship k<t is first satisfied during searching of the magnetic tape 6 in the opposite direction. When the group containing the desired block Bt is determined, the desired block Bt can be reproduced by starting the reproduction of data from that position at an ordinary velocity for reproducing.

In the case of t<c, a group in which a desired block is present is determined in the same way by searching the magnetic tape 6 from the trailing edge to the leading edge, and the reproduction of data is started from that position at an ordinary velocity, whereby the desired block can be reproduced.

The grouped data 200 is exemplified above. A desired block can be similarly searched in the grouped data 210 to 240 shown in FIGS. 11 to 14.

Searching of data with the designated block number t has been described, Searching of data can also be conducted in the same way even when a mark number r is designated. Mark data are successively assigned with mark numbers from the leading edge of the magnetic tape 6 or a predetermined position thereof. A group in which a desired mark is present can be determined in the same way as the above, by comparing a desired mark number r with the mark number p recorded in the searching data region 16 of the group. In the case where the group contains no marks, information indicating the absence of marks is recorded instead of the mark number p. Note that a group in which the desired mark is present can be successfully determined by ignoring such a group (containing no marks) based on the information.

The case where one grouped data contains a plurality of blocked data is described above. Since the grouped data is fixed-length data, and the blocked data is variable-length data, one block of the blocked data may be larger than one group of the grouped data. Hereinafter, a method for searching, including the case where a block length is larger than a group length, will be described.

In the case where blocked data to be input contains a block larger than one group, the grouped data generator (23 or 54) formats as shown in FIG. 9. Since the block management data $B_m$ and the blocked data m are always recorded adjacent to each other, the m-th block management data and blocked data will be represented by a block B(m) in the following description. The p-th mark will be represented by M(p). Likewise, the N-th grouped data will be represented by a group G(N). The group G(N) is composed of the block B(m) contained in the N-th group, the mark data M(p), and the group management data $G_N$, and is formatted as shown in FIG. 9. The group management data $G_N$ contains information indicating the number of the leading block contained in the N-th group, a flag indicating whether or not the block is recorded continuing from the previous block, the mark number of the first mark contained in the N-th group, and group numbers.

Figure 19A:
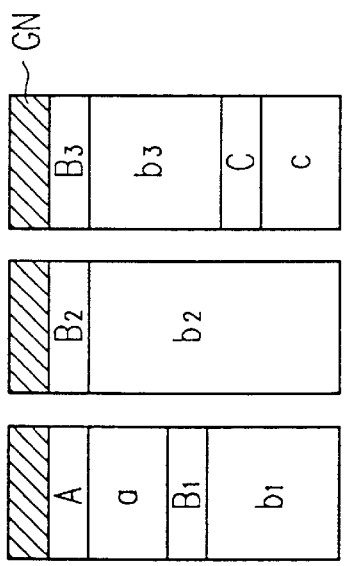
FIG. 19A shows an example of grouped data in the case where a block larger than a group is input.

FIG. 19A shows an example of grouped data in the case where a block larger than a group is input. FIG. 19A shows the case where blocks a, b, and c are input and recorded as three grouped data. The block b is divided into blocks $b_1$, $b_2$, and $b_3$. The group management data is placed in the leading region of each grouped data, and contains a flag indicating that blocks recorded after being divided are successively placed. Block management data A, $B_1$, $B_2$, $B_3$, and C are placed before the corresponding blocked data.

Figure 19B:
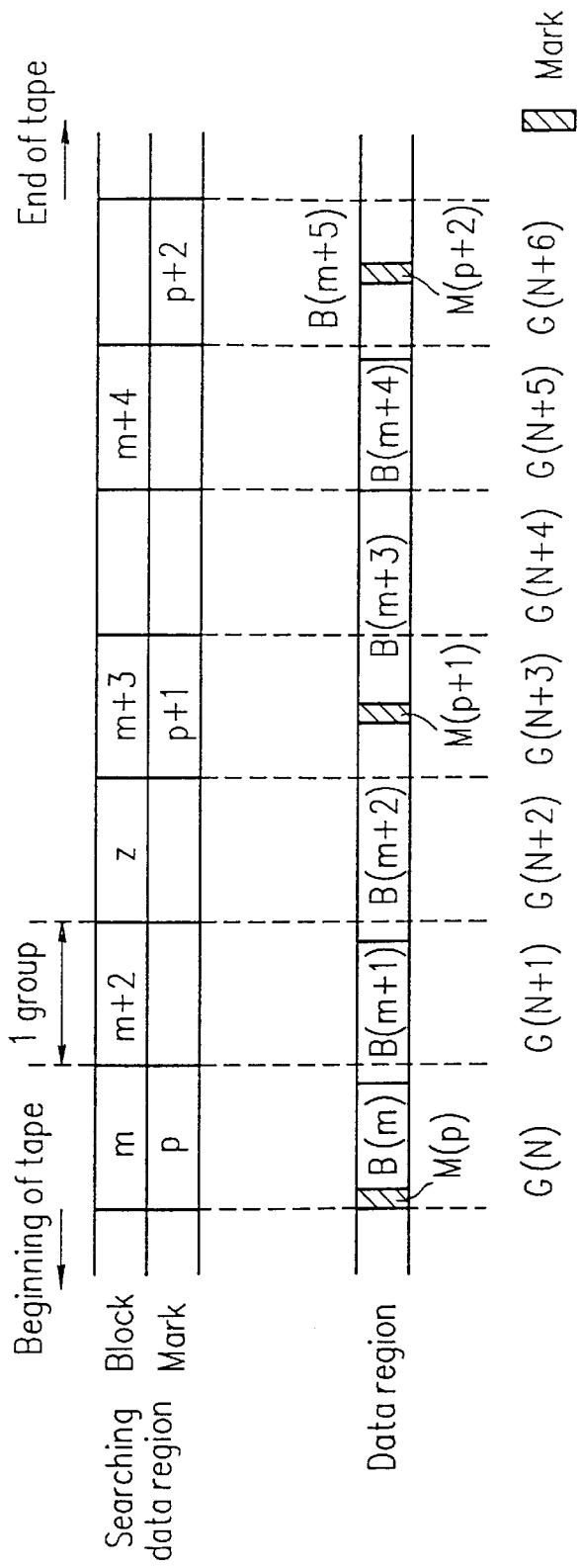
FIG. 19B shows the grouped data with a blocked data larger than the group recorded on the magnetic tape.

FIG. 19B shows the state where grouped data in which a block larger than a group is present is recorded on the magnetic tape 6. In this figure, the data region 15 and the searching data region 16 in the tracks 12 formed on the magnetic tape 6 are schematically shown. As shown in this figure, the group G(N) are successively recorded in the data region 15, whereby the block B(m) and the mark M(p) are recorded in the order in which they are input.

Searching data is recorded as follows:

In the searching data region 16 of each group, the block number of a block whose recording is first started in the group is recorded as searching data. In the case where there are no blocks whose recording is started in the group, information indicating the absence of blocks whose recording is started is recorded as searching data.

For example, as shown in FIG. 19B, since recording of the block B(m) is first started in the group G(N), the block number m is recorded in the searching data region 16 of the group G(N). Likewise, since recording of a block B(m+2) is first started in a group G(N+2), the block number m+2 is recorded in the corresponding data searching region 16. Since there are no blocks whose recording is started in a group G(N+2), information z indicating the absence of blocks whose recording is started in the group is recorded instead of the block number in the searching data region 16 in the track 12.

The case where a desired block B(t) is searched by using the thus recorded searching data (block number) will be described.

As shown in FIG. 20A, it is assumed that a block indicating the present position of the reproducing head 7 is represented by B(C). In the case of t>c, the magnetic tape 6 is searched from the leading edge to the trailing edge, and the reproducing head 7 is moved to a group k where searching data (block number) k reproduced from the searching data region 16 satisfies the relationship t≦k. As shown in FIG. 20A, in the case where a desired block number t is obtained as searching data, a desired block B(t) is in the group k. As shown in FIG. 20C, in the case where the relationship k=t is not obtained and the reproducing head 7 passes through the block number t (i.e., k<c), the desired block B(t) is present in either of the blocks which the reproducing head 7 has passed through. In this case, a searching velocity of the reproducing head 7 is inverted to slowly search the magnetic tape 6 in the opposite direction. The desired block B(t) is contained in the group where the relationship k<t is first obtained during searching of the magnetic tape 6 in the opposite direction. In the case where there are no blocks whose recording is started in the group (group G(R)), information z indicating the absence of the blocks whose recording is started in the group is recorded in the searching data region 16 instead of the group number. Thus, such a group G(R) is found in the course of searching, the group G(R) is ignored based on the information z, whereby a group in which a desired block is present can be successfully determined. When the group containing the desired block B(t) is determined, the desired block B(t) can be reproduced by starting the reproducing of data from that position at an ordinary reproducing velocity.

In the case of t<c, a group in which a desired block is present is similarly determined by searching the magnetic tape 6 from the trailing edge to the leading edge. The desired block can be reproduced by starting the reproduction of data from the determined group position at an ordinary velocity (FIGS. 20B and 20C).

As described above, a desired block can be searched by using the block numbers of each input block assigned in the order in which the input blocks are recorded and searching data of the block number which indicates a block whose recording is first started in the group or information indicating the absence of the blocks whose recording is started in the group in the searching data region of each group. Since the information indicating the absence of the blocks whose recording is started in the group is recorded in the same place as that of the block number, it is not necessary to enlarge or provide another searching data region. Since there is only one kind of information to be recorded, the searching data region is not required to be large. Searching is conducted using one information, so that information to be read for searching is less and extra operation such as addition is not required. This results in high-velocity searching at lower cost compared with the conventional example.

Searching of data by designating the block number t is described above. Hereinafter, searching of data using marks will be described. In the same way as in the blocks, mark data are successively assigned with mark numbers from the leading edge of the magnetic tape 6 or a predetermined position thereof.

In the case of using marks as searching data, mark numbers are recorded as follows:

In the searching data region 16 of each group, the mark number p of a mark M(p) which is first recorded in the group is recorded. In the case where there are no marks in the group, information indicating the absence of marks in the group is recorded as searching data.

In the following procedure, a desired mark M(r) can be searched by designating a mark number r of the desired mark M(r) in the same way as in the blocks. Specifically, the desired mark number r is compared with the mark number p recorded in the searching data region 16 of the group, whereby a group in which the desired mark M(r) is present is determined. In the case where there are no marks in the group, information indicating the absence of the marks is recorded instead of the mark number p, so that a group in which the desired mark M(r) is present can be successfully determined by ignoring such a group (having no marks). When the group in which the desired mark M(r) is present is determined, required data can be reproduced at an ordinary velocity from a predetermined position indicated by the mark.

As described above, a desired mark can be searched by using mark numbers for each input mark assigned in the order in which the input marks are recorded and searching data of the mark number which indicates a mark whose recording is first started in the group or information indicating the absence of the marks whose recording is started in the group in the searching data region of each group. Since the information indicating the absence of the marks whose recording is started in the group is recorded in the same place as that of the mark number, it is not necessary to enlarge or provide another searching data region. Since there is only one kind of information to be recorded, the searching data region is not required to be large. Searching is conducted using one information, so that information to be read for searching is less and additional operation such as addition is not required. This results in high-velocity searching at lower cost compared with the conventional example.

Alternatively, the block number and the mark number are recorded in the searching data region and combined to be used as one searching data. For example, in the case where a mark is used for delimiting large data, coarse searching is first conducted using mark numbers and detailed searching is then conducted using block numbers. In this case, extra operation such as addition is not required. This results in high-velocity searching at lower cost compared with the conventional example.

Embodiment 4

In Embodiment 3, the case where searching is conducted using one kind of searching data is described. The objective of the present embodiment is to prevent the reproducing head from returning after passing through a group containing a desired block (or a desired mark) in Embodiment 3, thereby realizing efficient searching. A method for recording the block B(m) and the mark M(p) on the magnetic tape 6 in a unit of the group G(N) is the same as that of Embodiment 3.

In the present embodiment, the block number m of the block B(m) whose recording is first stated in the group G(N) and the block number q of the block B(q) whose recording is last started in the group G(N) are recorded in the searching data region 16 of the group G(N). In the case where the magnetic tape 6 is searched from the leading edge to the trailing edge, the reproducing head can avoid returning after passing through a desired group by using the block number q of a block whose recording is last started in the group. Although two kinds of informations are recorded in the searching data region, only the comparison between the designated block number and the block number reproduced from the searching data region is conducted during searching. Since the comparison is made with respect to one kind of information during searching, extra operation is not required. Thus, redundant movement of the reproducing head of returning after passing through the desired block can be avoided while maintaining the effects of high-velocity searching with efficiency at low cost.

Likewise, the mark number p of the mark M(p) first recorded in the group G(N) and the mark number r of the mark M(r) last recorded in the group G(N) are recorded in the searching data region 16 in the track of the group G(N), whereby the reproducing head can be prevented from returning after passing through the desired mark.

According to the above method, in the case where a large block is present covering a plurality of groups, block numbers cannot be read while searching these groups. (In these groups, only information indicating the absence of the blocks whose recording is started therein is obtained.) In this case, if a block number of the searching data region 16 is misread in a group in which recording of the block is started, the reproducing head passes through a plurality of groups until it reads the subsequent block number.

In the searching data region 16, the block number of a block whose recording is first started in the group can be recorded. In this case, a flag indicating whether the block is recorded continuously from the previous group or the block is first recorded in the group is recorded together with the block number of the block which is first recorded.

Figure 21:
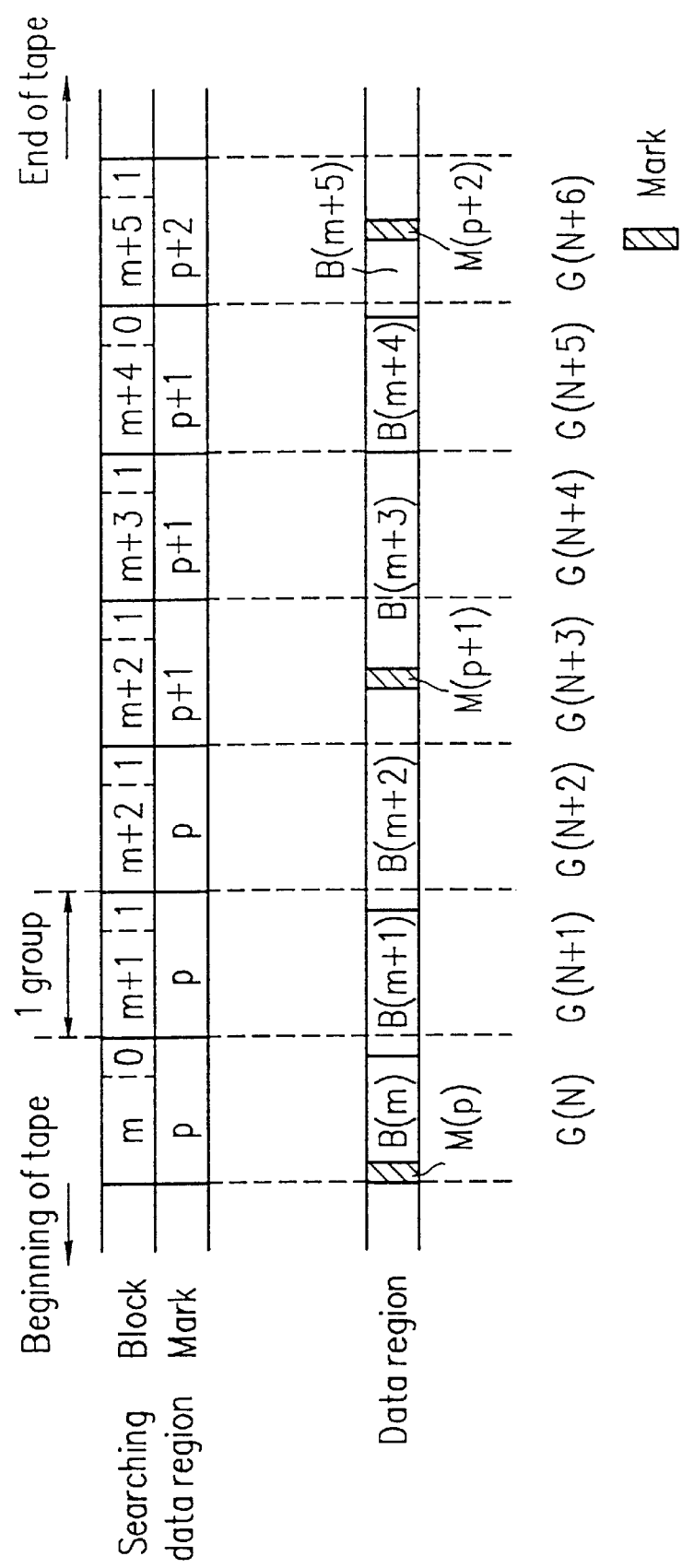
FIG. 21 illustrates a method for searching in the case where the block number and flag are recorded in the searching data region.

Referring to FIG. 21, in the group G(N), the block number m of the first block B(m) of the group G(N) and a flag value of 0 are recorded in the searching data-region 16. The flag 0 indicates that recording of the block B(m) is started in the group G(N). In the group G(N+1), the block number m+1 of the first block B(m+1) in the group G(N+1) and a flag value of 1 are recorded in the searching data region 16. The flag 1 indicates that recording of the block B(m+1) is started in a group preceding the group G(N+1) in which the block number m+1 is recorded.

A method for searching in the case where the block number and flag are thus recorded in the searching data region 16 will be described. It is assumed that a desired block to be searched is represented by B(t) and a block indicating the present position of the reproducing head 7 is indicated by B(c).

In the case of t>c, the magnetic tape 6 is searched from the leading edge to the trailing edge. The reproducing head 7 is moved to a group where the block number k reproduced from the searching data region 16 satisfies the relationship t≦k. When the relationship k>t is obtained, the searching direction is inverted and continues searching slowly. A group where k is equal to t and the flag is 0 is a block in which a desired block B(t) is recorded. In the case where there are no groups which satisfy the relationship k=t and have a flag value of 0, the block B(t) is present in the first group where the relationship k<t is obtained.

In the case of t<c, the magnetic tape 6 is searched in the opposite direction, and the reproducing head 7 is moved until the block number k reproduced from the searching data region 16 satisfies the relationship t>k. Then, the searching direction is inverted to slowly continue searching. A group where t is equal to k and the flag is 0 is a block in which the desired block B(t) is recorded. In the case where there are no groups which satisfy the relationship t=k and have a flag value of 0, the magnetic tape 16 is again searched in the opposite direction. The desired block B(t) is present in the first group where the relationship t>k is obtained.

In the case of using marks, mark numbers are recorded in the searching data region 16 as follows:

When marks are present in a group, the mark number of the first mark contained in the group is recorded. When marks are not present in a group, the same mark number as that recorded in the searching data region 16 of the previous group is recorded.

As described above, by recording block numbers and/or mark numbers in the searching data region 16, even in the case where searching data cannot be read because of some errors, the searching data in the subsequent block can be read. Therefore, exact searching can be conducted.

According to the searching method in Embodiments 3 and 4, the block numbers and/or mark numbers are recorded in the searching data region 16 and they are compared with the desired block number or the desired mark number to search data. Compared with the conventional example, searching can be conducted with less number of-searching data, so that a record medium can be effectively used. Furthermore, it is not required to calculate the resultant searching data, which enables high-velocity searching at lower cost.

The above embodiment illustrates that the ascending numbers are assigned to blocks. It is noted that the descending numbers can also be assigned. In the case of using the descending numbers, the large and small relationship to be compared becomes different from the case using the ascending numbers. However, the underlying concept is the same, so that the description thereof will be omitted here. Furthermore, the above embodiment illustrates one kind of mark block. It is noted that a plurality of mark blocks can be used.

Embodiment 5

In the present embodiment, a method for effectively recording input blocked data on the magnetic tape 6 by the apparatus for recording and reproducing digital data will be described.

The input blocked data D110 is converted into the grouped data D120 by the formatter 3, and converted into the recording signal D130 by the recording converter 4. In the recording converter 4, the grouped data D120 is formed in a plurality of tracks and converted into a recording signal as follows:

As shown in FIG. 4, the recording converter 4 includes the searching data generator 71, the first and second error-correction encoders 72 and 73, the modulator 74, the preamble track generator 75, the postamble track generator 76, and the data end track generator 77.

The grouped data is input in a unit of track to the recording converter 4 from the formatter 3. Specifically, the grouped data are arranged in data tracks with the synchronization of the controller 2. The first error-correction encoder 72 performs error-correction encoding with respect to the grouped data in a unit of track and output them to the switch 78. The preamble track generator 75 generates preamble tracks to be arranged preceding the data tracks. The postamble track generator 76 generates postamble tracks to be arranged following the data tracks. The data end track generator 77 generates data end tracks indicating the end of data. These tracks are respectively output to the switch 78. The switch 78 selects either of the preamble tracks, the data tracks, or the postamble tracks in accordance with the control (not shown) of the controller 2 and outputs them to the modulator 74.

The management data S230 containing information concerning block numbers, mark numbers, group numbers, and the like is given to the searching data generator 71 from the controller 2. The searching data generator 71 generates or configures searching data indicating information for searching the block numbers, mark numbers, group numbers, and the like, and outputs it to the second error-correction encoder 73. The second error-correction encoder 73 performs error-correction encoding with respect to the received searching data and outputs it to the modulator 74. The modulator 74 forms the grouped data in a unit of track input through the switch 78 and the searching data into sync-blocks, respectively, modulates them, and outputs the recording signal D130 to the recording head 5. The modulator 74 and the recording head 5 are controlled by the controller 2, whereby the grouped data in a unit of track are recorded in the tracks 12 and the searching data are recorded in the searching data region 16 in the tracks 12 (see FIG. 8).

Figure 22:
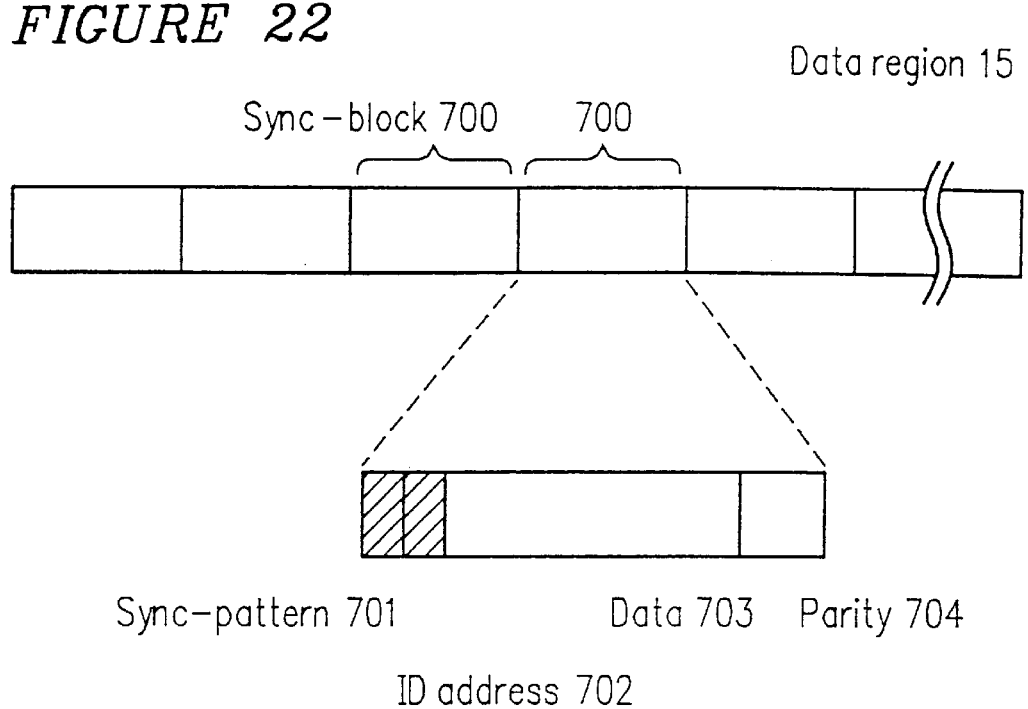
FIG. 22 shows sync-blocks of the data region in the track.
Figure 23:
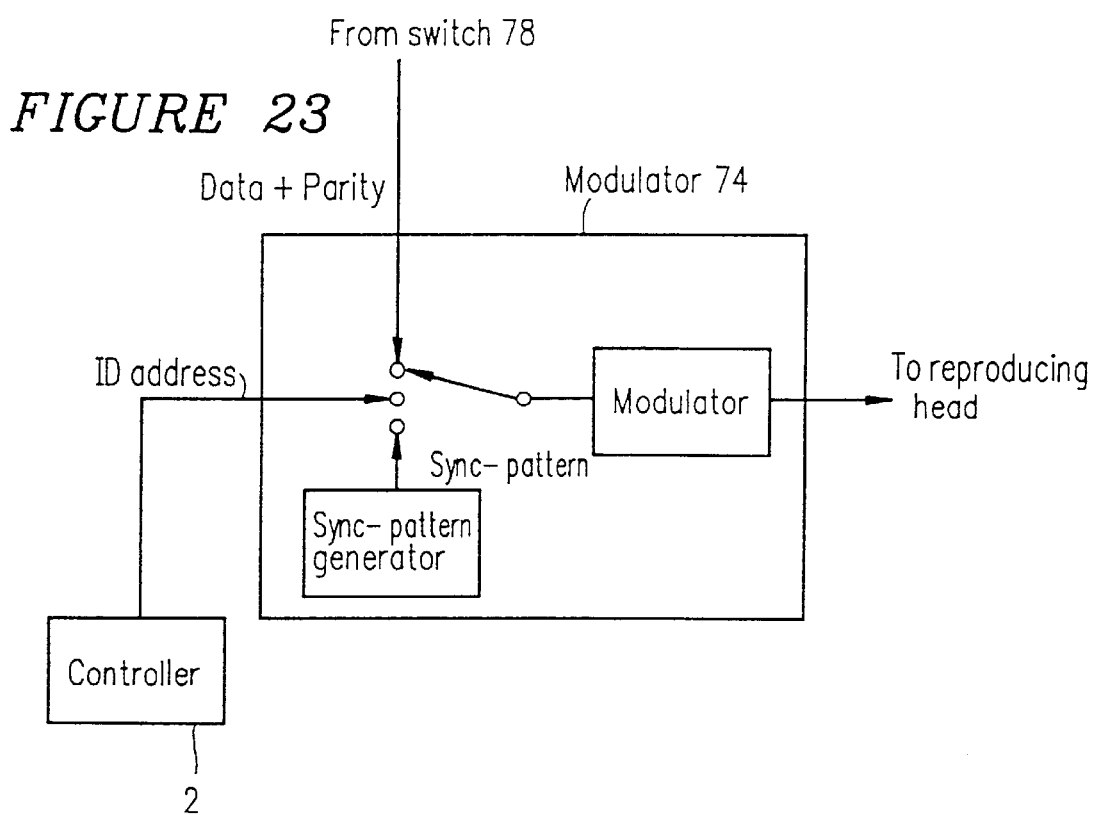
FIG. 23 illustrates the detailed construction of the modulator.

Each track is recorded after being divided into a plurality of sync-blocks by the modulator 74. FIG. 22 shows sync-blocks 700 of the data region 15 in the track 12. Each sync-block 700 includes a sync-pattern 701, an ID address 702, a data portion 703, and a parity 704. The sync-pattern 701 is generated and added to each sync-block 700 while the modulator 74 modulates the sync-blocks 700. The ID address 702 is given to the modulator 74 from the controller 2 and is added to each sync-block 700 (see FIG. 23). The parity 704 is added to each sync-block 700 by the first and second error-correction encoders 72 and 73. The searching data region 16 is similarly composed of sync-blocks. The size of each sync-block and the detailed structure of the sync-pattern, the ID address, the data, and the parity of the searching data region 16 may be different from those of the sync-blocks 700 of the data region 15.

As described above, by recording a track after dividing it into predetermined units (sync-blocks), even in the case where errors occur in the track or part of the track is damaged, the tracks can be synchronized again by using the sync-pattern (ID address) as a guide. In the case where the tracks are recorded without being divided into the sync-blocks, if errors occur in the track or part of the track is damaged (i.e., the reproduction of data in the defective tracks becomes impossible), the tracks following a portion of a track which becomes unreproducible cannot be synchronized to be reproduced. In general, the error-correction encoding is performed in a unit of sync-block.

In the track formed as described above, information for identifying the preamble tracks, the data tracks, the postamble tracks, and the data end tracks can be recorded by providing an identifying bit in the data portion 703 or the ID address 702 of the sync-block 700 in the data region 15. The identifying bit may be provided in all of the sync-blocks 700 or only in part of the sync-blocks 700. Alternatively, it is also possible to provide the identifying bit in the sync-blocks of the searching data region 16.

Next, the operation of the reproducing converter 8 during reproducing data or searching data will be described.

AS shown in FIG. 5, the reproducing converter 8 includes the demodulator 81, the first and second error-correction decoders 82 and 83, the searching data extractor 84, and the postamble track detector 85.

The demodulator 81 demodulates the reproduced signal D140, outputs the sync-blocks (encoded grouped data D141) in the data region 15 to the first error-correction decoder 82 and the postamble track detector 85, and outputs the sync-blocks (encoded searching data D142) in the searching data region 16 to the second error-correction decoder 83. The postamble track detector 85 judges the identifying bit recorded in the received sync-blocks of the data region 15, determines the type of the tracks, and outputs a detecting signal indicating whether the tracks are postamble tracks or not. The detecting signal is given to the controller 2.

The first error-correction decoder 82 performs error-correction decoding with respect to the sync-blocks in the data region 15 and outputs them to the deformatter 9. The second error-correction decoder 83 performs error-correction decoding with respect to the sync-blocks in the searching data region 16, and outputs them to the searching data extractor 84. The searching data extractor 84 extracts searching data such as block numbers and mark numbers of the group from the error-corrected decoded sync-blocks in the searching data region 16 and outputs it to the controller 2 as the searching data S340. The controller 2 determines the present position of the reproducing head, based on the given searching data.

FIGS. 24A to 24E show the patterns of track groups formed on the magnetic tape 6. The recording converter 4 performs a predetermined recording signal processing with respect to the input blocked data, and generates a recording signal for forming a predetermined number of data track groups 92. The recording converter 4 also generates a recording signal for forming a predetermined number of preamble track groups 91 and a predetermined number of data end tracks 93 with respect to each data track group 92. The number of these tracks is controlled by the controller 2 via the switch 78.

Figures 24A, 24B, 24C, 24D, 24E:
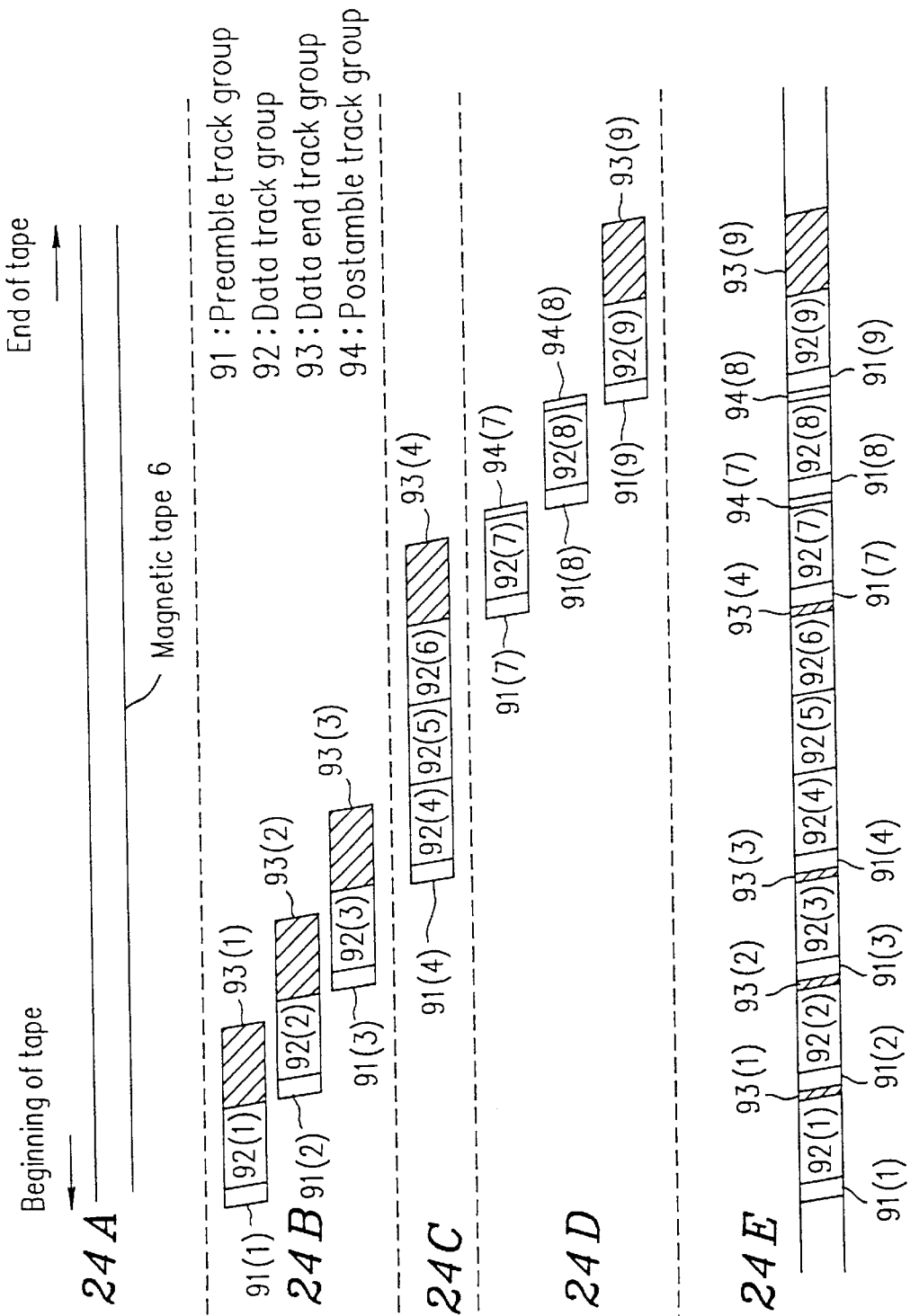
FIGS. 24A to 24E show the patterns of track groups formed on the magnetic tape.

In the case where the data track group 92(i) (i=1, 2, 3) is recorded per group, a predetermined number of preamble tracks (preamble track group 91(i)) and a predetermined number of data end tracks (data end track group 93(i)) can be formed with respect to each data track group 92 (see FIG. 24B).

In the case where a plurality of groups are successively recorded, as shown in FIG. 24C, the preamble track group 91(4), a plurality of data track groups 92(i) (i=4, 5, 6), and the data end track group 93(4) can be recorded together. That is, no preamble track group is formed among a plurality of data track groups, and the preamble track group is formed only at the leading edge position of a plurality of data track groups. The data end track group is formed only at the trailing edge position of a plurality of data end track groups.

In the case where the input data capacity is large, or in the case where data to be recorded together cannot be successively recorded since the rate of the input data is lower than that of recording, the data input at a time is recorded after being divided into some portions, as shown in FIG. 24D. In such a case, a recording signal is generated in the recording converter 4 as described below:

The input data is subjected to a predetermined recording signal processing, and a plurality of data track groups 92(i) (i=7, 8, 9) are formed. The preamble track generator 75 generates the preamble track group 91(i) (i=7, 8, 9) with respect to each data track group 92(i) (i=7, 8, 9). The postamble track generator 76 generates a plurality of postamble tracks (postamble track group 94 (i) (i=7, 8) with respect to the data track excluding the data track group 92(9) which is to be last recorded. The data end track generator 77 forms a predetermined number of data end tracks (data end track group 93(9)) only with respect to the last recorded data track group 92(9). The modulator 74 modulates these various kinds of track groups and searching data to generate a recording signal. The data end track indicates the last recorded position required for reproducing data from the magnetic tape 6. Thus, excess recording time can be reduced by forming the data end track group only with respect to the last recorded data track group.

In the case where recording as shown in FIGS. 24B to 24D is successively conducted on the magnetic tape 6 running as shown in FIG. 24A, data is recorded on the magnetic tape 6 as shown in FIG. 24E. In FIG. 24E, for example, the preamble track group 91, the data end track group 93, and the postamble track group 94 can include 10 tracks, 20 tracks, and 2 tracks, respectively. In this way, when data is overwritten, 2 data end tracks or 2 postamble tracks which are previously recorded remain on the magnetic tape 6. This is accomplished as follows: The postamble track (or data end track) of a certain data track group is detected by the postamble track detector 85, and a preamble track for the subsequent data track group is overwritten with a predetermined number (two in the present embodiment) of postamble tracks remaining from the end position of the certain data track group.

When recording is conducted as described above, as shown by the hatched portions in FIG. 24E, the last data end track group 93(9) includes 20 tracks, and the other data end track groups respectively include only 2 tracks. Therefore, for reproducing data, the end position of data can be determined by the difference in the number of tracks forming the data end track groups.

The number of previously recorded data end tracks or postamble tracks which are to be left for overwriting data is not limited to two. As long as the following Formula (1) is satisfied, the similar effects can be obtained:

(Number of data end tracks)>(Number of tracks to be left in overwriting)     (1)

The data end tracks and the postamble tracks can be recorded without any distinction. In the case where successive data is recorded after being divided into subgroups, a preamble track is generated preceding the data track group of each subgroup, and a postamble track is generated following the data track group of each subgroup. Even in this case, as long as the following Formula (2) is satisfied, the end position of data can be determined from the number of postamble tracks included in the postamble track group formed after the last data track group.

(Number of postamble tracks formed in recording)>(Number of tracks to be left in overwriting)     (2)

In the case of a pattern having no distinction among the data end track, postamble track, and preamble track, as long as the following Formula (3) is satisfied, the similar effects can be obtained.

(Number of data end tracks)>(Number of tracks to be left in overwriting+Number of preamble tracks)     (3)

As described above, the data end track 93 and the postamble track 94 are recorded and the last recorded data position is determined, whereby excess recording time can be reduced and the recording region of the magnetic tape can be effectively used.

Embodiment 6

Figure 25:
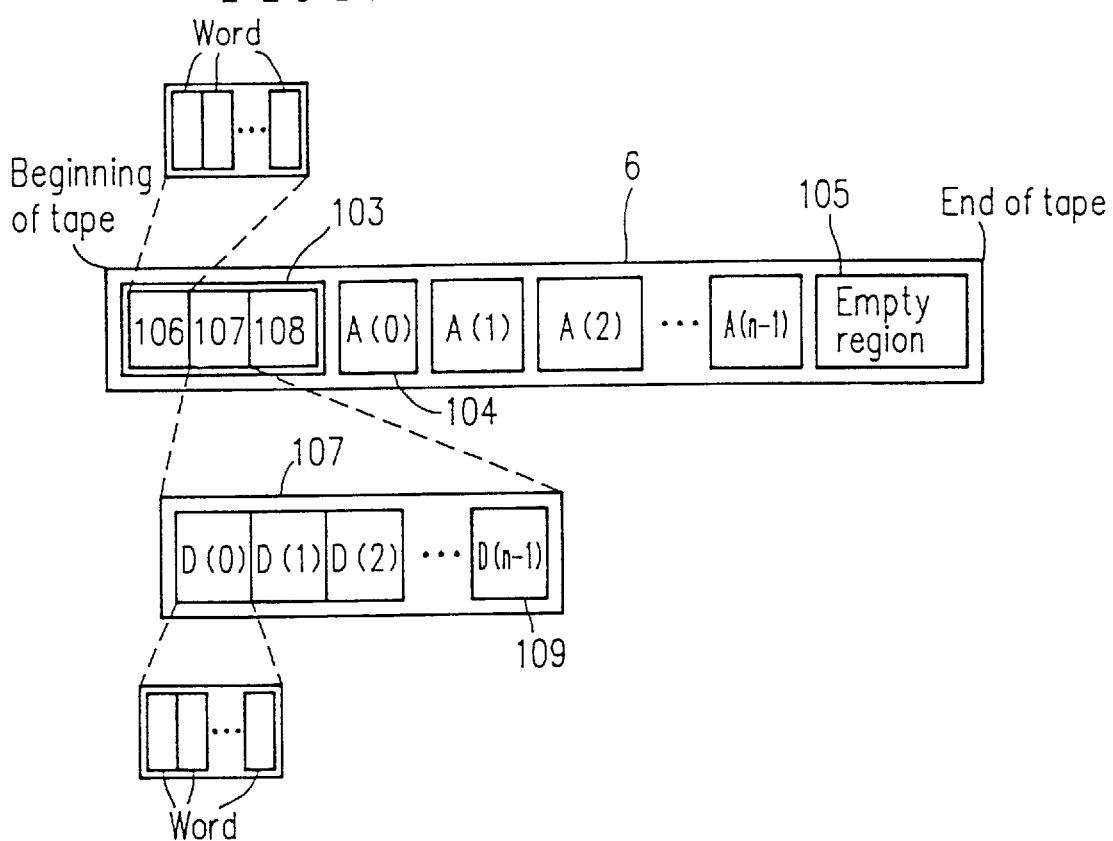
FIG. 25 illustrates an exemplary arrangement of recording regions on the magnetic tape.

The present embodiment illustrates that data is recorded with partitions provided on the magnetic tape 6. As shown in FIG. 25, at least one partition region (data region) 104 and a management information region 103 are provided on the magnetic tape 6. Data is recorded in-the partition region 104. The management information region 103 is provided in the leading region of the magnetic tape 6 so as to have a predetermined size. In the management information region 103, record medium management information 106 and a partition management information list 107 are recorded. A region which is not used by the management information region 103 is represented as an empty region 108. The empty region on the magnetic tape 6 is represented by the reference numeral 105. Here, the empty region 105 refers to a region which is not currently used but has been used before or a region which is not currently used and has not been used before.

The record medium management information 106 contains information concerning the entire magnetic tape 6, including: information concerning the type of the magnetic tape 6 such as the length (the number of tracks) of the magnetic tape 6 and the thickness thereof; information indicating the end position of the management information region 103 and the length of a gap region placed after the management information region 103; information concerning the use record (the number of loading of a cassette) of the magnetic tape 6 and reliability thereof (the number of recording errors and reproducing errors); the name of the magnetic tape 6; information for recording protection and reproducing protection of the magnetic tape 6 and for data security (password and the presence thereof) of the magnetic tape 6; the number of the partition regions 104 provided on the magnetic tape 6.

The number of the partition regions 104 provided on the magnetic tape 6 is n. The partition regions 104 are represented as A(0), A(1), ... A(n−1) (n is a positive integer) in the order in which they are provided. The partition regions 104 are respectively assigned with specific numbers. The partition regions 104 can be arranged on the magnetic tape 6 in any order, and the virgin region 105 can be inserted among the partition regions 104. With respect to each partition regions 104 (A(0), A(1), ..., A(n−1)), partition management information 109 (D(0), D(1), ..., D(n−1)) is generated. D(0), D(1), ..., D(n−1) are combined to form the partition management information list 107.

The partition management information 109 contains information concerning the partition regions 104, including: the specific numbers assigned to the partition regions 104; addresses indicating the start position and the end position of the partition regions 104 on the magnetic tape 6; an address indicating the last position of recorded data; information indicating recorded blocks and marks, and the number of groups; the number of initiating the partitions; names of the partition regions 104; information for recording protection and reproducing protection of the partitions and for data security (password and the presence thereof); and the like.

The partition management information 109 can be arranged in the partition management information list 107 in any order. Furthermore, when a partition region 104 is newly added, and the partition management information list 107 is updated, new partition management information 109 can be added to any position in the partition management information list 107.

The word structure of the record medium management information 106 and each partition management information 109 are shown in FIG. 26. The record medium management information 106 and each partition management information 109 are formed in a variable-length form using a fixed-length word.

Next, an apparatus 400 for recording and reproducing digital data and recording and reproducing in the management information region 103 in the present embodiment will be described.

Figure 27:
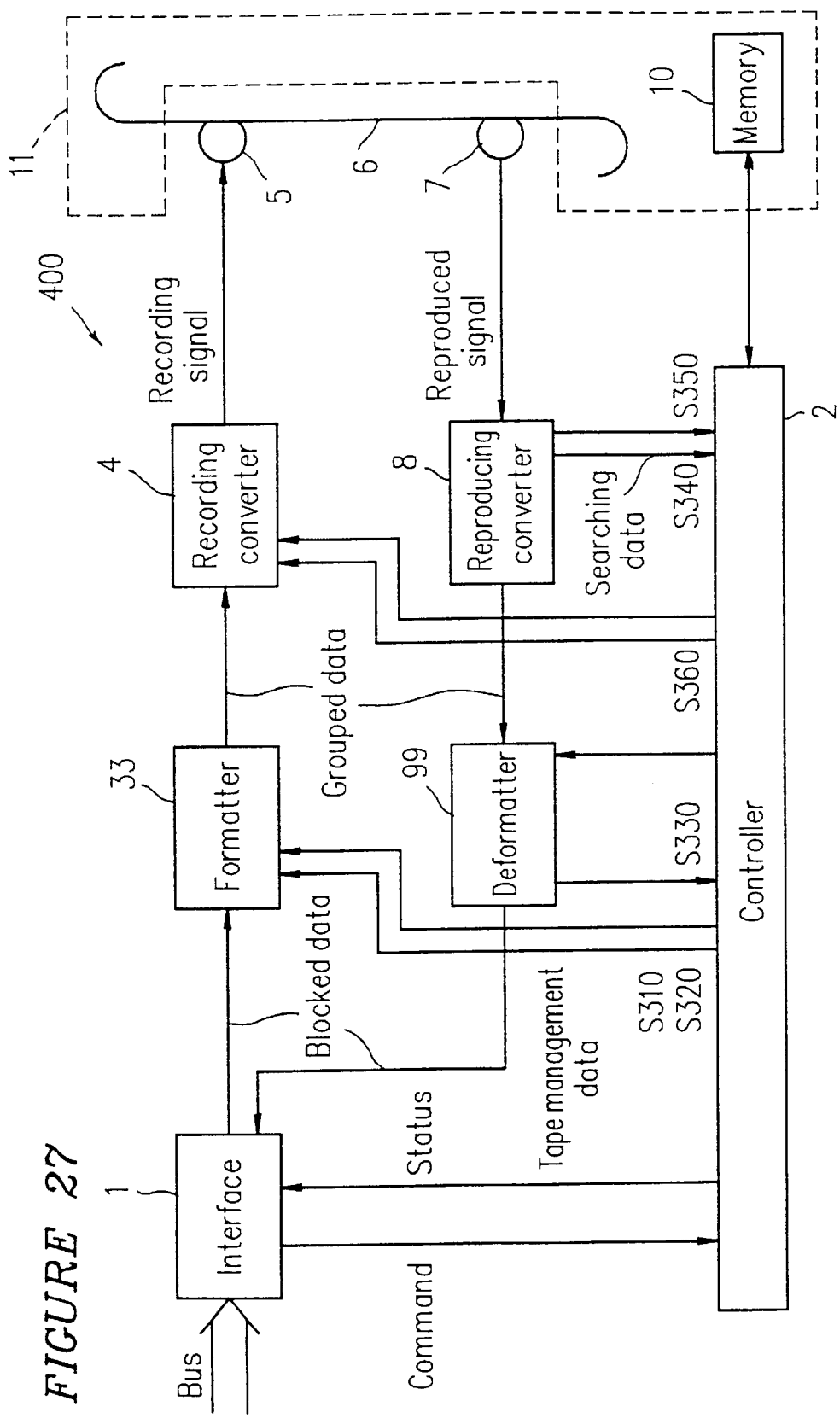
FIG. 27 is a block diagram showing an apparatus for recording and reproducing digital data in Embodiment 6 according to the present invention.

FIG. 27 is a block diagram showing the apparatus 400 for recording and reproducing digital data in Embodiment 6. In the same way as in the apparatuses 100 and 300 for recording and reproducing digital data, the apparatus 400 for recording and reproducing digital data includes an interface 1, a controller 2, a formatter (group conversion circuit) 33, a recording converter 4, a recording head 5, a reproducing head 7, a reproducing converter 8, and a deformatter (group reverse conversion circuit) 99. The interface 1 receives a command and blocked data input from a host such as a computer. The controller 2 generates various kinds of control signals and management data to control each component of the apparatus 400 based on the input command. The formatter 33 arranges input blocked data in a predetermined order to generate grouped data. The recording converter 4 converts the grouped data into a recording signal. The recording head 5 records data represented by the recording signal on the magnetic tape 6. The reproducing head 7 reproduces a signal from the magnetic tape 6. The reproducing converter 8 converts the reproduced signal into grouped data. The deformatter 99 reconfigures blocked data from the grouped data output from the reproducing converter 8.

In the present embodiment, the controller 2 generates, as tape management data, the record medium management information 106 and the partition management information list 107 as well as block management data, group management data, and searching information. When recording data in the management information region 103, the controller 2 outputs the record medium management information 106 and/or the partition management information list 107 (or the partition management information 109) to the formatter 33. The formatter 33 outputs the record medium management information 106 and/or the partition management information list 107 to the recording converter 4 as grouped data. When reproducing data from the management information region 103, the deformatter 99 extracts tape management data and outputs it to the controller 2.

The constructions of the formatter 33 and the deformatter 99 are different from those of the formatter and the deformatter in the apparatuses 100 and 300 for recording and reproducing digital data. The detailed description of the construction and operation of the parts of the formatter 33 and the deformatter 99 which are the same as those of the above-mentioned embodiments will be omitted.

Figure 28:
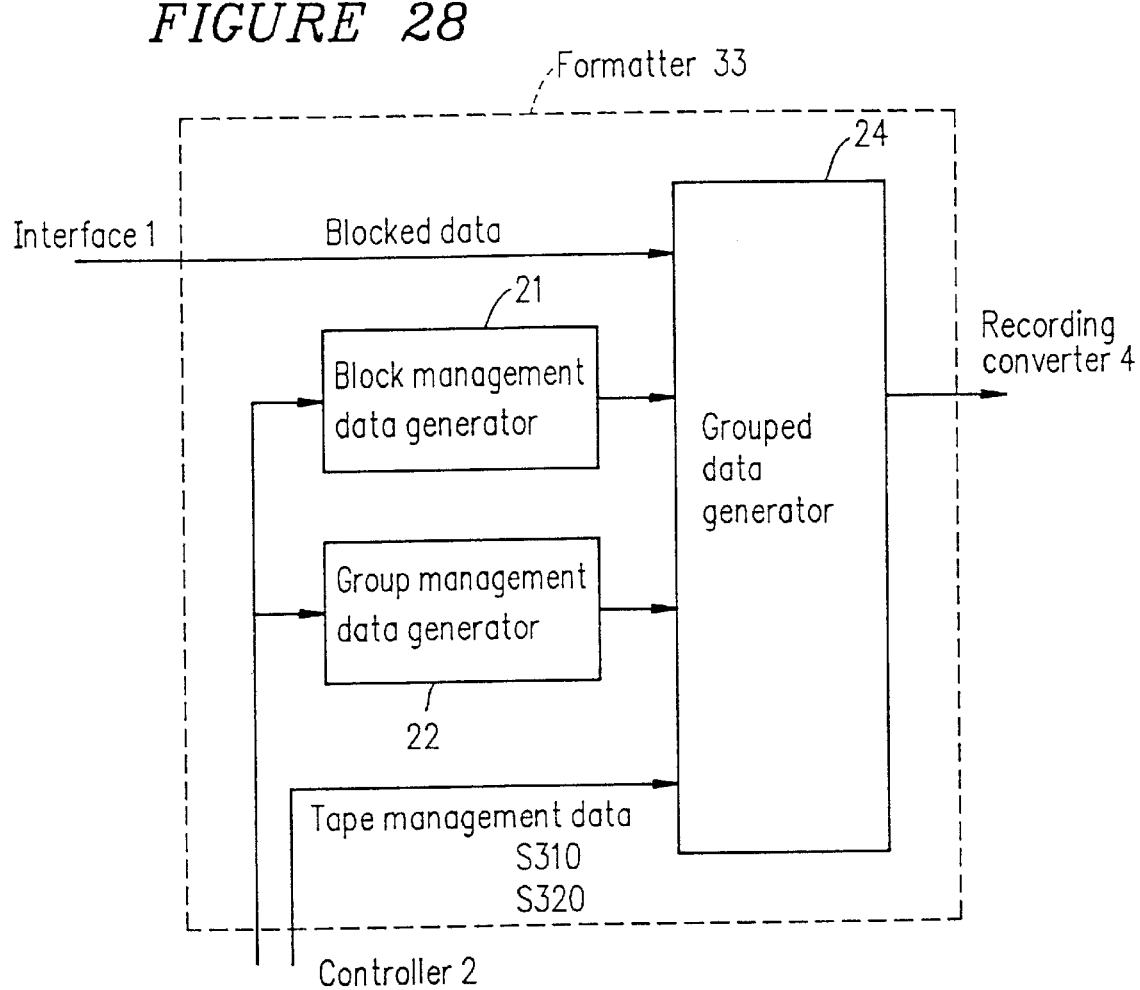
FIG. 28 schematically shows the construction of a formatter in Embodiment 6 according to the present invention.

FIG. 28 schematically shows the construction of the formatter 33 in Embodiment 6. In the same way as in the formatter 3, the formatter 33 includes a block management data generator 21, a group management data generator 22, and a grouped data generator 24. The grouped data generator 24 receives blocked data, block management data, and group management data, arranges them in a predetermined order, generates grouped data to be recorded in the data region (the partition regions 104), and outputs it to the recording converter 4. Furthermore, upon receiving the tape management data (the record medium management information 106 and the partition management information list 107) from the controller 2, the grouped data generator 24 forms them into grouped data to be recorded in the management information region 103, and outputs it to the recording converter 4. The configuration of these grouped data is controlled by a control signal given by the controller 2.

Figure 29:
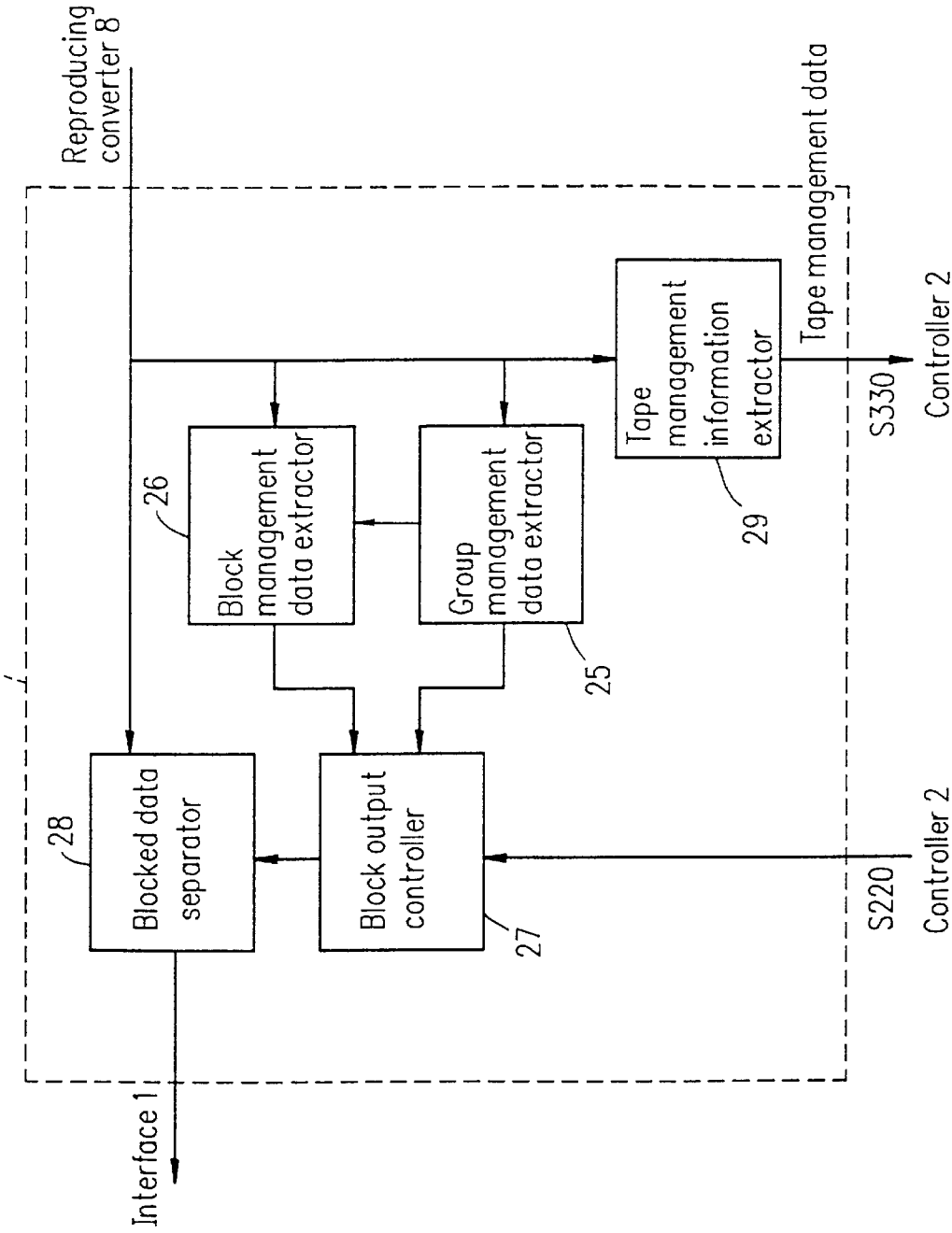
FIG. 29 schematically shows the construction of a deformatter in Embodiment 6 according to the present invention.

FIG. 29 schematically shows the construction of the deformatter 99. The deformatter 99 includes a group management data extractor 25, a block management data extractor 26, a block output controller 27, a blocked data separator 28, and a tape management data extractor 29. The tape management data extractor 29 receives grouped data reproduced from the management information region 103, extracts the tape management data, and outputs it to the controller 2.

As described above, according to the present embodiment, a plurality of partition regions 104 can be provided on the magnetic tape 6. Furthermore, the management information region 103 and at least one partition region 104 are provided on the magnetic tape 6, and the record medium management information 106 and all of the partition management informations 109 are recorded in the management information region 103, whereby management information concerning the entire magnetic tape 6 and management information of data recorded in all of the partitions can be obtained by reproducing only the management information region 103. Thus, the reproducing head can be immediately moved to the position of desired data in a desired partition region by reproducing only the management information region 103; therefore, desired data can be reproduced at high velocity.

Furthermore, information concerning the entire magnetic tape 6 and the contents of each partition region can be obtained by reproducing the management information region 103 even without reproducing all of the data recorded on the magnetic tape 6, so that the magnetic tape 6 can be easily managed. For example, the formation of the partition region A(1) can be realized by adding the data management information D(1) to update the data management information list 107 even without recording any data. Accordingly, the partition regions can be provided without recording any data in the partitions. In addition, the deletion of the partition region A(1) can be realized by recording the data management information list 107 containing no corresponding data management information D(1) even without directly deleting the information recorded in the partition region A(1).

Furthermore, by configuring the record medium management information and the data management information in a variable-length form, it is not required to allocate the largest capacity region required for the record medium management information and the data management information. Since recording of information which is not immediately used can be omitted, the management information region can be more effectively utilized.

Figure 30:
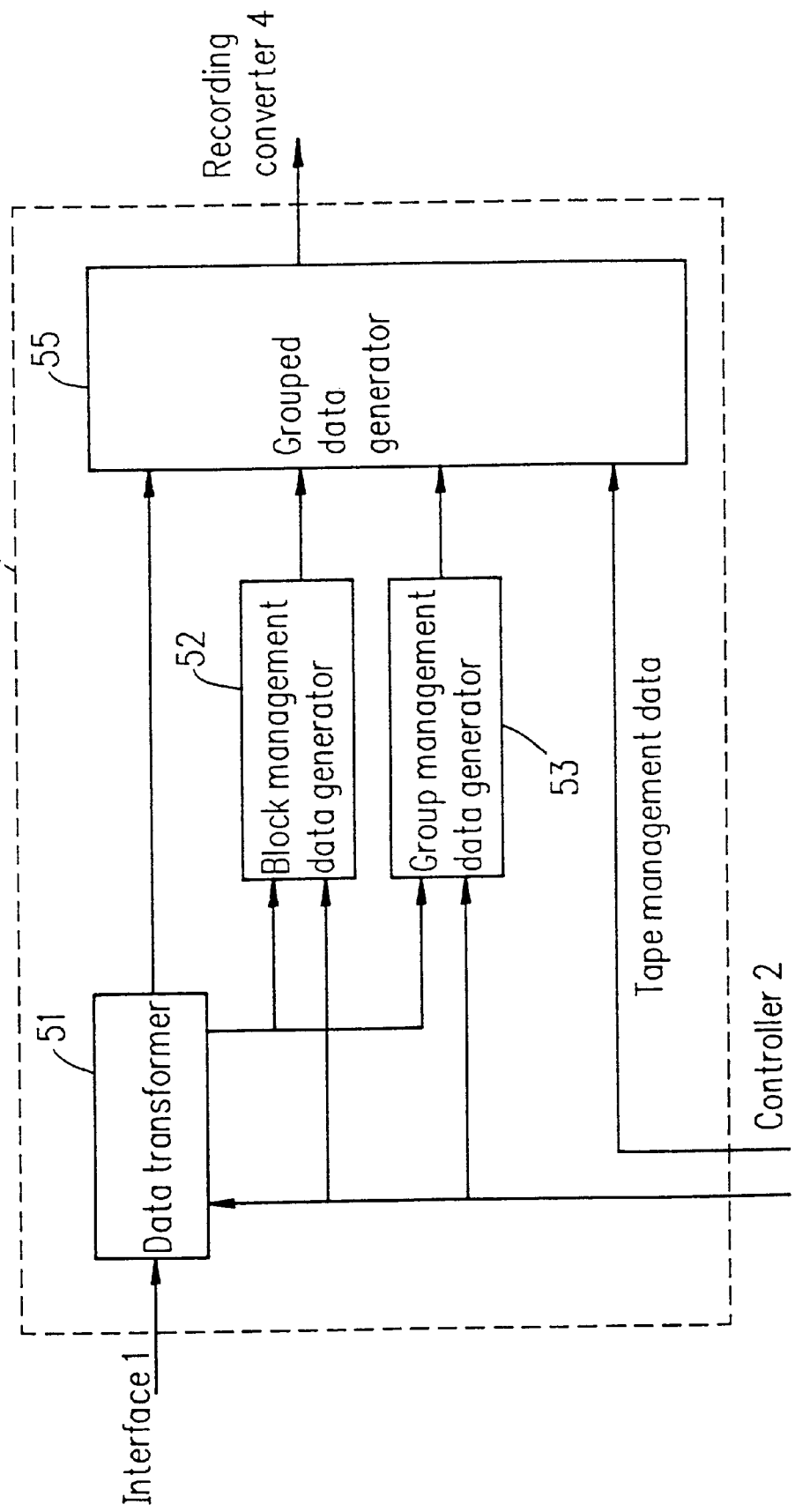
FIG. 30 schematically shows the construction of a formatter in Embodiment 6 according to the present invention, in the case involving the data transformation.
Figure 31:
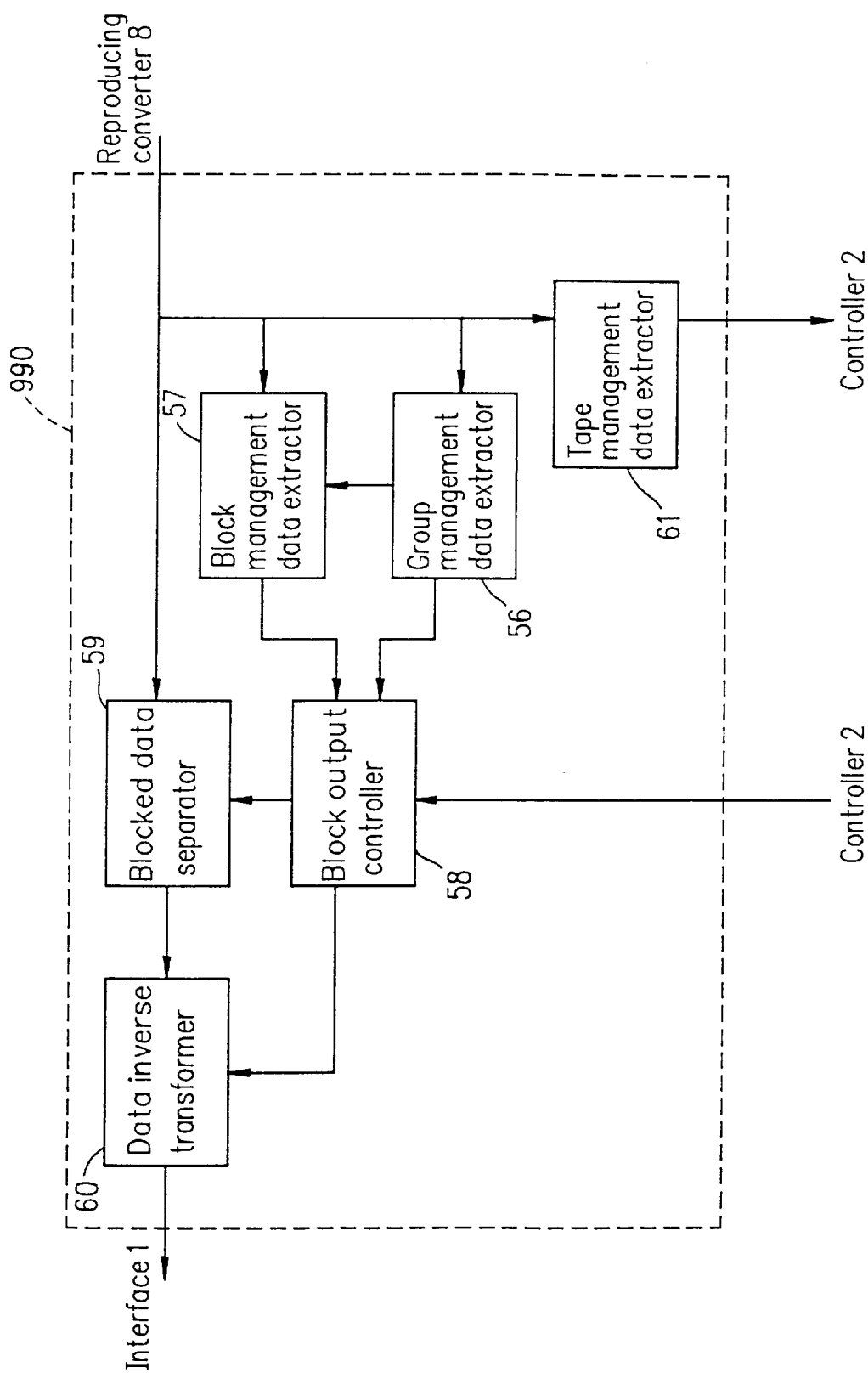
FIG. 31 schematically shows the construction of a deformatter in Embodiment 6 according to the present invention, in the case involving the data transformation.

The case involving no data transformation has been described above. In the present embodiment, data transformation such as data compression and encryption can be performed in the same way as in Embodiment 2. The constructions of the formatter 330 and the deformatter 990 in the case involving the data transformation are shown in FIGS. 30 and 31, respectively. The operations of the formatter 330 and the deformatter 990 are the same as those described in the above embodiments.

Embodiment 7

A part or all of the informations recorded in the management information region 103 described in Embodiment 6 can be recorded in an auxiliary recording medium separated from the magnetic tape 6. In the present embodiment, the case where such an auxiliary recording medium is provided will be described.

The auxiliary record medium can be implemented by providing a memory 10 such as a chip in or on a cassette 11 accommodating the magnetic tape 6. In the memory 10, either one of the record medium management information 106 and the partition management information 109, or both of them can be recorded.

In the present embodiment, the management information region 103 is provided in the memory 10 instead of the magnetic tape 6, and the controller 2 records the record medium management information 106 and the partition management information list 107 in the memory 10.

Figure 32:
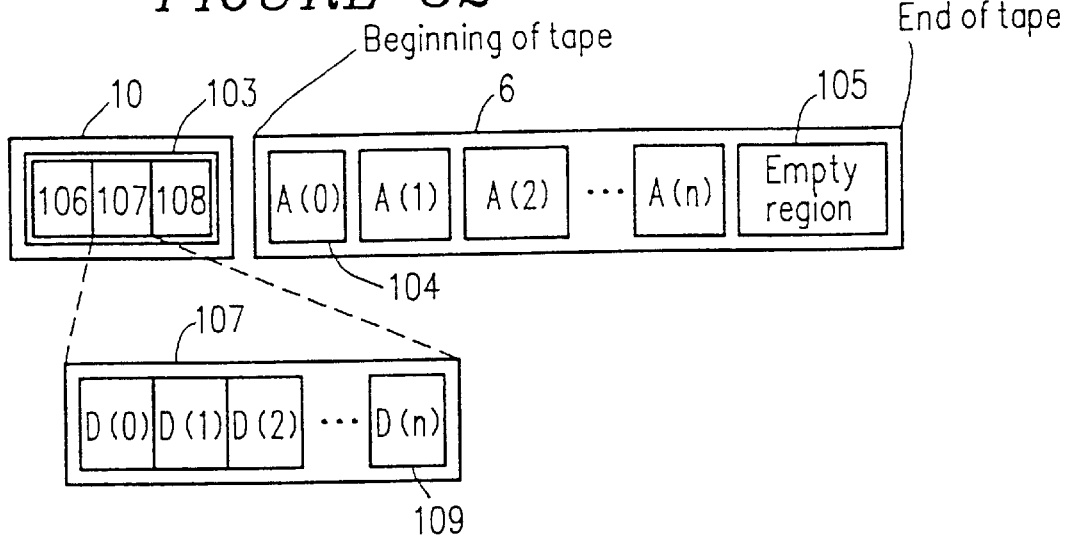
FIG. 32 shows an exemplary arrangement of recording regions on the magnetic tape and the memory.

The recorded contents of the magnetic tape 6 and the memory 10 under the above-mentioned condition are shown in FIG. 32. The partition regions 104 are provided on the magnetic tape 6 in the same way as in Embodiment 6. The management information region 103 is not provided on the magnetic tape 6, and the partition region 104 is started from the leading edge of the magnetic tape 6. The management information region 103 is provided in the memory 10. The controller 2 generates the record medium management information 106 or the partition management information list 107 and record them in the memory 10.

As described above, by providing the management information region 103 in the memory 10, the data management information and the record medium management information can be reproduced without directly accessing the magnetic tape 6. Since it is not required to return to the leading edge of the magnetic tape 6 in order to obtain these management informations, the management information can be reproduced quickly. Furthermore, in the case where the data management information and the record medium management information are updated during recording or reproducing data on the magnetic tape 6, the updated information can be recorded in the memory 10 every time information is updated. In the conventional method in which updated management information is recorded only right after the completion of recording and reproducing processing (normally, in the case of taking out the magnetic tape 6), when the information of the partitions updated during the processing is lost because of the loss of power or the like during the processing, recorded data cannot be accessed any more. According to the present embodiment, such a problem can be solved.

The recording region can be effectively utilized by configuring the data management information and the record medium management information in a variable-length form. Thus, the capacity of the memory 10 is not required to be large, realizing the above-mentioned function with the memory 10 at low cost. Furthermore, by recording the management data with the priority order assigned thereto, the recording region of the memory 10 attached to the cassette 11 accommodating the magnetic tape 6 can be effectively utilized. The capacity of the memory 10 can be further decreased, so that the above-mentioned function can be realized at low cost.

Figure 33:
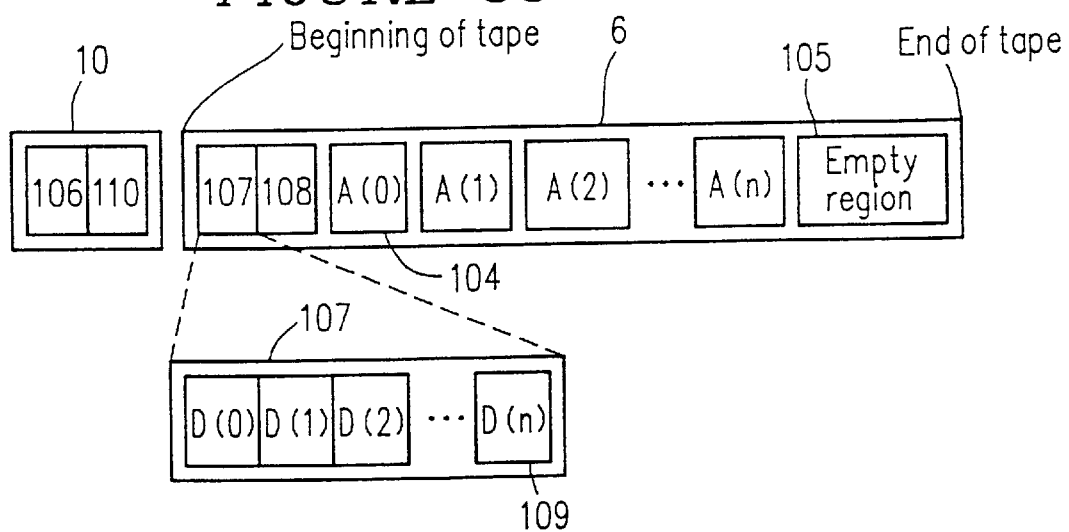
FIG. 33 shows another arrangement of recording regions on the magnetic tape and the memory.
Figure 34:
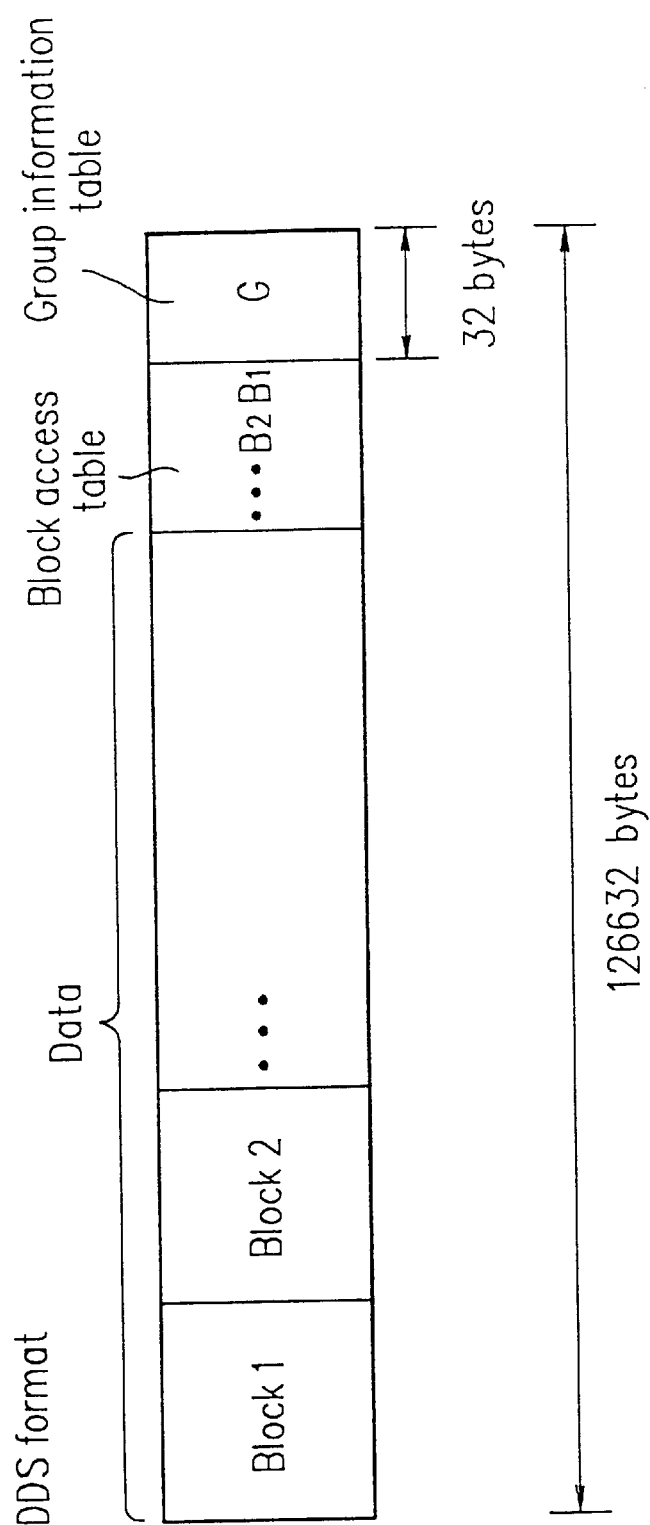
FIG. 34 shows an example of grouped data recorded by a conventional apparatus for recording and reproducing digital data.
Figure 35:
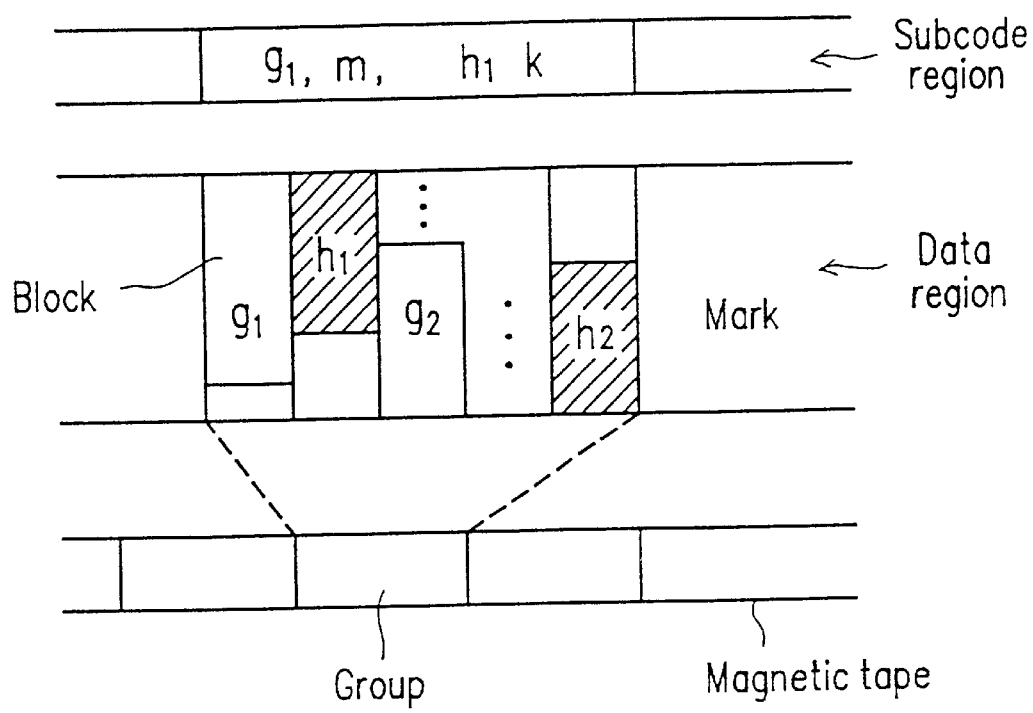
FIG. 35 schematically shows grouped data recorded in a DDS format.
Figure 37A:
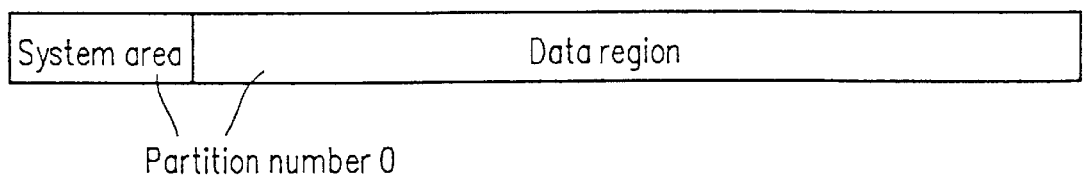
FIG. 37A shows the position of a system area in the case where one partition is assigned in the conventional DDS format.
Figure 37B:
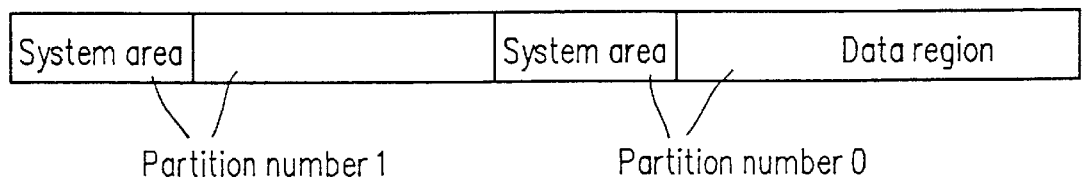
FIG. 37B shows the positions of system areas in the case where two partitions are assigned in the conventional DDS format.

The case where the entire management information region 103 is provided in the memory 10 has been described above. It is also possible that only part of the management information region 103, e.g., the record medium management information 106 is recorded in the memory 10, and the partition management information list 107 are recorded on the magnetic tape 6 (see FIG. 33). In accordance with the storage capacity of the memory 10 and a method for using the magnetic tape 6, the place where the management information is to be recorded can be set.

The record medium management information 106 may contain information indicating the total number of symbols forming the partition management information 109. In the present embodiment, the number of words forming the record medium management information 106 and the partition management information 109 are used as information indicating the size of the record medium management information 106 and the partition management information 109. Instead of the number of words, the number of symbols can be used.

In configuring the record medium management information 106, information indicating the size of the record medium management information 106 is assigned to the leading word. The information can be assigned to the trailing word. Alternatively, it is possible that identifying information, indicating that the word is placed at the leading edge of the record medium management information 106, is contained in the leading word, and identifying information, indicating the word is placed at the trailing edge of the record medium management information 106, is contained in the trailing word. Alternatively, identifying information indicating that the word is the record medium management information 106 can be contained in all of the constituent words.

Furthermore, in the case of configuring the partition management information 109, the identifying information indicating that the word is placed at the leading edge, the specific numbers of the corresponding partition regions, and information indicating the size of the data management information are contained in the leading word. However, the identifying information indicating that the word is placed at the trailing edge of the partition management information and the specific numbers of the corresponding partition regions can be contained in the trailing word. Alternatively, the identifying information indicating that the word is placed at the leading edge of the partition management information and the specific numbers of the corresponding partition regions can be contained in the leading word, and the identifying information indicating that the word is placed at the trailing edge of the data management information can be contained in the trailing word. Alternatively, the specific numbers of the corresponding partition regions can be contained in all of the constituent words.

In the present embodiment, the apparatus for recording and reproducing digital data is described. It is noted that the present embodiment can be applied to a recording apparatus, a reproducing apparatus, and a recording and reproducing apparatus which cannot simultaneously record and reproduce data because of the sharing of a part of the circuits. In addition, in the present embodiment, the blocked data and the block control signal are independently input and output. However, the identical input and output can be used by time division processing. Furthermore, the input and output identical with the blocked data input can be used. According to the present invention, data is recorded on the magnetic tape 6; however, the present invention can be applied to a general recording and reproducing apparatus instead of the magnetic recording.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for recording and reproducing digital data, comprising:
    group conversion means for receiving input blocked data, arranging the blocked data in a predetermined order to generate grouped data, and outputting the grouped data;
    control means for receiving a command input together with the input blocked data and generating first management data and a control signal based on the command;
    recording conversion means for receiving the grouped data output from the group conversion means and converting the grouped data into a recording signal based on the control signal;
    recording means for receiving the recording signal and recording data represented by the recording signal on a record medium;
    reproducing means for reproducing from the record medium a signal representing the data recorded on the record medium;
    reproducing conversion means for converting the reproduced signal into grouped data; and
    group reverse conversion means for receiving the grouped data output from the reproducing conversion means and reconfiguring blocked data from the grouped data,
    wherein the control means generates a region control signal for setting at least one data region and management information region on the record medium, generates data region management information concerning the data region, with respect to each of the data region, generates record medium management information for managing the entire record medium, and generates a recording control signal for recording data in the data region and recording the record medium management information and the data region management information in the management information region, whereby during reproduction, the data region management information and the record medium management information are obtained by reproducing only the management information region.

2. An apparatus for recording and reproducing digital data according to claim 1, wherein the group conversion means comprises:
    block management data generation means for receiving the management data from the control means and generating block management data with respect to the corresponding blocked data, the block management data having a variable-length and containing information concerning each blocked data;
    group management data generation means for receiving the management data and generating group management data containing information concerning the entire grouped data; and
    grouped data generation means for selectively receiving the blocked data, the block management data, and the group management data, and the record medium management information and the data region management information given by the control means, arranging the blocked data, the block management data, and the group management data in a predetermined order to generate first grouped data, arranging the record medium management information and the data region management information in a predetermined order to generate second grouped data, and outputting the first and second grouped data based on the region control signal.

3. An apparatus for recording and reproducing digital data according to claim 2, wherein the recording conversion means comprises:
    error-correction encoding means for performing error-correction encoding with respect to the first and second grouped data, respectively; and
    modulation means for modulating the error-corrected encoded first and second grouped data to generate the recording signal, and outputs the recording signal based on the recording control signal.

4. An apparatus for recording and reproducing digital data according to claim 3, wherein the reproducing conversion means comprises:
    demodulation means for demodulating the reproduced signal and outputting the encoded first and second grouped data; and
    error-correction decoding means for receiving the encoded first and second grouped data and performing error-correction decoding with respect to the encoded first and second grouped data, respectively.

5. An apparatus for recording and reproducing digital data according to claim 2, wherein the group reverse conversion means comprises:
    group management data extraction means for extracting group management data from the first grouped data;
    block management data extraction means for extracting block management data from the first grouped data and the extracted group management data;
    management information extraction means for extracting the record medium management information and the data region management information from the second grouped data;
    block output control means for receiving the extracted block management data and group management data, determining the blocked data to be output based on the block management data and the group management data according to the control signal given by the control means, and generating a block control signal designating blocked data to be output; and blocked data separation means for receiving the grouped data and the block output control signal, separating blocked data designated by the block output control signal from the grouped data, and outputting the separated blocked data.

6. An apparatus for recording and reproducing digital data according to claim 2, wherein the record medium is accommodated in a housing having an auxiliary record medium, and the control means controls the recording means to record the first grouped data on the record medium and records the second grouped data on the auxiliary record medium.

7. An apparatus for recording and reproducing digital data according to claim 2, wherein the record medium is accommodated in a housing having an auxiliary record medium, and the control means controls the recording means to record the data region management information among the first grouped data and the second grouped data on the record medium and records the record medium management information among the second grouped data on the auxiliary record medium.

8. An apparatus for recording and reproducing digital data according to claim 2, wherein the record medium is accommodated in a housing having an auxiliary record medium, and the control means controls the recording means to record part of the data region management information among the first grouped data and the second grouped data on the record medium and records the remaining part of the data region management information and the record medium management information among the second grouped data on the auxiliary record medium.

9. A method for recording and reproducing digital data, comprising the steps of:

(a) arranging input blocked data in a predetermined order to generate grouped data, and outputting the grouped data;

(b) generating first management data and a control signal based on a command input together with the input blocked data;

(c) converting the grouped data into a recording signal based on the control signal;

(d) recording data represented by the recording signal on a record medium;

(e) reproducing from the record medium a signal representing the data recorded on the record medium;

(f) converting the reproduced signal into grouped data; and (g) reconfiguring blocked data from the grouped data, wherein step (b) includes the steps of;

(b1) generating a region control signal for setting at least one data region and management information region on the record medium, (b2) generating data region management information concerning the data region, with respect to each of the data region, (b3) generating recording medium management information for managing the entire record medium, and (b4) generating a recording control signal for recording data in the data region and recording the record medium management information and the data region management information in the management information region, and wherein, in step (e) the signal representing the data recorded on the record medium is reproduced only from the management information region including the data region management information and the record medium management information.

10. A method for recording and reproducing digital data according to claim 9, wherein step (a) comprises the steps of:

(a1) generating block management data with respect to the corresponding blocked data, the block management data having a variable-length and containing information concerning each blocked data;

(a2) generating group management data containing information concerning the entire grouped data; and (a3) arranging the blocked data, the block management data, and the group management data in a predetermined order to generate first grouped data, (a4) arranging the record medium management information and the data region management information in a predetermined order to generate second grouped data, and (a5) selectively outputting one of the first and second grouped data based on the region control signal.

11. A method for recording and reproducing digital data according to claim 10, wherein step (c) comprises the steps of:

(c1) performing error-correction encoding with respect to the first and second grouped data; and (c2) modulating the error-corrected encoded first and second grouped data to generate the recording signal based on the recording control signal.

12. A method for recording and reproducing digital data according to claim 11, wherein step (f) comprises the steps of:

(f1) demodulating the reproduced signal to generate the encoded first and second grouped data; and (f2) performing error-correction decoding with respect to the encoded first and second grouped data.

13. A method for recording and reproducing digital data according to claim 10, wherein step (g) comprises the steps of:

(g1) extracting group management data from the first grouped data;

(g2) extracting block management data from the first grouped data and the extracted group management data;

(g3) extracting the record medium management information and the data region management information from the second grouped data;

(g4) determining the blocked data to be output based on the block management data and the group management data according to the control signal, and generating a block control signal designating blocked data to be output; and (g5) separating blocked data designated by the block output control signal from the grouped data, and generating the separated blocked data.

14. A method for recording and reproducing digital data according to claim 10, wherein the record medium is accommodated in a housing having an auxiliary record medium, step (e) comprises the step of (e1) recording data on the auxiliary record medium, and step (b) comprises step of controlling step (e1) to record the first grouped data on the record medium and to record the second grouped data on the auxiliary record medium.

15. A method for recording and reproducing digital data according to claim 10, wherein the record medium is accommodated in a housing having an auxiliary record medium, step (e) comprises the step of (e1) recording data on the auxiliary record medium, and step (b) comprises step of controlling step (e1) to record the data region management information among the first grouped data and the second grouped data on the record medium and to record the record medium management information among the second grouped data on the auxiliary record medium.

16. A method for recording and reproducing digital data according to claim 10, wherein the record medium is accommodated in a housing having an auxiliary record medium, step (e) comprises the step of (e1) recording data on the auxiliary record medium, and step (b) comprises step of controlling step (e1) to record part of the data region management information among the first grouped data and the second grouped data on the record medium and to record the remaining part of the data region management information and the record medium management information among the second grouped data on the auxiliary record medium.

* * * * *